(12) United States Patent
Hara et al.

(10) Patent No.: US 8,091,347 B2
(45) Date of Patent: Jan. 10, 2012

(54) EXHAUST GAS PURIFICATION APPARATUS, INTERNAL COMBUSTION ENGINE COMPRISING THE SAME, AND PARTICULATE FILTER RESTORING METHOD

(75) Inventors: Michihiko Hara, Osaka (JP); Akihiro Nishimura, Osaka (JP); Shusuke Okada, Osaka (JP); Masato Kitazaki, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 1108 days.

(21) Appl. No.: 11/885,240

(22) PCT Filed: Feb. 10, 2006

(86) PCT No.: PCT/JP2006/302359
§ 371 (c)(1),
(2), (4) Date: Aug. 28, 2007

(87) PCT Pub. No.: WO2006/092946
PCT Pub. Date: Sep. 8, 2006

(65) Prior Publication Data
US 2008/0264045 A1    Oct. 30, 2008

(30) Foreign Application Priority Data

Feb. 28, 2005 (JP) ................................. 2005-054243
Apr. 27, 2005 (JP) ................................. 2005-129836

(51) Int. Cl.
*F01N 3/00* (2006.01)
(52) U.S. Cl. ................. 60/297; 60/285; 60/286; 60/274

(58) Field of Classification Search ............ 60/237–274, 60/284–287, 289–290, 295–301, 303
See application file for complete search history.

(56) References Cited

U.S. PATENT DOCUMENTS

| | | | | |
|---|---|---|---|---|
| 4,685,290 A * | 8/1987 | Kamiya et al. | .................. | 60/274 |
| 6,644,020 B2 * | 11/2003 | Kuenstler et al. | ............... | 60/286 |
| 6,698,192 B2 * | 3/2004 | Ootake | ........................... | 60/297 |
| 6,823,661 B2 * | 11/2004 | Minami | .......................... | 60/285 |
| 7,104,051 B2 * | 9/2006 | Shimasaki et al. | .............. | 60/297 |

FOREIGN PATENT DOCUMENTS

| | | |
|---|---|---|
| JP | 58-85315 | 5/1983 |
| JP | 63-132820 | 6/1988 |
| JP | 3-202609 | 9/1991 |
| JP | 5-44440 | 2/1993 |
| JP | 8-68313 | 3/1996 |
| JP | 8-177463 | 7/1996 |
| JP | 2002-332822 | 11/2002 |
| JP | 2003-83036 | 3/2003 |
| JP | 2003-193824 | 7/2003 |
| JP | 2004-108193 | 4/2004 |

* cited by examiner

*Primary Examiner* — Thomas Denion
*Assistant Examiner* — Jesse Bogue
(74) *Attorney, Agent, or Firm* — Edwards Wildman Palmer LLP

(57) ABSTRACT

In an embodiment of an exhaust gas purification apparatus, when an accumulation amount of particulate matter in a DPF (33) exceeds a predetermined amount and an exhaust gas temperature of an engine is lower than a restoration operable temperature, an intake air amount reducing operation is executed by an air intake throttling device (24) provided for an air intake pipe (21) of the engine, and a heating operation is executed by an electric heater (34) provided upstream from the DPF (33), thereby increasing the exhaust gas temperature to the restoration operable temperature to start a restoration operation of the DPF (33).

20 Claims, 34 Drawing Sheets

(a)

(b)

EXHAUST GAS PURIFICATION APPARATUS, INTERNAL COMBUSTION ENGINE COMPRISING THE SAME, AND PARTICULATE FILTER RESTORING METHOD

TECHNICAL FIELD

The present invention relates to an exhaust gas purification apparatus which is provided in an exhaust system for an internal combustion engine, such as representatively a diesel engine, and has a particulate filter (hereinafter simply referred to as a filter) for collecting particulate matter (hereinafter referred to as PM) in exhaust gas, and an internal combustion engine comprising the exhaust gas purification apparatus, and a filter restoring method.

BACKGROUND ART

In recent years, there is a demand for an improvement in exhaust emission of internal combustion engines provided in automobiles or the like. Particularly for diesel engines, removal of PM, such as soot or the like, included in exhaust gas is required in addition to a reduction in CO, HC and NOx. Therefore, a filter made of a porous material or the like is provided in an exhaust path of an engine so that PM in exhaust gas is collected by the filter.

Since the filter is made of a porous material or the like as described above, an excessive increase in the amount of collected PM (hereinafter also referred to as a PM accumulation amount) results in an increase in flow resistance in the filter, leading to a reduction in the output power of the engine or the like. Therefore, PM collected by the filter needs to be removed as appropriate, thereby restoring the filter to revitalize the PM collecting ability.

As a conventional filter restoring method, an operation of supplying backwash air into a filter or an operation of heating a filter using a heating apparatus is performed in a batch to remove PM as disclosed in, for example, Patent Document 1 (described below).

Also, a continuous restoration filter which can be continuously used so as to be applicable to automobile engines or the like, has been proposed in, for example, Patent Document 2. In Patent Document 2, a plurality of filters are connected in parallel, and some of the filters are used to collect PM while the other filters are subjected to a restoration operation, thereby making it possible to continuously operate the engine.

Since the continuous restoration filter has a larger size, a chemical reaction-type restoration technique which can have a smaller size also has been proposed (see, for example, Patent Document 3 described below). In this chemical reaction-type restoration technique, NO in exhaust gas is oxidized into $NO_2$, and PM is removed by oxidation using 0 (oxygen) released when the $NO_2$ returns to NO. For example, an oxidation catalyst, such as platinum or the like, is provided in a filter, and the oxidation action of the oxidation catalyst is utilized, thereby making it possible to restore the filter during the running of the engine.

However, in the chemical reaction-type restoration technique, the chemical reaction is not carried out unless the exhaust gas temperature is higher than or equal to a predetermined restoration operable temperature (e.g., 300° C.). In other words, when the exhaust gas temperature continues to be lower than the restoration operable temperature, a large amount of PM is accumulated in the filter, so that the filter is likely to be clogged. Therefore, when the accumulation amount of PM reaches a predetermined amount or more, the exhaust gas temperature needs to be increased to be higher than or equal to the restoration operable temperature by any means.

In view of this, in an engine comprising an electronically controlled pressure-accumulation fuel injector (e.g., a so-called common-rail injector), "post injection" that a fuel is injected again from the injector after a main fuel is injected and an expansion stroke is started, is performed so that the exhaust gas temperature is increased by combustion of the post injection fuel (see, for example, Patent Document 4 described below). Alternatively, an air intake throttling valve is provided for an air intake system, the opening degree of the throttling valve is reduced to decrease an intake air amount and thereby enrich the air-fuel ratio, thereby increasing a combustion temperature in a combustion chamber to increase the exhaust gas temperature (see, for example, Patent Document 5 described below).

Also, in a filter of the chemical reaction-type restoration technique, the PM accumulation amount of the filter needs to be correctly detected so as to appropriately obtain timing of starting the restoration operation.

In view of this, Patent Document 6 and Patent Document 7 described below have been proposed. In Patent Document 6, a pressure sensor is used to detect a pressure difference between an upstream side and a downstream side of a filter in an exhaust pipe. When the pressure difference reaches a predetermined value or more, it is determined that the PM accumulation amount has become large, so that a filter restoration operation is started. As the filter restoration operation, Patent Document 6 specifically discloses reducing the opening degree of an air intake throttling valve provided in an air intake system, reducing the opening degree of an exhaust throttling valve provided in an exhaust system, increasing a fuel injection amount, delaying a fuel injection time, and the like.

Also, Patent Document 7 discloses that a PM generation amount and a combustion rate constant corresponding to a running state of an engine are read out from a map, and the PM accumulation amount is estimated in accordance with a predetermined calculation expression.

Patent Document 1: JP H8-232639A
Patent Document 2: JP H11-236813A
Patent Document 3: JP 2001-271629A
Patent Document 4: JP H8-303290A
Patent Document 5: JP H6-137130A
Patent Document 6: JP H7-189654A
Patent Document 7: JP 2002-97930A

DISCLOSURE OF INVENTION

Problem to be Solved by the Invention

As described above, there are some known techniques in which a chemical reaction-type restoration technique is achieved by providing a means for increasing the exhaust gas temperature, however, the conventional techniques have room for an improvement in the following points.

Firstly, the technique of increasing the exhaust gas temperature by post injection (disclosed in Patent Document 4 above) is applicable only to electronically controlled fuel injectors whose fuel injection timing can be arbitrarily set, but not to mechanical fuel injectors. Therefore, the versatility is low.

In the case of the technique of increasing the exhaust gas temperature by reducing the intake air amount as disclosed in Patent Document 5 above, for example, when an engine is in the idle state, the exhaust gas temperature is extremely low, so that it is difficult to increase the exhaust gas temperature to the restoration operable temperature even if the opening degree of the air intake throttling valve is reduced within a range which does not cause the engine to stall from the idle state. This is because, as the opening degree of the air intake throttling valve is reduced, the air intake pressure decreases, so that a temperature within the combustion chamber upon completion of a compression stroke decreases, and therefore, the exhaust gas temperature cannot be increased to the restoration operable temperature within a range which does not cause misfire.

On the other hand, the PM accumulation amount detection method disclosed in Patent Document 6 is not considered to secure a sufficient level of reliability. The reason will be described below. Firstly, pressure sensors are generally poorly heat-resistant, and therefore, when a pressure sensor is provided in an exhaust system under a high-temperature environment, the pressure sensor is unlikely to output a correct detection value. Also, vibration from the engine or the like (an automobile body in the case of an engine for an automobile) acts on a pressure withdrawal pipe connecting the inside of the exhaust pipe and the pressure sensor. Therefore, when a crack occurs in the pressure withdrawal pipe due to the vibration, it is no longer possible to correctly detect the internal pressure of the exhaust pipe. Particularly, when the pressure withdrawal pipe is connected upstream from the filter, PM is likely to enter the pipe, leading to clogging. Also, in this case, it is no longer possible to correctly detect the internal pressure of the exhaust pipe.

The pressure level of the pressure difference between the upstream side and the downstream side of the filter is considerably low, and therefore, micro-differential pressure measurement is required. A high-precision pressure sensor, which is expensive, is required. Thus, the above-described method is not practical.

In addition, the pressure difference between the upstream side and the downstream side of the filter varies depending on the running situation of the engine (particularly, the amount of exhaust gas), even if the PM accumulation amount is the same. Therefore, in order to know a correct PM accumulation amount, it is necessary to obtain information, such as the revolution number of the engine, the load of the engine, and the like, and subject the pressure difference detected by the pressure sensor to correction calculation based on the information. Therefore, not only means for obtaining the information are required, but also the calculation operation becomes complicated. Note that, even if the information is obtained to perform the correction calculation with respect to the pressure difference, the PM accumulation amount after the correction calculation is not necessarily correct, because the detected pressure difference is not guaranteed to be correct as described above.

Also, in the PM accumulation amount detection method disclosed in Patent Document 7, the reliability is not considered to be sufficiently secured. This is because, when a deterioration in performance occurs in the engine due to any trouble other than normal deteriorations, a PM emission amount is likely to increase, and in this case, a discrepancy occurs between a PM accumulation amount estimated in accordance with the calculation expression and an actual PM accumulation amount. Therefore, it is necessary to employ another means, such as differential pressure detection as in Patent Document 6 or the like, to guarantee that the estimated PM accumulation amount is not largely deviated from the actual PM accumulation amount.

As described above, in conventional PM accumulation amount detection methods, the reliability is not sufficiently secured, so that the PM accumulation amount of a filter is likely to be erroneously determined. For example, when it tends to be erroneously determined that the PM accumulation amount has reached a predetermined amount (an amount which requires a filter restoration operation) though the actual PM accumulation amount is small, the restoration operation is frequently performed, likely leading to an increase in energy amount required for the restoration operation (e.g., an increase in electric power consumption when the filter is heated by an electric heater), or an adverse influence on extension of the life of the filter due to frequent heating of the filter. Conversely, when it tends to be erroneously determined that the PM accumulation amount has not reached the predetermined amount though the actual PM accumulation amount has reached the predetermined amount, the filter is excessively clogged, so that the loss of exhaust pressure is increased, leading to a reduction in output power or fuel efficiency of the engine.

An object of the present invention is to provide an exhaust gas purification apparatus which can perform a restoration operation of a particulate filter in a more appropriate manner and with more appropriate timing, and an internal combustion engine comprising the exhaust gas purification apparatus, and a filter restoring method. Specifically, an object of the present invention is to provide an exhaust gas purification apparatus which can reliably increase the exhaust gas temperature to improve the reliability of a restoration operation, independently of the type of a fuel injector, and an internal combustion engine comprising the exhaust gas purification apparatus, and a filter restoring method, and to provide an exhaust gas purification apparatus which can correctly recognize a PM accumulation amount in a filter for collecting PM in exhaust gas of an internal combustion engine, and an internal combustion engine comprising the exhaust gas purification apparatus.

Means for Solving Problem

An exhaust gas purification apparatus according to the present invention comprises a particulate filter capable of collecting particulate matter in exhaust of an internal combustion engine and being restored by removing the particulate matter by oxidation when a temperature of the exhaust reaches a restoration operable temperature, an intake air amount reducing means provided in an air intake system of the internal combustion engine and capable of reducing an intake air amount, an exhaust heating means provided in an exhaust system of the internal combustion engine and capable of heating exhaust gas, an accumulation amount detecting means capable of detecting that an accumulation amount of particulate matter in the particulate filter exceeds a predetermined amount, an exhaust temperature detecting means capable of detecting the exhaust temperature of the internal combustion engine, and a restoration operation control means for receiving outputs of the accumulation amount detecting means and the exhaust temperature detecting means, and executing any one of an intake air amount reducing operation by the intake air amount reducing means and an exhaust gas heating operation by the exhaust heating means with priority or executing both the intake air amount reducing operation and the exhaust gas heating operation simultaneously, when the accumulation amount of particulate matter in the particulate filter exceeds the predetermined amount and the exhaust temperature of the internal combustion engine is lower than the restoration operable temperature.

According to the thus-configured exhaust gas purification apparatus, particulate matter emitted along with exhaust gas during running of the internal combustion engine is collected by the particulate filter. Thereafter, when the running of the internal combustion engine is continued without the exhaust temperature reaching the restoration operable temperature, the accumulation amount of particulate matter in the particulate filter increases, likely leading to clogging of the particulate filter. Therefore, when the accumulation amount of particulate matter in the particulate filter exceeds a predetermined amount, i.e., clogging is likely to occur, and the exhaust temperature of the internal combustion engine is lower than the restoration operable temperature, i.e., the particulate filter is not spontaneously restored, the restoration operation control means starts the intake air amount reducing operation by the intake air amount reducing means or the exhaust gas heating operation by the exhaust heating means. One of these operations may be executed with priority before the other is executed, or alternatively, both the operations may be simultaneously executed. Thereby, the exhaust temperature reaches the restoration operable temperature, and particulate matter in the particulate filter is removed by oxidation, whereby the particulate filter is restored. Therefore, it is possible to increase the exhaust temperature to the restoration operable temperature or more without requirement of conventional post injection. In addition, even when the intake air amount cannot be reduced any more, because the engine is in the idle state, the exhaust temperature can be increased to the restoration operable temperature or more by the exhaust heating means. Therefore, the present invention is applicable to engines having a mechanical fuel injector, so that the reliability of the restoration operation can be improved by reliably increasing the exhaust gas temperature, independently of the type of a fuel injector.

Also, in the exhaust gas purification apparatus of the present invention, the restoration operation control means may execute any one of the intake air amount reducing operation by the intake air amount reducing means and the exhaust gas heating operation by the exhaust heating means with priority when the accumulation amount of particulate matter in the particulate filter exceeds the predetermined amount and the exhaust temperature of the internal combustion engine is lower than the restoration operable temperature, and thereafter, execute the other operation when the exhaust temperature of the internal combustion engine has not reached the restoration operable temperature.

For example, assuming that the intake air amount reducing operation by the intake air amount reducing means is performed with priority, when the exhaust temperature reaches the restoration operable temperature only by the intake air amount reducing operation, the exhaust gas heating operation by the exhaust heating means is no longer required. Therefore, the loss of energy (e.g., electrical energy) consumed by the exhaust heating means can be suppressed. Also, when the exhaust temperature is increased to the restoration operable temperature only by the exhaust gas heating operation by the exhaust heating means (e.g., an electric heater), a long time until the start of restoration may be required since the rising of the temperature increase is slow. However, if the intake air amount reducing operation is executed with priority, the exhaust gas temperature can be increased substantially at the same time of the intake air amount reducing operation.

On the other hand, assuming that the exhaust gas heating operation by the exhaust heating means is performed with priority, when the exhaust temperature reaches the restoration operable temperature only by the exhaust gas heating operation, the intake air amount reducing operation by the intake air amount reducing means is no longer required. Therefore, it is possible to suppress an increase in the amount of CO and THC generated along with a reduction in air intake amount. Also, by suppressing the pumping loss of the engine, a deterioration in fuel efficiency can be suppressed. Also, although there is a limit of the exhaust gas temperature which can be increased only by the intake air amount reducing operation (e.g., a temperature increase of only about 50 to 100 degrees), if the exhaust gas heating operation is performed with priority, the exhaust temperature can be reliably and significantly increased by the heating operation.

Also, in the exhaust gas purification apparatus of the present invention, a predetermined threshold value may be previously set for an intake air reduction amount by the intake air amount reducing means, and the intake air amount may not be decreased to be lower than the threshold value.

As the intake air amount is decreased by the intake air amount reducing operation by the intake air amount reducing means, a sufficient pressure in a cylinder is not obtained at a dead point of compression of the internal combustion engine. In this case, a time of ignition of air-fuel mixture may be significantly delayed, or misfire may occur. Therefore, a predetermined threshold value is previously set for an intake air amount which can be reduced, and the intake air amount is prevented from being reduced to be lower than the threshold value. Thereby, it is possible to avoid a situation where the internal combustion engine is suspended during a restoration operation of the particulate filter.

Also, in the exhaust gas purification apparatus of the present invention, a plurality of predetermined threshold values may be previously set for an intake air reduction amount by the intake air amount reducing means.

As the plurality of threshold values, a first threshold value corresponding to an intake air reduction amount when a CO and THC concentration of exhaust gas reaches a tolerance limit, and a second threshold value corresponding to an intake air reduction amount when the internal combustion engine reaches a run limit due to misfire, may be set. When the intake air reduction amount reaches the first threshold value during the intake air amount reducing operation by the intake air amount reducing means, the intake air amount reducing operation by the intake air amount reducing means may be switched to the exhaust gas heating operation by the exhaust heating means, and thereafter, when the exhaust temperature of the internal combustion engine still does not reach the restoration operable temperature, the intake air amount reducing operation by the intake air amount reducing means may be resumed with the second threshold value being a limit of the intake air reduction amount.

According to the thus-configured exhaust gas purification apparatus, when a restoration operation of the particulate filter is started, the intake air amount reducing operation by the intake air amount reducing means is initially started, and when the intake air reduction amount reaches the first threshold value (the intake air reduction amount reaches the first threshold value without the exhaust temperature reaching the restoration operable temperature), the intake air amount reducing operation by the intake air amount reducing means is switched to the exhaust gas heating operation by the exhaust heating means. Thereby, the exhaust gas temperature can be increased while the CO and THC concentration of exhaust gas is suppressed to a tolerance limit or less. Thereafter, when the exhaust temperature still does not reach the restoration operable temperature, the intake air amount reducing operation by the intake air amount reducing means is resumed. This operation is performed with the second threshold value being a limit of the intake air reduction amount. Therefore, the internal combustion engine is prevented from being suspended during a restoration operation of the particulate filter.

Also, the plurality of threshold values may be changed, depending on various conditions. For example, the plurality of threshold values may be changed, depending on a load and a revolution number of the internal combustion engine, or a cetane number of a fuel used in the internal combustion engine.

Specifically, when the running state of the internal combustion engine changes or a fuel having a different cetane number is used in the internal combustion engine, the CO and THC generation amount or the delay amount of an ignition time of air-fuel mixture changes with respect to the intake air reduction amount. In this case, therefore, an intake air reduction amount when the CO and THC concentration of exhaust gas reaches a tolerance limit, or an intake air reduction amount when the internal combustion engine reaches the run limit due to misfire, also takes a different value. Therefore, by changing the threshold value, depending on the running state of the internal combustion engine or the cetane number of a fuel, a restoration operation of the particulate filter can be executed while the CO and THC generation amount is suppressed within a tolerance range.

Also, in the exhaust gas purification apparatus of the present invention, the exhaust heating means may comprise an electric heater which uses electric power generated by an output of the internal combustion engine.

Further, when a difference between a maximum output of the internal combustion engine and a required output of the internal combustion engine is smaller than an output to be used by the electric heater, the exhaust gas heating operation by the electric heater may be limited or forbidden.

According to the thus configured exhaust gas purification apparatus, for example, when the present invention is applied to a vehicle, a required output of the internal combustion engine can be obtained without a hindrance in the travel performance or the traction performance.

Also, in the exhaust gas purification apparatus of the present invention, the internal combustion engine may comprise an EGR device for recirculating exhaust gas to an air intake side of the internal combustion engine, the EGR device having an EGR path capable of causing an exhaust side and the air intake side of the internal combustion engine to be in communication with each other and an EGR valve capable of changing a path area of the EGR path. During the intake air amount reducing operation by the intake air amount reducing means, as the intake air reduction amount is increased, the opening degree of the EGR valve may be reduced.

According to the thus-configured exhaust gas purification apparatus, even when a pressure at the air intake side is reduced by the intake air amount reducing operation by the intake air amount reducing means during restoration of the particulate filter, the opening degree of the EGR valve is reduced, depending on the reduction of the pressure, thereby making it possible to maintain a constant exhaust recirculation rate. As a result, the combustion state of air-fuel mixture can be satisfactorily maintained.

Also, in the exhaust gas purification apparatus of the present invention, a running state of the internal combustion engine may be monitored, and when a change amount of the running state exceeds a predetermined amount, the EGR valve may be completely closed.

This is because, when the opening degree of the EGR valve is changed during restoration of the particulate filter, depending on the intake air reduction amount by the intake air amount reducing means, the EGR recirculation amount is slightly delayed with respect to the intake air amount reducing operation. In other words, when the running state of the internal combustion engine, such as the revolution number of the engine or the engine torque, significantly changes, the operation of changing the opening degree of the EGR valve may have an adverse influence on the combustion state of air-fuel mixture. Therefore, when a change amount of the running state of the internal combustion engine exceeds a predetermined amount, the EGR valve is completely closed, thereby making it possible to avoid faulty combustion.

Also, in the exhaust gas purification apparatus of the present invention, the internal combustion engine may comprise a turbocharger for compressing intake air using fluid energy of exhaust gas. As the plurality of threshold values, a first threshold value corresponding to an intake air reduction amount when a CO and THC concentration of exhaust gas reaches a tolerance limit, and a second threshold value corresponding to an intake air reduction amount when surging of the turbocharger occurs, may be set. When the intake air reduction amount reaches the first threshold value during the intake air amount reducing operation by the intake air amount reducing means, the intake air amount reducing operation by the intake air amount reducing means may be switched to the exhaust gas heating operation by the exhaust heating means, and thereafter, when the exhaust temperature of the internal combustion engine still does not reach the restoration operable temperature, the intake air amount reducing operation by the intake air amount reducing means may be resumed with the second threshold value being a limit of the intake air reduction amount.

According to the thus-configured exhaust gas purification apparatus, in the internal combustion engine comprising the turbocharger, surging of the turbocharger is prevented from occurring during a restoration operation of the particulate filter, thereby making it possible to perform the restoration operation of the particulate filter while the internal combustion engine is stably run.

Also, in the exhaust gas purification apparatus of the present invention, the internal combustion engine may comprise a turbocharger for compressing intake air using fluid energy of exhaust gas, and a waste gate valve for performing an open operation so as to cause exhaust gas to bypass the turbocharger or an air intake bypass valve for performing an open operation so as to cause intake air to bypass the turbocharger. As the plurality of threshold values, a first threshold value corresponding to an intake air reduction amount when a CO and THC concentration of exhaust gas reaches a tolerance limit, a second threshold value corresponding to an intake air reduction amount when surging of the turbocharger occurs while the waste gate valve or the air intake bypass valve is completely closed, and a third threshold value corresponding to an intake air reduction amount when the internal combustion engine reaches a run limit due to misfire while the waste gate valve or the air intake bypass valve is opened, may be set. When the intake air reduction amount reaches the first threshold value during the intake air amount reducing operation by the intake air amount reducing means, the intake air amount reducing operation by the intake air amount reducing means may be switched to the exhaust gas heating operation by the exhaust heating means, and thereafter, when the exhaust temperature of the internal combustion engine still does not reach the restoration operable temperature, the intake air amount reducing operation by the intake air amount reducing means may be resumed while the waste gate valve or the air intake bypass valve is completely closed, and when the intake air reduction amount reaches the second threshold value, the intake air amount reducing operation by the intake air amount reducing means may be continued with the third threshold value being a limit of the intake air reduction amount while the waste gate valve or the air intake bypass valve is opened.

According to the thus-configured exhaust gas purification apparatus, even when surging of the turbocharger occurs, the intake air amount can be reduced to increase the exhaust temperature to the restoration operable temperature while the waste gate valve or the air intake bypass valve is opened to remove turbocharging and thereby eliminate surging.

Also, in the exhaust gas purification apparatus of the present invention, the accumulation amount detecting means may be capable of detecting that the accumulation amount of particulate matter exceeds the predetermined amount, by obtaining a difference between a state of the particulate filter based on a load of the internal combustion engine and a revolution number of the internal combustion engine when the particulate filter is in a normal state, and a state of the particulate filter based on a load of the internal combustion engine and a revolution number of the internal combustion engine when the particulate filter is in a current state.

As used herein, the normal state of the particulate filter refers to, for example, a state in which PM is not accumulated in the particulate filter (the particulate filter is brand-new). Specifically, by obtaining a difference between the normal state of the particulate filter, and the current state of the particulate filter based on a load of the internal combustion engine and a revolution number of the internal combustion engine the current accumulation amount of particulate matter in the particulate filter can be estimated, thereby making it possible to determine whether or not the particulate matter accumulation amount has exceeded a predetermined amount. For example, this determination can be achieved by detection and comparison of a pressure immediately upstream from the particulate filter.

Also, in the exhaust gas purification apparatus of the present invention, the accumulation amount detecting means may estimate the accumulation amount of particulate matter based on a pressure upstream from the particulate filter, estimate an internal temperature of the particulate filter based on the exhaust temperature, and correct the accumulation amount using a correction amount determined based on the particulate filter internal temperature and the particulate filter upstream pressure.

The particulate filter upstream pressure increases as the particulate filter internal temperature increases. Therefore, when the particulate matter accumulation amount is estimated based on the particulate filter upstream pressure, not only this pressure but also the particulate filter internal temperature need to be taken into consideration. Also, when the exhaust temperature is increasing, the actual increase rate of the particulate filter internal temperature is delayed by a value corresponding to the heat capacity of the particulate filter from the increase rate of the exhaust temperature. Therefore, in view of these points, the particulate filter internal temperature is estimated based on the exhaust temperature, and the accumulation amount is corrected using a correction amount determined based on the particulate filter internal temperature and the particulate filter upstream pressure. Thereby, the particulate matter accumulation amount can be more correctly estimated.

Also, in the exhaust gas purification apparatus of the present invention, the accumulation amount detecting means may be a pressure sensor for detecting a pressure upstream from the particulate filter. The restoration operation control means, when the particulate filter upstream pressure reaches a restoration starting pressure, may start a restoration operation, integrate a fuel injection amount of the internal combustion engine since the particulate filter in a brand-new state is attached, and update the restoration starting pressure with a gradually increasing value, depending on the integration value.

According to the thus-configured exhaust gas purification apparatus, even if particulate matter which cannot be removed by a restoration operation is accumulated in the particulate filter, so that a pressure immediately upstream from the particulate filter becomes higher than that when the particulate filter is brand-new even when a restoration operation is completed, restoration operations can be executed in constant intervals without an influence of the particulate matter. In addition, it is possible to avoid a situation where the restoration operation cannot be ended.

Also, in the exhaust gas purification apparatus of the present invention, the restoration operation control means may update a target restoration temperature with a higher temperature when the particulate filter upstream pressure has exceeded a predetermined pressure upon completion of a restoration operation of the particulate filter.

According to the thus-configured exhaust gas purification apparatus, particulate matter which remains in an outer circumferential portion of the particulate filter which is particularly likely to have a low temperature can be effectively removed, thereby making it possible to execute restoration operations in constant intervals without an increase in frequency of the restoration operation.

Also, in the exhaust gas purification apparatus of the present invention, the accumulation amount detecting means may be a pressure sensor for detecting a pressure upstream from the particulate filter. The restoration operation control means, when the particulate filter upstream pressure reaches a restoration ending pressure, may end a restoration operation, integrate a fuel injection amount of the internal combustion engine since the particulate filter in a brand-new state is attached, and update the restoration ending pressure with a gradually increasing value, depending on the integration value.

If a restoration operation is ended when a predetermined time has passed since the start of the restoration operation, the restoration operation may be continued, though restoration has been sufficiently done, so that a useless restoration operation may be performed, or the restoration operation may be ended, though restoration has not yet been completed. In contrast to this, according to the exhaust gas purification apparatus configured above, the restoration ending pressure is updated, taking into consideration that particulate matter which cannot be removed by a restoration operation is accumulated in the particulate, filter. Therefore, the situation where a useless restoration operation is performed and the situation where the restoration operation is ended, though restoration has not yet been completed, can be avoided, thereby making it possible to improve the reliability of the restoration operation.

Also, in the exhaust gas purification apparatus of the present invention, the restoration operation control means may update the target restoration temperature with a lower temperature when the particulate filter upstream pressure sharply decreases during a restoration operation of the particulate filter.

According to the thus-configured exhaust gas purification apparatus, it is possible to avoid a situation where a temperature at which a restoration operation is executed is maintained high, so that heat is significantly generated in the particulate filter, leading to an abnormal restoration which damages the particulate filter.

Also, in the exhaust gas purification apparatus of the present invention, the restoration operation control means may suspend a restoration operation of the particulate filter when the particulate filter upstream pressure sharply decreases during the restoration operation.

According to the thus-configured exhaust gas purification apparatus, it is possible to reliably avoid damage of the particulate filter.

Also, in the exhaust gas purification apparatus of the present invention, the exhaust system of the internal combustion engine may comprise an exhaust throttling means capable of closing an exhaust pipe. The restoration operation control means, when suspending the internal combustion engine, may interrupt intake air using the intake air amount reducing means, and close the exhaust pipe.

Also, in the exhaust gas purification apparatus of the present invention, the exhaust system of the internal combustion engine may comprise an exhaust throttling means capable of closing an exhaust pipe. The restoration operation control means, when suspending the internal combustion engine, may interrupt intake air using the intake air amount reducing means, close the exhaust pipe, and execute a fuel injection operation.

According to the thus-configured exhaust gas purification apparatus, air (oxygen) can be prevented from being introduced from the intake system and the exhaust system to the DPF 33, thereby making it possible to avoid a situation where a restoration reaction of the particulate filter proceeds, leading to melting damage. In addition, by executing a fuel injection operation when the internal combustion engine is suspended, oxygen remaining in a cylinder is subjected to combustion, thereby making it possible to reliably avoid the progress of the restoration reaction of the particulate filter.

Also, an internal combustion engine according to the present invention is an internal combustion engine comprising any one of the exhaust gas purification apparatuses described above, in which, when the accumulation amount of particulate matter in the particulate filter exceeds the predetermined amount, and the exhaust temperature of the internal combustion engine is lower than the restoration operable temperature, any one of the intake air amount reducing operation by the intake air amount reducing means and the exhaust gas heating operation by the exhaust heating means is executed with priority or both of the intake air amount reducing operation and the exhaust gas heating operation are executed simultaneously, thereby restoring the particulate filter.

Also, a particulate filter restoring method according to the present invention is a particulate filter restoring method performed by any one of the exhaust gas purification apparatuses described above, in which, when the accumulation amount of particulate matter in the particulate filter exceeds the predetermined amount, and the exhaust temperature of the internal combustion engine is lower than the restoration operable temperature, any one of the intake air amount reducing operation by the intake air amount reducing means and the exhaust gas heating operation by the exhaust heating means is executed with priority or both of the intake air amount reducing operation and the exhaust gas heating operation are executed simultaneously, thereby restoring the particulate filter.

Alternatively, an exhaust gas purification apparatus according to the present invention comprises a particulate filter for collecting particulate matter in exhaust gas of an internal combustion engine by passing the exhaust gas from a primary side to a secondary side, the entirety or at least a portion of a surface of the primary side of the particulate filter being made of a nonconductive material, an electrical resistance detecting means for detecting an electrical resistance between at least two points of the portion made of the nonconductive material of the particulate filter, and an accumulation amount estimating means for receiving an output from the electrical resistance detecting means and estimating an accumulation amount of particulate matter in the particulate filter.

PM contained in exhaust gas emitted out from an internal combustion engine includes soot made of carbon (C) as a major component, unburned fuel oil and lubricating oil, and the like, and has "conductivity". In the exhaust gas purification apparatus configured above, a filter made of a nonconductive material, such as a ceramic material (e.g., SiC, etc.) or the like, is employed. A change in electrical resistance due to accumulation of PM between, for example, two points in the nonconductive material portion is detected by the electrical resistance detecting means.

While the internal combustion engine is run, the filter collects PM in exhaust gas of the internal combustion engine by causing the exhaust gas to pass from the primary side to the secondary side. In other words, conductive PM is accumulated on a surface of the primary side of the filter. When the accumulation amount of PM becomes large, the surface between the two points whose electrical resistance is to be detected becomes conductive. As the PM accumulation amount further increases, the accumulation thickness increases and the electrical resistance value gradually decreases. Therefore, a change in the electrical resistance value is detected by the electrical resistance detecting means, and the detection signal is received by the accumulation amount estimating means, thereby making it possible to recognize that the PM accumulation amount has become large.

As described above, in the exhaust gas purification apparatus configured above, the conductivity of PM is effectively utilized, thereby making it possible to recognize the PM accumulation amount. Therefore, a high level of reliability of the PM accumulation amount detecting operation can be obtained as compared to the conventional art in which a pressure difference between an upstream side and a downstream side of the filter is detected by a pressure sensor, or a PM generation amount corresponding to a running state of the internal combustion engine or the like is read from a map. Also, a relatively simple configuration in which wires (conductive wires) for detecting an electrical resistance are connected to a filter surface can be employed, resulting in a high level of practicability.

Also, according to the exhaust gas purification apparatus configured above, a running state (a revolution number and a load) of the internal combustion engine does not need to be detected. Therefore, the PM accumulation amount can be correctly recognized in internal combustion engines employing a mechanical fuel injection system which does not comprise means for detecting the revolution number and the load. Also, there is no erroneous operation due to a failure of a sensor for detecting the revolution number or the load, thereby making it possible to obtain a high level of reliability.

Although the case where the whole filter is made of a nonconductive material has been described above, substantially the whole filter may be made of a conductive material, while only a portion of the surface of the primary side may be made of a nonconductive material, and an electrical resistance between at least two points of the nonconductive material portion may be detected by the electrical resistance detecting means. For example, a nonconductive material may be applied to two portions separated by a predetermined distance on a surface of a primary side of a metal filter, and an electrical wire is connected to the two portions so that an electrical resistance between the two points may be detected.

Also, in the exhaust gas purification apparatus of the present invention, at least two electrical resistance detecting means may be provided.

According to the thus-configured exhaust gas purification apparatus, even if disconnection occurs in an electrical wire of one electrical resistance detecting means, the other electrical resistance detecting means can detect an electrical resistance on the filter, thereby making it possible to secure the reliability of the PM accumulation amount detecting operation. Also, when the disconnection occurs in one electrical resistance detecting means, an electrical resistance value detected by the electrical resistance detecting means continues to be infinite. By recognizing this, it can be readily recognized that disconnection occurs in the electrical resistance detecting means.

Further, assuming that at least two electrical resistance detecting means are provided as in the exhaust gas purification apparatus configured above, when electrical resistance values detected by the plurality of electrical resistance detecting means are all finite and different from each other, a lowest detected electrical resistance value is preferably recognized as a true electrical resistance value. This is to address nonuniform accumulation (biased accumulation) of PM with respect to the filter. Of portions where an electrical resistance is detected, a portion having a largest PM accumulation amount (a portion having a low electrical resistance) is used as a reference to determine timing of starting a filter restoration operation. If a detected electrical resistance value which is higher than an electrical resistance value detected by another electrical resistance detecting means as a true electrical resistance value, PM may be excessively accumulated at the other portion (a portion where a low electrical resistance value is detected), so that a temperature may excessively increase at the portion during a filter restoration operation, likely leading to damage of the filter. To avoid this situation, as described above, a lowest detected electrical resistance value (an electrical resistance value at a portion where PM is most accumulated) is recognized as a true electrical resistance value.

Also, in the exhaust gas purification apparatus of the present invention, the electrical resistance detecting means may be adapted to detect electrical resistances between at least three points of the nonconductive material portion of the particulate filter.

For example, assuming that electrical resistances between three points (here referred to as points X, Y and Z on the filter) are detected, when no disconnection occurs in electrical wires connected to the points, $$r1=r2=r3=r$$

where r1, r2 and r3 represent resistance values between the points (in the absence of biased accumulation). Electrical resistance values detected between the points are represented by:

$$R(X,Y)=R(Y,Z)=R(Z,X)=R=(\tfrac{2}{3})r$$

where R(X, Y) represents a resistance value between "point X" and "point Y", R(Y, Z) represents a resistance value between "point Y" and "point Z", and R(Z, X) represents a resistance value between "point Z" and "point X".

When disconnection occurs in one electrical wire (disconnection in an electrical wire connected to "point X"), $$R(X,Y)=\infty$$

$$R(Z,X)=\infty$$

$$R(Y,Z)=r.$$

The electrical resistance value of R(Y, Z) suddenly increases by a factor of 1.5 (1.5 times higher than when disconnection does not occur). Therefore, according to the exhaust gas purification apparatus configured above, by recognizing such a sharp increase in the electrical resistance value, disconnection in an electrical wire can be readily recognized.

Note that, even in such a configuration for detecting electrical resistances between three points of the nonconductive material portion on the particulate filter, a lowest detected electrical resistance value is preferably recognized as a true electrical resistance value as described above.

Also, in the exhaust gas purification apparatus of the present invention, the electrical resistance detecting means may be adapted to be capable of measuring a particulate filter surface temperature of a point where an electrical resistance is to be measured (a point to which the electrical wire is connected).

Specifically, for example, an electrical wire (the above-described electrical resistance measuring wire) and an electrical wire made of a material different from that of the above-described electrical resistance measuring wire, are connected to the point subjected to measurement of the electrical resistance, and a closed circuit is formed of both the electrical wires to measure a voltage of the circuit. For example, a function as a thermocouple is added to an electrical resistance measuring probe.

According to the thus-configured exhaust gas purification apparatus, the electrical resistance is measured between an electrical resistance measuring wire of a negative probe on thermocouple side and another probe. The thermocouple-side probe is used to measure a temperature at a point whose electrical resistance is to be measured, thereby making it possible to determine whether or not a restoration operation is normally performed (a restoration operation is performed at an appropriate temperature). Also, when a plurality of electrical resistance detecting means are provided and are each provided with a function as a thermocouple, temperatures of a plurality of portions on the filter can be measured during a restoration operation, thereby making it possible to recognize the presence or absence of biased temperature of the filter. When the biased temperature occurs, it can be determined that biased accumulation of PM occurs (a state which requires maintenance). In other words, by adding a temperature measuring function to the electrical resistance detecting means, it can be determined whether or not the maintenance of the filter is required.

Also, in the exhaust gas purification apparatus of the present invention, the accumulation amount estimating means may perform a correction calculation based on a temperature of the particulate filter with respect to the electrical resistance detected by the electrical resistance detecting means, thereby estimating the accumulation amount of particulate matter. Such a configuration is preferable because the electrical resistance value varies depending on the filter temperature.

As can be seen from a relationship between filter temperatures and electrical resistance values in FIG. 6, even when the PM accumulation amount is the same, the higher the filter temperature, the lower the electrical resistance value. In view of this, for example, a correction calculation is performed using the following correction expression, thereby making it possible to estimate the particulate matter accumulation amount with high accuracy.

$$R=aT^2+bT+c$$

R: electrical resistance value, T: filter temperature, a, b, c: coefficients

Note that, when the PM accumulation amount is calculated based on the filter temperature in this manner, a thermocouple integrated with the electrical resistance detecting means as described above may be used or separate temperature sensors may be used as a means for measuring the filter temperature.

Also, in the exhaust gas purification apparatus of the present invention, when the particulate matter accumulation amount estimated by the accumulation amount estimating means exceeds a predetermined restoration starting accumulation amount, a filter restoration operation may be started, and when the particulate matter accumulation amount estimated by the accumulation amount estimating means becomes lower than a predetermined restoration ending accumulation amount, the filter restoration operation may be suspended.

In this case, an electrical resistance value corresponding to the restoration starting accumulation amount and an electrical resistance value corresponding to the restoration ending accumulation amount are previously set. Regarding these electrical resistance values, it is preferable that the latter electrical resistance value be set to be higher, thereby suppressing so-called hunting that start and suspension of a filter restoration operation are frequently repeated.

Conventionally, a filter restoration operation during running of an internal combustion engine is generally performed by monitoring differential pressure detection values of the pressure sensor, and when the value reaches a predetermined value or more, increasing the exhaust temperature by reducing an air intake amount or changing a fuel injection time or its pattern. The reduction of the air intake amount and the changing of the fuel injection time or its pattern themselves change a differential pressure between the upstream side and the downstream side of the filter, so that it is difficult to estimate the correct PM accumulation amount based on the differential pressure detection value. Also, the fuel efficiency of the internal combustion engine may be deteriorated. According to the exhaust gas purification apparatus configured above, these drawbacks can be avoided, thereby making it possible to correctly estimate the PM accumulation amount and improve the fuel efficiency of the internal combustion engine.

Also, in the exhaust gas purification apparatus of the present invention, when a change rate of an electrical resistance value detected by the electrical resistance detecting means during execution of a filter restoration operation exceeds a predetermined abnormality determination change rate, the filter restoration operation may be suspended.

When the change rate of the electrical resistance value detected by the electrical resistance detecting means thus exceeds the predetermined abnormality determination change rate, i.e., the change rate of the electrical resistance value on the filter is sharp, "abnormal restoration" that a portion of the filter locally has an abnormally high temperature may occur. When the "abnormal restoration" state is continued, melting damage of the filter is likely to occur. Therefore, the filter restoration operation is ended when the change rate of the electrical resistance value becomes high. Thereby, the life of the filter can be extended.

Also, the exhaust gas purification apparatus of the present invention may comprise a pressure sensor for detecting a pressure difference between an upstream side and a downstream side of the particulate filter, and a maintenance determining means for receiving an output from the pressure sensor and an output from the electrical resistance detecting means, and based on the outputs, determining whether or not the particulate filter requires maintenance.

In general, examples of matter accumulated on the particulate filter include matter which cannot be removed (e.g., ash due to attachment of lubricating oil, engine abrasion powder, etc.) in addition to the above-described PM which can be removed by a restoration operation. When an accumulation state is monitored only by detecting a differential pressure using a pressure sensor, it is difficult to determine whether an increase in the differential pressure is caused by the above-described PM or by engine abrasion powder or the like. To achieve this, it is necessary to determine the necessity of maintenance, such as purification of the filter or the like, based on the total run time of the engine. In contrast to this, according to the exhaust gas purification apparatus configured above, for example, when a differential pressure detected by the pressure sensor is relatively high and an electrical resistance value on the filter detected by the electrical resistance detecting means is relatively low, it can be determined that the accumulation amount of PM which can be removed by a restoration operation is large. On the other hand, when a differential pressure detected by the pressure sensor is relatively high and an electrical resistance value detected on the filter by the electrical resistance detecting means is relatively high, it can be determined that the accumulation amount of PM which cannot be removed by a restoration operation is large. Therefore, it is easy to determine whether the filter can be cleaned by execution of a restoration operation or the maintenance of the particulate filter is required.

Also, in the exhaust gas purification apparatus of the present invention, when the particulate matter accumulation amount estimated by the accumulation amount estimating means exceeds the predetermined restoration starting accumulation amount, a filter restoration operation may be started, and a filter restoration operating condition may be determined based on the measured particulate filter surface temperature.

According to the thus-configured exhaust gas purification apparatus, the filter surface temperature is measured at the same time when a PM accumulation amount is detected. A restoration operation is started after determining filter restoration operation conditions (e.g., a restoration operation continuation time, a reduction in air intake amount, a change amount in the fuel injection time, etc.) based on a difference between the filter surface temperature upon the start of a restoration operation and the restoration target temperature. Thereby, a filter restoration operation can be executed under appropriate conditions, thereby making it possible to minimize and suppress a deterioration in fuel efficiency due to the restoration operation.

Also, in the exhaust gas purification apparatus of the present invention, when a filter temperature upon activation of the internal combustion engine is lower than or equal to a predetermined temperature, a filter restoration operation may be forcedly forbidden.

For example, in a particulate filter for which a catalytic reaction is used, assuming that the filter temperature is lower than or equal to a predetermined temperature (cold state) upon the start of the internal combustion engine, if a filter restoration operation, such as reduction of the air intake amount, changing of the fuel injection time or its pattern, or the like, is executed, CO or THC does not react with a catalyst due to incomplete combustion of air-fuel mixture, so that CO or THC is emitted, as it is, to the atmosphere, resulting in irritating odor. Therefore, the filter restoration operation is forcedly forbidden during the cold state so as to suppress incomplete combustion of air-fuel mixture, thereby reducing the emission amount of CO and THC.

An internal combustion engine comprising any one of the above-described exhaust gas purification apparatuses is also within the scope of the present invention.

Effects of the Invention

According to the exhaust gas purification apparatus of the present invention and the internal combustion engine comprising the exhaust gas purification apparatus, a restoration operation for a particulate filter can be performed in a more appropriate manner and with more appropriate timing.

It is possible to increase the exhaust temperature to the restoration operable temperature or more without requirement of conventional post injection. In addition, even when the intake air amount cannot be reduced any more, because the engine is in the idle state, the exhaust temperature can be increased to the restoration operable temperature or more by the exhaust heating means. As a result, the present invention is applicable to engines having a mechanical fuel injector, so that the versatility of the particulate filter is increased, and in addition, the exhaust gas temperature can be reliably increased, resulting in an improvement in the reliability of the restoration operation.

The reliability of the PM accumulation amount detecting operation can be improved as compared to the conventional art in which a pressure difference between an upstream side and a downstream side of the filter is detected by a pressure sensor, or a PM generation amount or the like corresponding to a running state of the internal combustion engine is read out and calculated from a map. In addition, the present invention provides a relatively simple configuration in which wires (conductive wires) for detecting an electrical resistance are connected to the filter, thereby making it possible to improve the practicability.

BRIEF DESCRIPTION OF DRAWINGS

FIG. 24(a) is a cross-sectional view showing an inner portion of a DPF before the start of a restoration operation. FIG. 24(b) is a cross-sectional view of the inner portion of the DPF after the restoration operation, indicating that PM is accumulated in an outer circumferential portion thereof.

Figure 1:
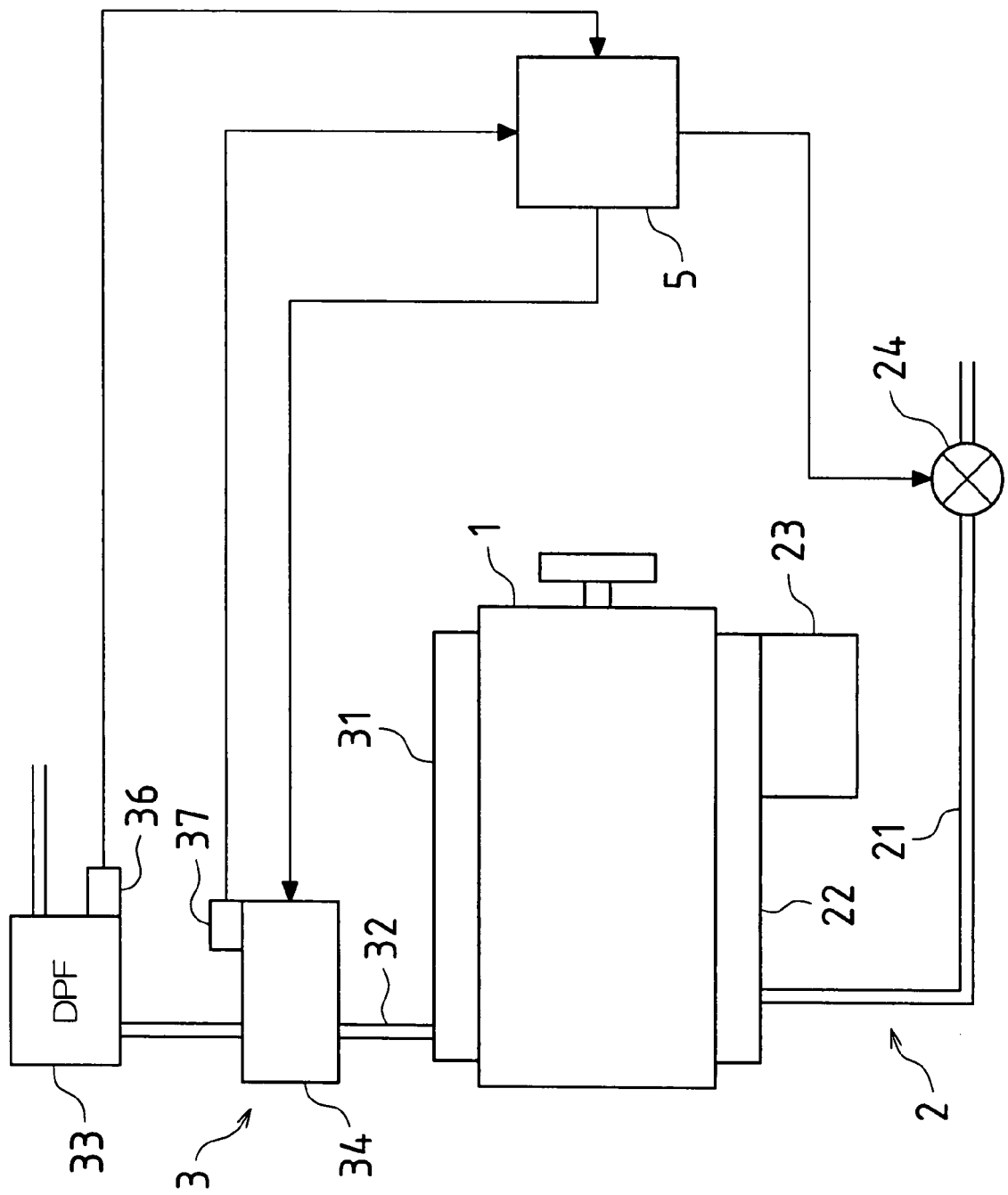
FIG. 1 is a schematic diagram roughly showing a configuration of an engine and a control system for restoring a DPF according to an embodiment.

DESCRIPTION OF REFERENCE NUMERALS 1 engine main body
2 air intake system
21 air intake pipe
22 air intake manifold
23 fuel pump
24 air intake throttling device
3 exhaust system
31 exhaust manifold
32 exhaust pipe
33 DPF (particulate filter)
34 exhaust temperature increasing device (exhaust heating means), electric heater
35 filter main body
36 PM accumulation amount detecting sensor
36A PM accumulation amount detecting sensor
36B PM accumulation amount detecting sensor
36c electrical resistance detecting sensor (electrical resistance detecting means)
37 exhaust temperature detecting sensor (exhaust temperature detecting means)
38 exhaust throttling device (exhaust throttling means)
5 controller (restoration operation control means)
61 alternator
62 electric generator
71 EGR path
72 EGR valve
8 turbocharger
81 waste gate valve
82 bypass path

BEST MODE FOR CARRYING OUT THE INVENTION

Hereinafter, embodiments of the present invention will be described with reference to the accompanying drawings. In the embodiments, the present invention is applied to an exhaust gas purification apparatus comprising a diesel particulate filter (hereinafter referred to a DPF) which is provided in a diesel engine for a tractor. Note that the present invention is not limited to diesel engines, and may be applied to gas engines, gasoline engines, and the like. The present invention may also be applied to engines provided in automobiles, electric generators, and the like.

Before describing the embodiments of the present invention, a basic configuration of an engine according to the embodiments will be roughly described.

—Configuration of Engine and DPF Restoration Control System—

FIG. 1 is a schematic diagram roughly showing a configuration of an engine and a control system for restoring a DPF according to an embodiment. As shown in FIG. 1, in the engine, an air intake system 2 is connected to one side of an engine main body 1 (a lower portion of FIG. 1), while an exhaust system 3 is connected to the other side (an upper portion of FIG. 1).

The air intake system 2 comprises an air intake pipe 21, an air intake manifold 22, and a fuel pump 23. Air is introduced via the air intake pipe 21 and the air intake manifold 22 to a cylinder (a cylinder during an intake stroke) of the engine main body 1, and thereafter, upon completion of a compression stroke of the cylinder, a fuel is pneumatically transmitted from the fuel pump 23 to a combustion chamber (antechamber), thereby carrying out an expansion stroke along with autoignition combustion of air-fuel mixture in the combustion chamber.

The air intake system 2 is characterized in that the air intake pipe 21 is provided with an air intake throttling device 24. Specifically, the air intake throttling device 24 comprises a butterfly valve and an actuator which rotates the butterfly valve to change a flow path area of the air intake pipe 21 (both not shown). Note that this valve mechanism is not limited to butterfly valves, and shutter valves and the like are applicable.

On the other hand, the exhaust system 3 comprises an exhaust manifold 31 and an exhaust pipe 32. In an exhaust stroke after the expansion stroke, exhaust gas is emitted from the cylinder to the exhaust manifold 31, and thereafter, is emitted via the exhaust pipe 32 to the atmosphere. The exhaust pipe 32 is provided with a DPF 33 for collecting PM included in the exhaust gas. The DPF 33 comprises a casing and a filter main body housed in the casing. The filter main body has a honeycomb structure which has a number of cells separated with partition walls having filtering ability. Specifically, for example, one of end portions is closed in some cells, while the other end is closed in the other cells. When exhaust gas is transmitted between cells, PM is collected. The filter main body is made of a material having heat resistance, oxidation resistance, and thermal shock resistance. Applicable examples of such a material include porous cordierite ceramics, silicon carbide, alumina, mullite, silicon nitride, sintered alloy, and the like. The filter main body also has an oxidation catalyst, such as platinum or the like. In the DPF 33, when an exhaust gas temperature exceeds a predetermined temperature (e.g., 300° C.; hereinafter referred to as a "restoration operable temperature"), the chemical reaction is carried out, so that PM is removed by oxidation, whereby the DPF 33 is restored.

The exhaust system 3 is characterized in that an exhaust temperature increasing device (exhaust heating means) 34 is provided upstream from the DPF 33 of the exhaust pipe 32. The exhaust temperature increasing device 34, which is comprised of an electric heater, receives electric power from an electric generator (alternator; not shown) and generates heat, thereby making it possible to heat exhaust gas flowing through the exhaust pipe 32. Specifically, exhaust gas may be indirectly heated by heating the exhaust pipe 32, or may be directly heated by providing a heater line in the exhaust pipe 32. Note that a flame burner may be applicable as the exhaust temperature increasing device 34.

Further, a PM accumulation amount detecting sensor 36 for detecting an amount of PM accumulated in the DPF 33 is attached to the DPF 33. An exhaust temperature detecting sensor (exhaust temperature detecting means) 37 for detecting the exhaust gas temperature is attached to the exhaust temperature increasing device 34. The exhaust temperature detecting sensor 37 may be provided in the exhaust temperature increasing device 34, or may be attached to the exhaust pipe 32 immediately upstream from the DPF 33.

Figure 2:
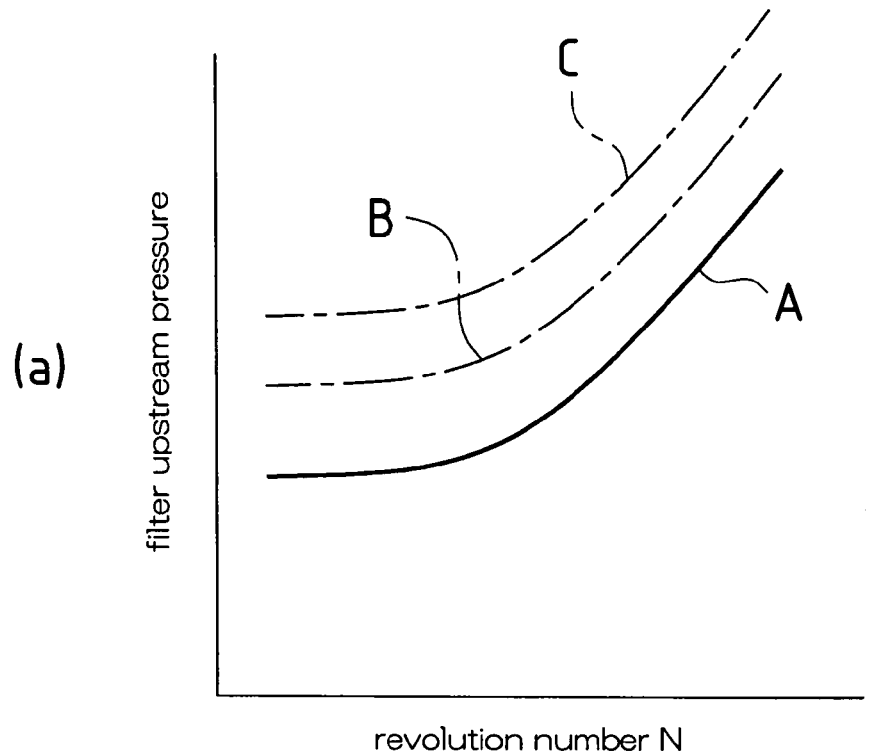
FIG. 2(a) is a diagram showing a relationship between the numbers of revolutions of the engine and pressures immediately upstream from the DPF when the engine torque is at predetermined values.
FIG. 2(b) is a diagram showing a relationship between engine loads and pressures immediately upstream from the DPF when the revolution number of the engine is at predetermined values.
Figure 2:
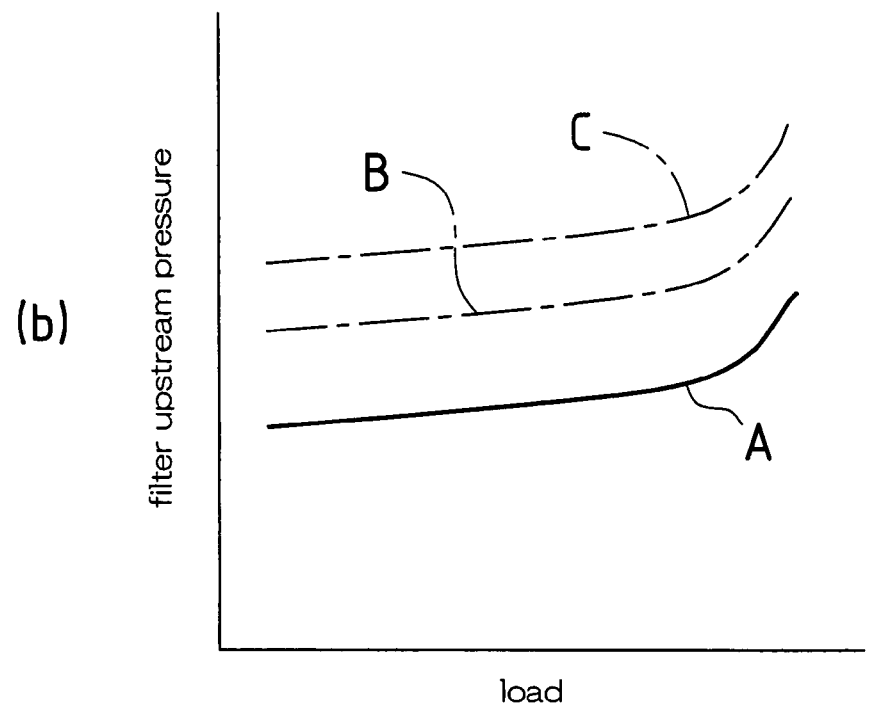

An operation of detecting the PM accumulation amount is performed by the PM accumulation amount detecting sensor 36 as follows. For example, the PM accumulation amount detecting sensor 36 is comprised of a pressure sensor, and the PM accumulation amount is determined by detecting a deviation of a current pressure from a pressure immediately upstream from the DPF 33 when no PM is accumulated in the DPF 33 (when the DPF 33 is brand-new). Hereinafter, a specific description will be given. FIG. 2(a) shows a relationship between the numbers of revolutions of the engine and pressures immediately upstream from the DPF 33 when the engine torque is at predetermined values (specific values). In FIG. 2(a), line A indicates characteristics when no PM is accumulated in the DPF 33. The PM accumulation amount can be detected by detecting a deviation of the current pressure from line A. For example, in FIG. 2(a), line B indicates characteristics when PM is accumulated in an amount corresponding to 20% of the capacity of the DPF 33, and line C indicates characteristics when PM is accumulated in an amount corresponding to 30%. In other words, the current PM accumulation amount can be detected by detecting the revolution number of the engine and the pressure immediately upstream from the DPF 33 under a condition that the engine torque is constant. Specifically, a controller (restoration operation control means) 5 receives a pressure signal from the PM accumulation amount detecting sensor 36 and an engine revolution number signal from an unshown engine revolution number sensor, and calculates the PM accumulation amount. Note that the PM accumulation amount may be detected only by the PM accumulation amount detecting sensor 36.

Alternatively, the PM accumulation amount can be detected based on a relationship between a load of the engine and the pressure immediately upstream from the DPF 33. FIG. 2(b) shows a relationship between engine loads and pressures immediately upstream from the DPF 33 when the revolution number of the engine is at predetermined values (specific values). In FIG. 2(b), line A indicates characteristics when no PM is accumulated in the DPF 33. The PM accumulation amount can be detected by detecting a deviation of the current pressure from line A. For example, in FIG. 2(b), line B indicates characteristics when PM is accumulated in an amount corresponding to 20% of the capacity of the DPF 33, and line C indicates characteristics when PM is accumulated in an amount corresponding to 30%. In other words, the current PM accumulation amount can be detected by detecting the engine load and the pressure immediately upstream from the DPF 33 under a condition that the revolution number of the engine is constant.

The engine is provided with a restoration controller 5 for controlling a restoration operation of the DPF 33. The controller 5 receives a PM accumulation amount detection signal (e.g., the pressure signal) transmitted from the PM accumulation amount detecting sensor 36 and an exhaust temperature detection signal transmitted from the exhaust temperature detecting sensor 37. The controller 5 also transmits control signals to the air intake throttling device 24 and the exhaust temperature increasing device 34 in accordance with the received PM accumulation amount detection signal and exhaust temperature detection signal. The actuator of the air intake throttling device 24 is activated in accordance with an air intake throttling control signal transmitted to the air intake throttling device 24, so that the butterfly valve is rotated so as to obtain an opening degree corresponding to the air intake throttling control signal. Also, the electric heater is ON/OFF controlled in accordance with an exhaust temperature increase control signal transmitted to the exhaust temperature increasing device 34, so that an operation of heating exhaust gas by the electric heater is controlled.

The configuration of the engine of the embodiments has been heretofore outlined. Next, each embodiment will be described.

First Embodiment

In this embodiment, the air intake throttling device 24 and the exhaust temperature increasing device 34 are controlled, depending the PM accumulation amount and the exhaust gas temperature in the DPF 33. Specifically, when the controller 5 receives the PM accumulation amount detection signal from the PM accumulation amount detecting sensor 36 and determines that the PM accumulation amount in the DPF 33 has exceeded a predetermined amount, and the controller 5 receives the exhaust temperature detection signal from the exhaust temperature detecting sensor 37 and determines that the exhaust gas temperature has not reached the restoration operable temperature (hereinafter, the case where these two conditions are satisfied is referred to as "the case where the exhaust temperature increase control start condition is satisfied"), one or both of the air intake throttling device 24 and the exhaust temperature increasing device 34 are activated to increase the exhaust gas temperature to the restoration operable temperature, thereby performing the restoration operation of the DPF 33 while continuing running the engine main body 1. Hereinafter, a plurality of specific operations will be described.

—Air Intake Throttling Priority Operation—

Firstly, an operation in which priority is given to an air intake throttling operation of the air intake throttling device 24 will be described. When the exhaust temperature increase control start condition is satisfied, the controller 5 initially transmits the air intake throttling control signal to the air intake throttling device 24. Thereby, the actuator of the air intake throttling device 24 is activated so that the butterfly valve is rotated to obtain an opening degree corresponding to the air intake throttling control signal, thereby reducing the flow path area of the air intake pipe 21. As a result, the intake air amount is reduced, so that the air-fuel ratio is enriched. Thereby, the combustion temperature in the combustion chamber increases, resulting in an increase in the exhaust gas temperature. When the exhaust gas temperature thereby reaches the restoration operable temperature, the DPF 33 is restored without activation of the exhaust temperature increasing device 34.

Even if a predetermined has passed since the execution of the restoration operation in which the air intake throttling device 24 is activated, the exhaust gas temperature which is detected by the exhaust temperature detecting sensor 37 may not reach the restoration operable temperature. In this case, the exhaust temperature increasing device 34 is activated.

Specifically, the controller 5 transmits the exhaust temperature increase control signal to the exhaust temperature increasing device 34. Thereby, the electric heater is turned ON, so that the operation of heating exhaust gas by the electric heater is started. As a result, the exhaust gas temperature is further increased. Thus, by the air intake throttling operation of the air intake throttling device 24 and the heating operation of the exhaust temperature increasing device 34 (electric heater), the exhaust gas temperature is caused to reach the restoration operable temperature, so that the DPF 33 is restored.

Figure 3:
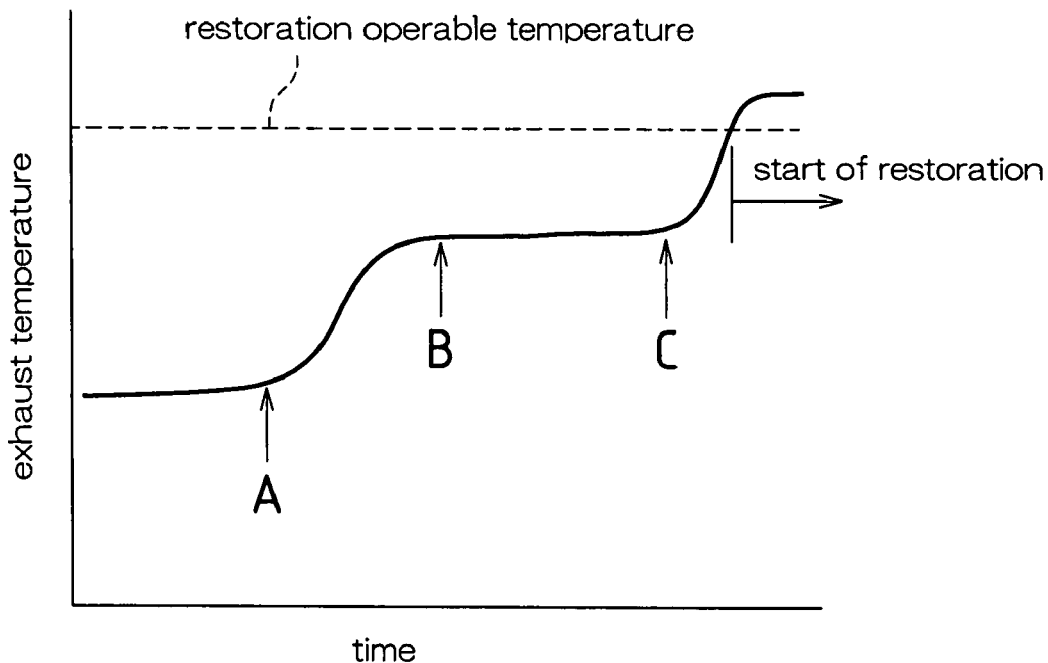
FIG. 3 is a diagram showing changes over time in an exhaust gas temperature when an air intake throttling operation is performed before a heating operation is performed, in an air intake throttling priority operation.

FIG. 3 is a diagram showing changes over time in the exhaust gas temperature when the air intake throttling operation is performed by the air intake throttling device 24 before the heating operation is performed by the exhaust temperature increasing device 34 in the air intake throttling priority operation. As can be seen from FIG. 3, the exhaust gas temperature temporarily increases immediately after the air intake throttling operation is started by the air intake throttling device 24 (the starting point is indicated by point A), and thereafter, the exhaust gas temperature reaches a limit of increase which can be attained only by the air intake throttling operation (temperature increase limit) (point B in FIG. 3). Thereafter, the heating operation is performed by the exhaust temperature increasing device 34 (the starting point of the heating operation is indicated by point C in FIG. 3), whereby the exhaust gas temperature is increased again to reach the restoration operable temperature (target temperature), so that the DPF 33 is restored.

According to the above-described air intake throttling priority operation, when the exhaust gas temperature reaches the restoration operable temperature by the air intake throttling operation of the air intake throttling device 24, the exhaust temperature increasing device 34 is not activated. Therefore, it is possible to suppress the loss of energy due to the passage of electric current through the electric heater. Also, if the exhaust gas temperature is caused to increase to the restoration operable temperature only due to heating by the exhaust temperature increasing device 34, the slow rising of the temperature increase of the electric heater is likely to elongate a time required until restoration is actually started. In contrast, according to this air intake throttling priority operation, the air intake throttling operation of the air intake throttling device 24 is first started, so that the exhaust gas temperature can be quickly increased.

—Exhaust Heating Priority Operation—

Next, an operation in which priority is given to heating of exhaust performed by the exhaust temperature increasing device 34 will be described. When the exhaust temperature increase control start condition is satisfied, the controller 5 initially transmits the exhaust temperature increase control signal to the exhaust temperature increasing device 34. Thereby, the electric heater is turned ON to start an operation of heating exhaust gas. As a result, the exhaust gas temperature is increased. When the exhaust gas temperature thereby reaches the restoration operable temperature, the DPF 33 is restored without an air intake throttling operation being performed by the air intake throttling device 24.

On the other hand, even if a predetermined time has passed since the activation of the exhaust temperature increasing device 34, the exhaust gas temperature detected by the exhaust temperature detecting sensor 37 may not reach the restoration operable temperature. In this case, the air intake throttling device 24 is activated. Specifically, the controller 5 transmits the air intake throttling control signal to the air intake throttling device 24. Thereby, the actuator of the air intake throttling device 24 is activated so that the butterfly valve is rotated to obtain an opening degree corresponding to the air intake throttling control signal, thereby reducing the flow path area of the air intake pipe 21. As a result, the intake air amount is reduced, so that the air-fuel ratio is enriched. Thereby, the combustion temperature in the combustion chamber increases, resulting in a further increase in the exhaust gas temperature. Thus, the exhaust gas temperature is caused to reach the restoration operable temperature by the heating operation of the exhaust temperature increasing device 34 and the air intake throttling operation of the air intake throttling device 24, so that the DPF 33 is restored.

Also, in the exhaust heating priority operation, as in the air intake throttling priority operation described with reference to FIG. 3, the exhaust gas temperature reaches the restoration operable temperature via the two steps of increasing the exhaust gas temperature (an increase in temperature by the heating operation of the exhaust temperature increasing device 34 and an increase in temperature by the air intake throttling operation of the air intake throttling device 24), so that the DPF 33 is restored.

According to the exhaust heating priority operation, when the exhaust gas temperature reaches the restoration operable temperature by the heating operation of the exhaust temperature increasing device 34, the air intake throttling device 24 is not activated. Therefore, it is possible to suppress an increase in the amount of CO and THC which are generated due to a reduction in the air intake amount. It is also possible to suppress a deterioration in fuel efficiency by suppressing the pumping loss of the engine. There is a limit of increase in the exhaust gas temperature which can be attained only by the air intake throttling operation (e.g., a temperature increase of only about 50 to 100 degrees). By the exhaust heating priority operation, the exhaust gas temperature can be reliably and significantly increased by the heating operation of the electric heater.

—Selection Between Air Intake Throttling Priority Operation and Exhaust Heating Priority Operation—

Any one of the air intake throttling priority operation and the exhaust heating priority operation may be previously set to be performed in an individual engine. In other words, an engine is produced so as to perform either the air intake throttling priority operation or the exhaust heating priority operation. Alternatively, the same engine may selectively perform the air intake throttling priority operation and the exhaust heating priority operation, depending on the running situation.

As the select operation, specifically, the controller 5 receives the exhaust temperature detection signal from the exhaust temperature detecting sensor 37, compares the detected exhaust gas temperature with the restoration operable temperature, and executes the air intake throttling priority operation when the exhaust gas temperature is slightly lower than the restoration operable temperature (e.g., the difference is less than 100 degrees). In this case, the exhaust gas temperature can be caused to reach the restoration operable temperature only by the air intake throttling operation of the air intake throttling device 24, i.e., the heating activation of the exhaust temperature increasing device 34 does not need to be performed.

On the other hand, when the load of the engine sharply increases (e.g., climbing a slope), the exhaust heating priority operation is executed. This is because, if the air intake amount is reduced when the engine load sharply increases, the engine is likely to stall, and therefore, priority is given to the heating operation of the exhaust temperature increasing device 34, thereby securing the air intake amount.

Figure 4:
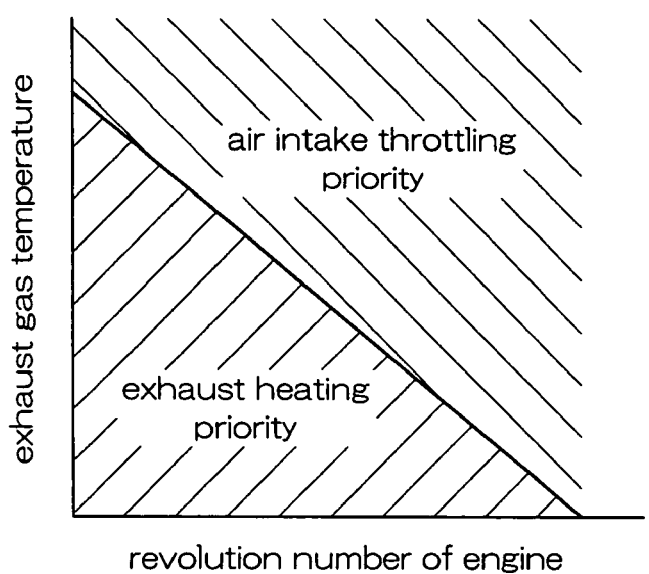
FIG. 4 is a diagram for describing selection between the air intake throttling priority operation and an exhaust heating priority operation.

Alternatively, selection between the air intake throttling priority operation and the exhaust heating priority operation may be performed, depending on the revolution number of the engine and the exhaust gas temperature. For example, as shown in FIG. 4, a map is stored in the controller 5, which indicates that the exhaust heating priority operation is selected when the revolution number of the engine and the exhaust gas temperature are both low, and the air intake throttling priority operation is selected when the revolution number of the engine and the exhaust gas temperature are both high. The select operation is performed in accordance with the map.

—Air Intake Throttling and Exhaust Heating Simultaneously Starting Operation—

In this operation, when the exhaust temperature increase control start condition is satisfied, the controller 5 transmits the air intake throttling control signal to the air intake throttling device 24 and, in addition, the exhaust temperature increase control signal to the exhaust temperature increasing device 34. Thereby, both an increase in the exhaust gas temperature by the air intake throttling operation of the air intake throttling device 24 and an increase in the exhaust gas temperature by the heating operation of the exhaust temperature increasing device 34 can be achieved, so that the exhaust gas temperature quickly reaches the restoration operable temperature, and therefore, the DPF 33 is restored. Therefore, a time from when the exhaust temperature increase control start condition is satisfied to when the restoration of the DPF 33 is completed, can be reduced.

—Air Intake Throttle Limit of Air Intake Throttling Device 24—

As the intake air amount is decreased by the air intake throttling operation of the air intake throttling device 24, a sufficient pressure is not obtained in the cylinder (a pressure which enables autoignition of air-fuel mixture with appropriate timing is not obtained) at a dead point of compression in the engine. In this case, a time of ignition of air-fuel mixture is significantly delayed, or misfire occurs. Therefore, there is a limit of the air intake throttle amount of the air intake throttling device 24. Therefore, an upper limit value of a control width (maximum throttle amount: threshold value) which provides a throttle amount which does not lead to the limit of the air intake throttle amount, is previously set for the air intake throttling control signal transmitted from the controller 5 to the air intake throttling device 24. Such a setting of the air intake throttling limit is previously set in all of the air intake throttling priority operation, the exhaust heating priority operation, and the air intake throttling and exhaust heating simultaneously starting operation. Note that the threshold value is specifically defined as an opening degree of the butterfly valve which provides about 20% of the flow path area of the air intake pipe 21 when the butterfly valve is fully opened.

Figure 5:
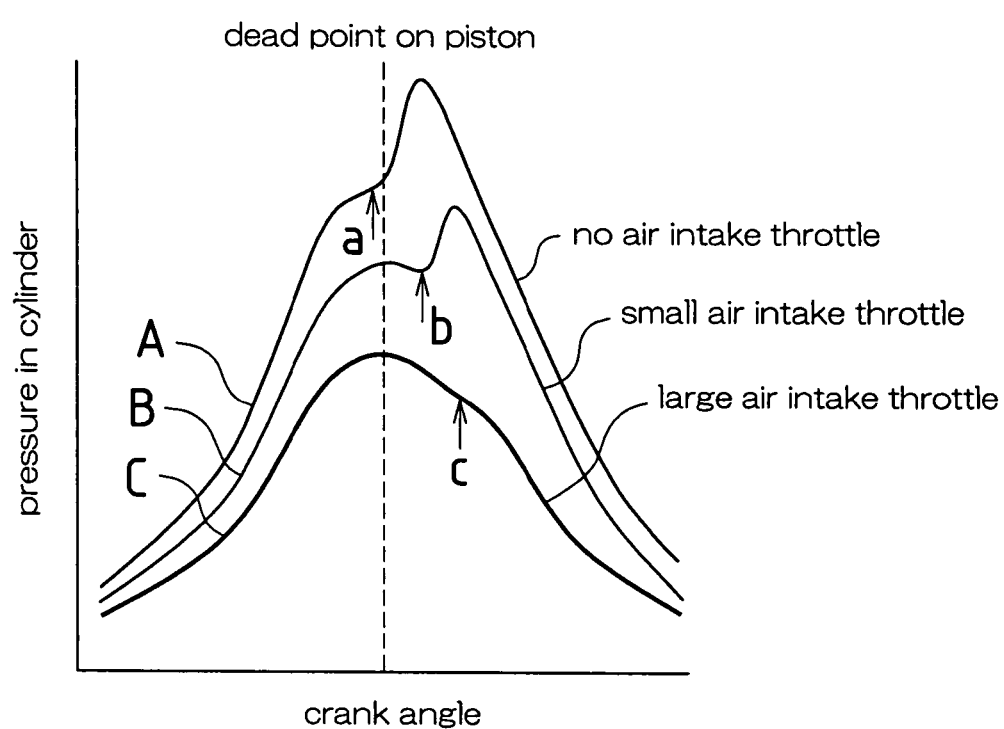
FIG. 5 is a diagram showing changing states of a pressure in a cylinder when an air intake throttle amount is changed, and air-fuel mixture ignition timings for respective air intake throttle amounts.

FIG. 5 shows changing states of the pressure in the cylinder when the air intake throttle amount is changed, and air-fuel mixture ignition timings for respective air intake throttle amounts. As can be seen from FIG. 5, when the air intake throttling operation is not performed (line A in FIG. 5), the pressure in the cylinder is sufficient at the dead point of compression, and the air-fuel mixture ignition timing is present in the vicinity of a dead point of the piston (ignition timing a). In contrast to this, as the air intake throttle amount is increased, the pressure in the cylinder at the dead point of compression decreases (lines B and C in FIG. 5), and the air-fuel mixture ignition timing is delayed (ignition timings b and c). In other words, the air-fuel mixture ignition timing approaches the limit of misfire. Therefore, in this embodiment, a limit (threshold value) is put on the air intake throttle amount so that misfire of air-fuel mixture does not occur.

Note that the threshold value may be previously set in the air intake throttling control signal as described above (a control signal which controls the throttle amount not to exceed the limit of misfire is transmitted). Alternatively, the threshold value may be previously set in the actuator of the air intake throttling device 24 (the actuator adjusts the opening degree of the butterfly valve within a range which does not exceed the threshold value (the limit of misfire), independently of the air intake throttling control signal).

Second Embodiment

Next, a second embodiment will be described. This embodiment provides a variation of the "threshold value" which is defined as the limit of the air intake throttle amount in the first embodiment. The other parts and control operations are similar to those of the first embodiment. Therefore, the same portions as those of the first embodiment will not here described.

Figure 6:
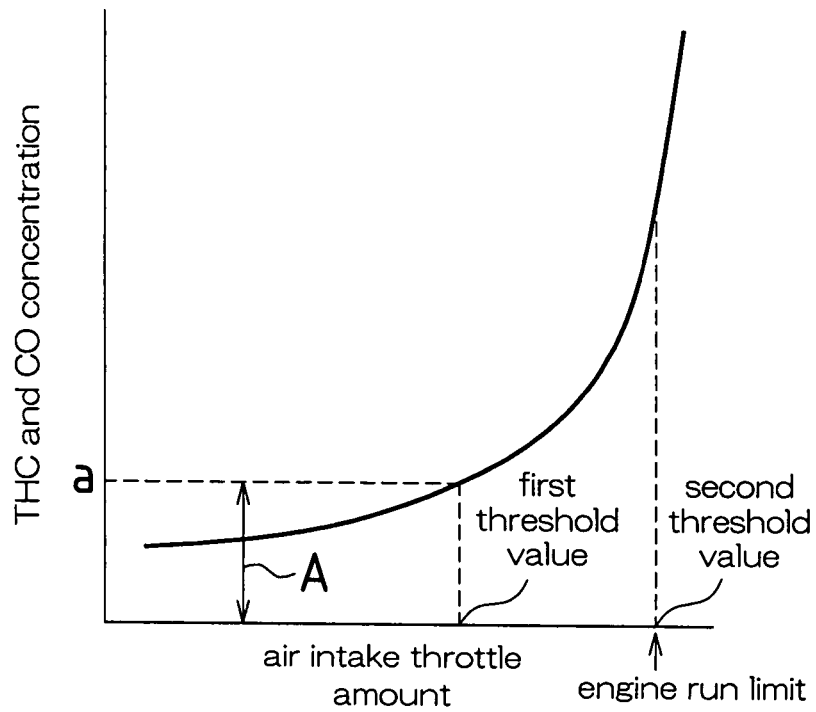
FIG. 6 is a diagram showing a relationship between air intake throttle amounts and concentrations of CO and THC in exhaust gas.

As described above, as the intake air amount is decreased by the air intake throttling operation of the air intake throttling device 24, the time of ignition of air-fuel mixture is delayed. As a result, incomplete combustion occurs, so that the amount of CO and THC generated in exhaust gas increases. FIG. 6 shows a relationship between air intake throttle amounts and concentrations of CO and THC in exhaust gas. As can be seen from FIG. 6, in a region where the air intake throttle amount is relatively small, the rate of increase in the CO and THC concentration with respect to an increase in the air intake throttle amount is small. In a region where the air intake throttle amount is relatively large, the rate of increase in the CO and THC concentration with respect to an increase in the air intake throttle amount is extremely large.

Therefore, in this embodiment, an air intake throttle amount when reaching a maximum tolerance amount (hereinafter referred to as a CO and THC generation amount tolerance limit: point a in FIG. 6) of a range within which the amount of CO and THC generated is relatively small (hereinafter referred to as a CO and THC generation amount tolerance range: range A in FIG. 6), is defined as a first threshold value. An air intake throttle amount which is likely to cause the engine to stall due to misfire caused by the delay of the ignition time (hereinafter referred to as an engine running limit (the limit of misfire)) is previously set as a second threshold value (see FIG. 6).

An operation of restoring the DPF 33 according to this embodiment is performed as follows. When the exhaust temperature increase control start condition is satisfied, the air intake throttling operation of the air intake throttling device 24 is initially started. When the air intake throttle amount reaches the first threshold value without the exhaust gas temperature reaching the restoration operable temperature, the air intake throttling operation of the air intake throttling device 24 is temporarily suspended (the air intake throttle amount is maintained), while the heating activation of the exhaust temperature increasing device 34 is started. Specifically, the exhaust gas temperature is increased while the CO and THC generation amount is suppressed within the CO and THC generation amount tolerance range. Even if a predetermined time has passed since the activation of the exhaust temperature increasing device 34, the exhaust gas temperature detected by the exhaust temperature detecting sensor 37 may not reach the restoration operable temperature. In this case, the air intake throttling operation of the air intake throttling device 24 is resumed so that the air intake throttle amount is increased with the second threshold value being an upper limit.

Figure 7:
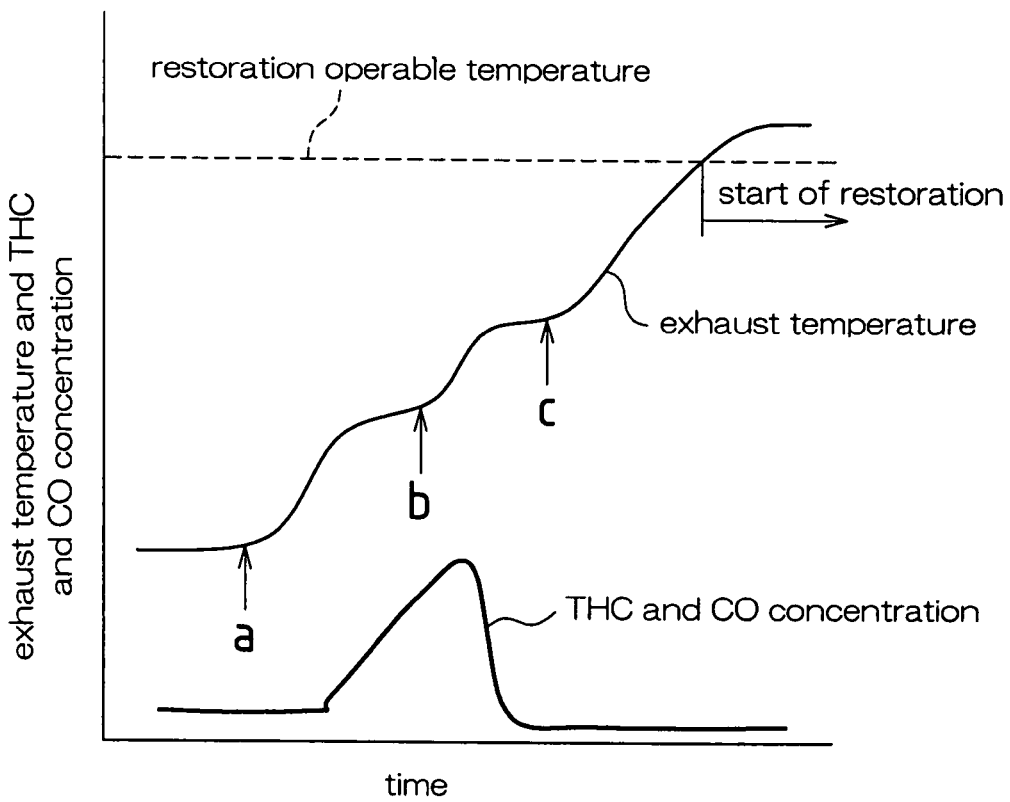
FIG. 7 is a diagram showing changes over time in an exhaust gas temperature and the concentration of CO and THC in exhaust gas during a DPF restoration operation according to a second embodiment.

FIG. 7 is a diagram showing changes over time in the exhaust gas temperature and the CO and THC concentration of exhaust gas when the operation is executed. As can be seen from FIG. 7, the exhaust gas temperature is gradually increased and the CO and THC concentration of exhaust gas is also gradually increased by the air intake throttling operation until the first threshold value is reached (the starting point of the air intake throttling operation is indicated by point a in FIG. 7). Thereafter, when the air intake throttle amount reaches the first threshold value and the air intake throttling operation is then switched to the heating activation of the exhaust temperature increasing device 34 (point b in FIG. 7), the exhaust gas temperature is gradually increased while the oxidation catalyst function of the DPF 33 is exhibited due to heating to clean CO and THC, so that the CO and THC concentration is decreased. Thereafter, the heating ability of the exhaust temperature increasing device 34 reaches the limit, so that the air intake throttling operation of the air intake throttling device 24 is resumed (point c in FIG. 7), thereby further increasing the exhaust gas temperature. As a result, when the exhaust gas temperature reaches the restoration operable temperature, the restoration of the DPF 33 is started. Note that, when the exhaust gas temperature reaches the restoration operable temperature partway through the series of operations, the DPF 33 is restored by maintaining the state. For example, when the exhaust gas temperature is caused to reach the restoration operable temperature by the heating activation of the exhaust temperature increasing device 34, the DPF 33 is restored without the air intake throttling operation of the air intake throttling device 24 being started.

—Changing of Threshold Value, Depending on Running State of Engine—

When the running state of the engine changes, the CO and THC generation amount and the delay amount of the ignition time of air-fuel mixture change with respect to the air intake throttle amount. Therefore, the CO and THC generation amount tolerance range, the CO and THC generation amount tolerance limit, and the engine running limit also have different values. Therefore, the first threshold value and the second threshold value are also set to have different values, depending on the running state of the engine. Hereinafter, an operation of changing the first threshold value and the second threshold value will be described.

Figure 8:
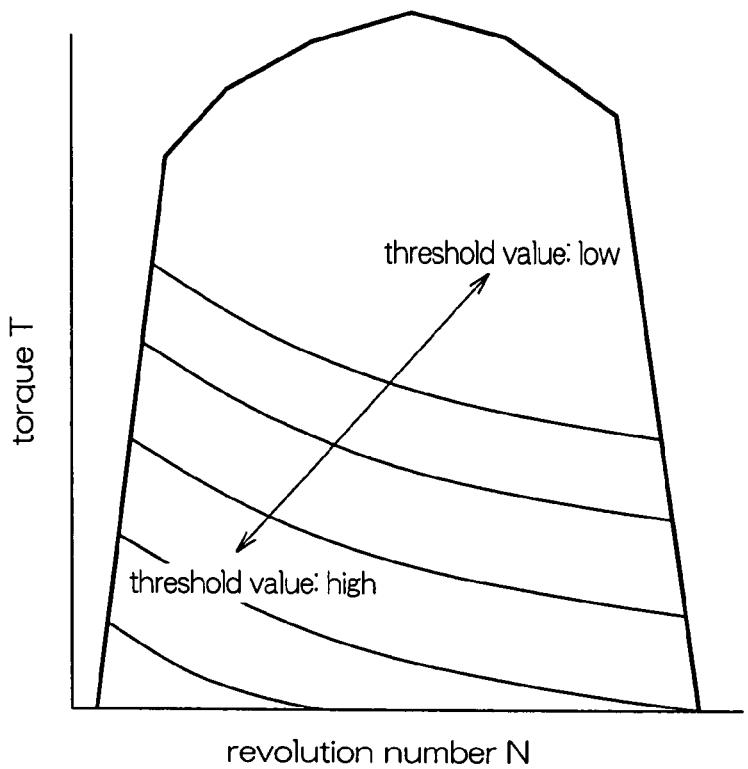
FIG. 8 is a diagram showing an operation of changing each threshold value, depending on the revolution number of the engine and the torque of the engine.

FIG. 8 shows a case where each threshold value is changed, depending on the revolution number of the engine and the torque of the engine. As can be seen from FIG. 8, as the revolution number of the engine and the engine torque decrease, the first threshold value and the second threshold value can be set to be higher values (a larger margin of the air intake throttle amount). In other words, as the revolution number of the engine and the engine torque increase, the first threshold value and the second threshold value need to be set to be lower values (the limitation of the air intake throttle amount is enhanced). For example, when the revolution number of the engine is low, but the load is high, there is a small margin of the intake air amount irrespective of the low exhaust gas temperature, so that the air intake throttle amount is likely to reach the engine running limit earlier. Therefore, in this situation, the second threshold value is set to be low. Thereby, the engine is prevented from stalling. When the revolution number of the engine is low, ignition may be delayed, but in this case, the angular velocity of the crank shaft is low, so that the angle of the crank at ignition timing is not significantly deviated from the dead point of the piston, and therefore, combustion is possible. Therefore, the first threshold value can be set to be higher. In other words, even if the air intake throttle amount is increased, the CO and THC generation amount can be suppressed within the tolerance range. Thus, by changing the threshold values, depending on a change in the running state of the engine, the restoration operation of the DPF 33 can be executed while the engine is prevented from stalling and the CO and THC generation amount is suppressed within the tolerance range as well as while the energy loss is suppressed to the extent possible.

—Changing of Threshold Value, Depending on Cetane Number of Fuel—

When the cetane number of a fuel (light oil for diesel engines) changes, the CO and THC generation amount and the delay amount of ignition of air-fuel mixture with respect to the air intake throttle amount also change. Therefore, the CO and THC generation amount tolerance range, the CO and THC generation amount tolerance limit, and the engine running limit also have different values. Therefore, the first threshold value and the second threshold value are also set to be different values, depending on the cetane number of a fuel to be used. Hereinafter, an operation of changing the first threshold value and the second threshold value will be described.

Figure 9:
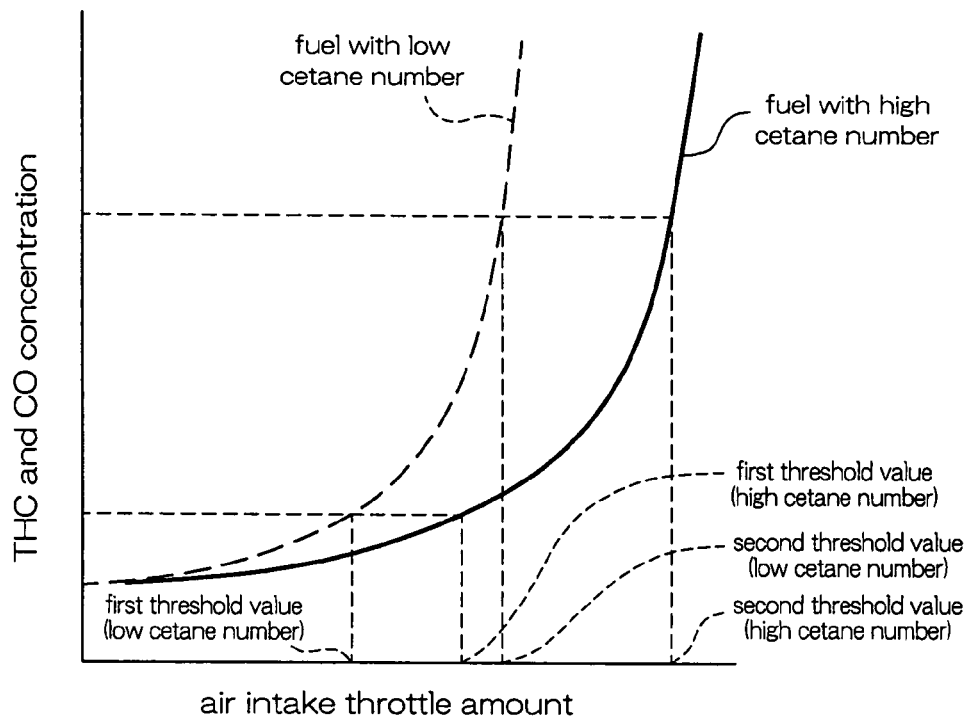
FIG. 9 is a diagram showing a relationship between air intake throttle amounts and concentrations of CO and THC in exhaust gas with respect to two fuels having different cetane numbers.

FIG. 9 shows a relationship between air intake throttle amounts and concentrations of CO and THC in exhaust gas with respect to two fuels having different cetane numbers (e.g., a fuel having a cetane number of "55" and a fuel having a cetane number of "45"). As can be seen from FIG. 9, fuels having lower cetane numbers tend to have larger ignition delays. Therefore, for fuels having lower cetane numbers, both the first threshold value and the second threshold value need to be set to be lower values (the limitation of the air intake throttle amount is enhanced), as compared to fuels having higher cetane numbers. In other words, since fuels having higher cetane numbers have smaller ignition delays, both the first threshold value and the second threshold value can be set to be higher values (there can be a margin of the air intake throttle amount), as compared to fuels having lower cetane numbers.

Thus, by setting the threshold values, depending on the fuel, the restoration operation of the DPF 33 can be executed while the engine is prevented from stalling and the CO and THC generation amount is suppressed within the tolerance range.

Third Embodiment

Next, a third embodiment will be described. In this embodiment, it is assumed that an electric heater is employed as the exhaust temperature increasing device 34, and current is supplied to the electric heater 34 directly from an alternator. The other parts and control operations are similar to those of the first and second embodiments. Therefore, the same portions as those of the first and second embodiments will not here described.

Figure 10:
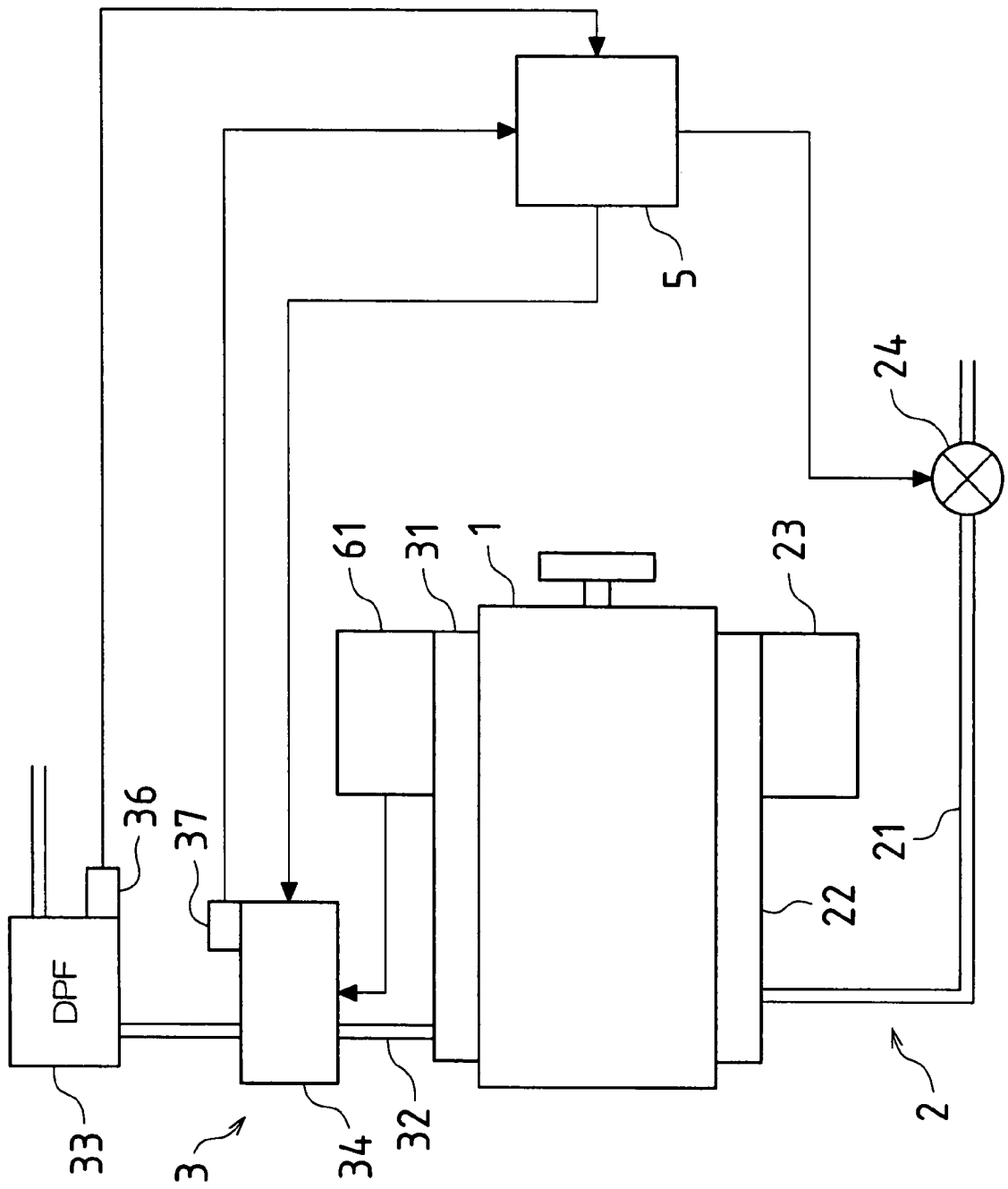
FIG. 10 is a diagram showing a third embodiment, corresponding to FIG. 1.

As can be seen from FIG. 10, in an engine of this embodiment, an alternator 61 which is driven by rotational drive force of a crank shaft to generate electric power is attached to a side surface of the engine main body 1. A portion of electric power generated by the alternator 61 is supplied to the electric heater (exhaust temperature increasing device) 34. The supply of electric power to the electric heater 34 is switched ON/OFF in accordance with the exhaust temperature increase control signal from the controller 5 as in the first embodiment. Note that the electric power generated by the alternator 61 is also used to charge a battery (not shown) or drive auxiliaries.

This embodiment is characterized by ON/OFF control of the electric heater 34 performed in accordance with the exhaust temperature increase control signal from the controller 5.

Figure 11:
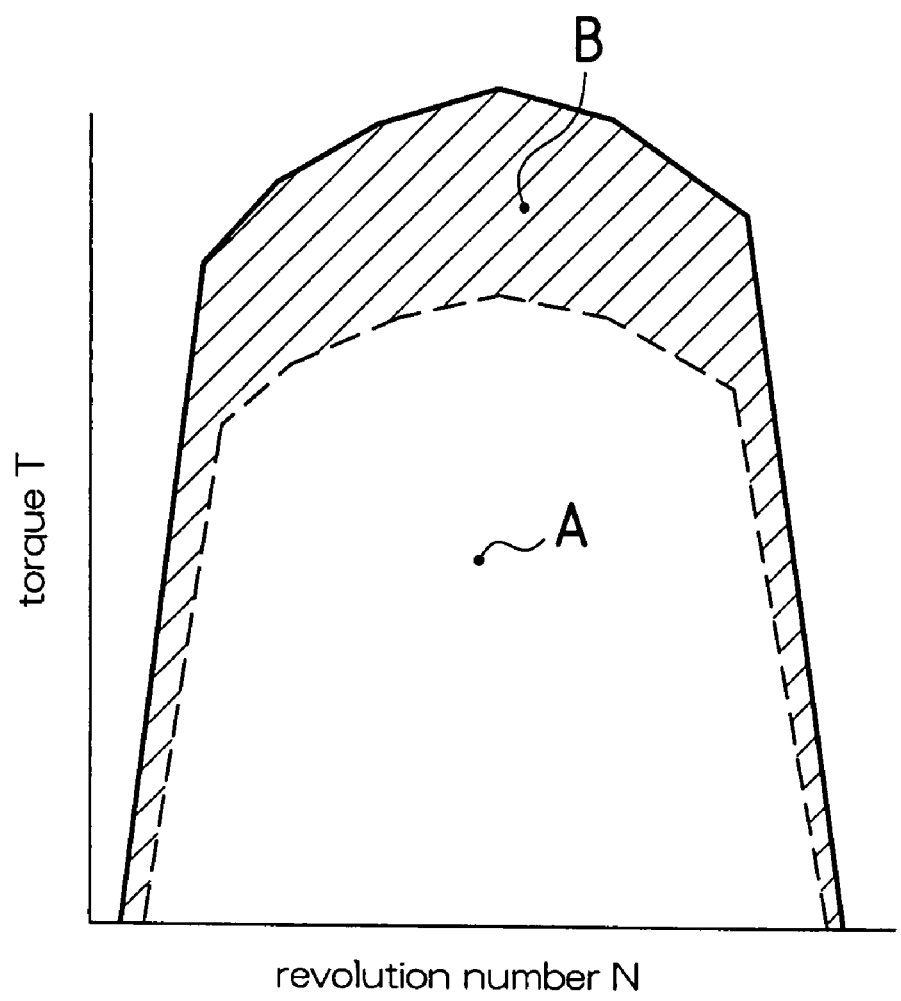
FIG. 11 is a diagram showing a relationship between an output of an engine main body and a portion of the output which is used in an electric heater.

FIG. 11 shows a relationship between an output of the engine main body 1 and a portion of the output which is used in the electric heater 34. In FIG. 11, a solid line indicates a limit of the output of the engine main body 1 (a maximum output line of the engine). In FIG. 11, a hatched region indicates an output of the engine which is used (consumed) in the electric heater 34 when the electric heater 34 is ON (a portion of the output of the engine which is used to generate heat in the electric heater 34).

Therefore, when the engine main body 1 is driven with an output (e.g., point A in FIG. 11) lower than a dashed line in FIG. 11 (the load is relatively low), there is an output margin which is more than or equal to the portion of the output of the engine which is used in the electric heater 34. Therefore, even when the electric heater 34 is turned ON, the operation of heating exhaust gas by the electric heater 34 can be performed without a hindrance in the travel performance or the traction performance. Specifically, when there is a request for passage of current to the electric heater 34 in such a drive state of the engine (timing with which the heating activation of the electric heater 34 is executed in the above-described embodiments), the exhaust temperature increase control signal is transmitted from the controller 5 to the electric heater 34, so that the heating activation is started.

In contrast to this, when the engine main body 1 is driven by an output (e.g., point B in FIG. 11) which is higher than the dashed line in FIG. 11 (the load is relatively high), the output margin is smaller than the portion of the output of the engine which is used in the electric heater 34. In this case, the electric heater 34 is not turned ON, and the exhaust gas temperature is increased only by the air intake throttling operation of the air intake throttling device 24. In other words, even when there is a request for passage of current to the electric heater 34 in such a drive state of the engine, the exhaust temperature increase control signal is not transmitted from the controller 5 to the electric heater 34. Therefore, the exhaust gas temperature is increased only by the air intake throttling operation of the air intake throttling device 24, and when the exhaust gas temperature reaches the restoration operable temperature, the restoration of the DPF 33 is performed. In other words, the restoration of the DPF 33 is performed without a hindrance in the travel performance or the traction performance.

Although it has been described above that the electric heater 34 is not turned ON when the output margin of the engine main body 1 is smaller than the portion of the engine output which is used in the electric heater 34, the present invention is not limited to this. Alternatively, the electric heater 34 may be adapted to generate a plurality of variable levels of heat, and the heat level of the electric heater 34 may be adjusted, depending on the output margin of the engine, so that the operation of heating exhaust gas may be performed by the electric heater 34 to the extent possible.

—Variation of Third Embodiment—

Figure 12:
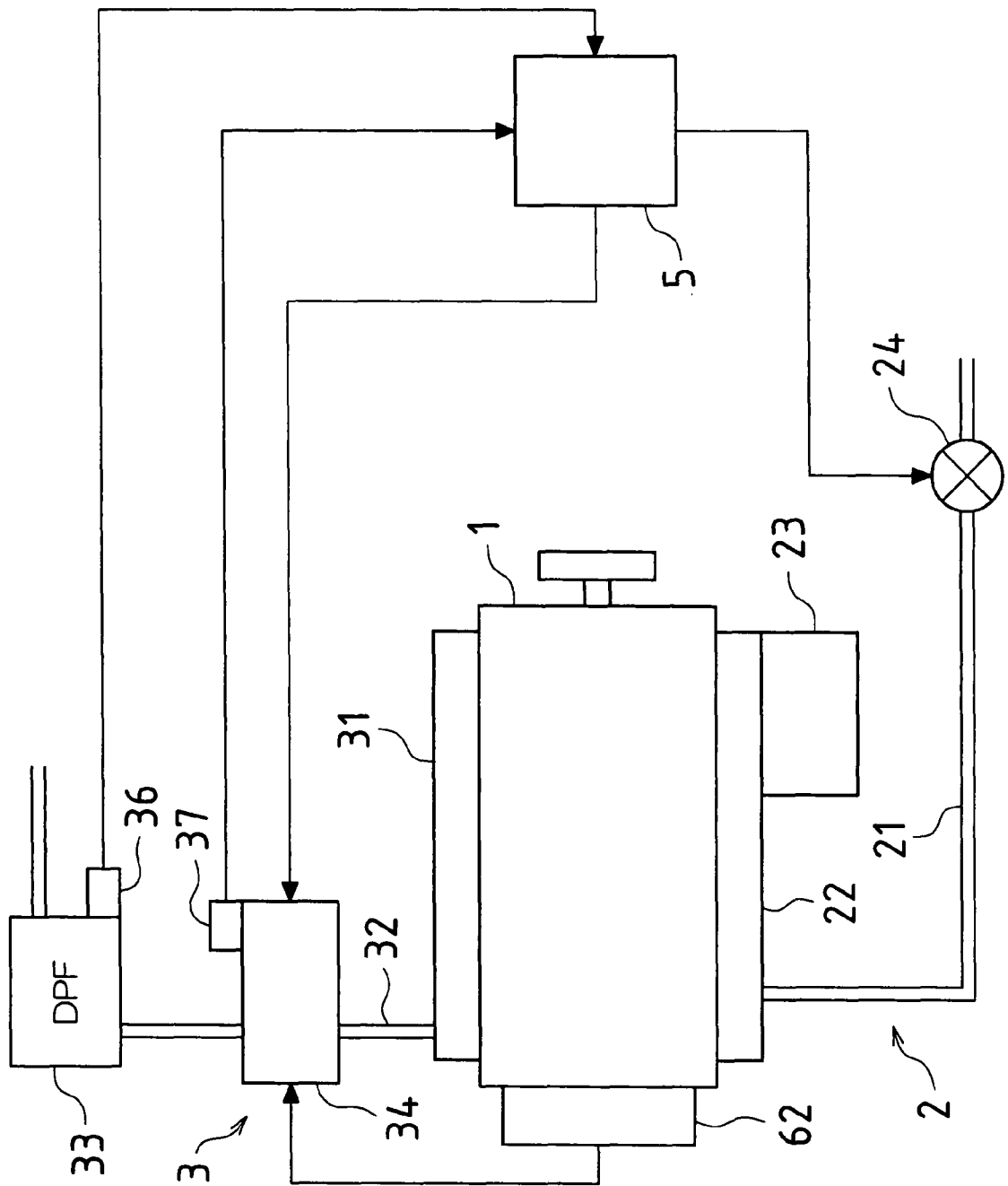
FIG. 12 is a diagram showing a variation of the third embodiment, corresponding to FIG. 1.

In the above-described third embodiment, current is supplied to the electric heater 34 from the alternator 61 which generates electric power for charging a battery or driving auxiliaries. In this variation, as shown in FIG. 12, an electric generator 62 dedicated to supply of current to the electric heater 34 is provided. The electric generator 62 is driven by rotational drive force of a crank shaft to generate electric power as with the alternator 61.

Also, in this variation, ON/OFF control of the electric heater 34 which is performed in accordance with the exhaust temperature increase control signal from the controller 5, is performed, depending on the output state of the engine when there is a request for passage of current to the electric heater 34, as in the third embodiment.

Also, in this case, the electric heater 34 may be adapted to generate a plurality of variable levels of heat, and the heat level of the electric heater 34 may be adjusted, depending on the output margin of the engine, so that the operation of heating exhaust gas may be performed by the electric heater 34 to the extent possible.

Fourth Embodiment

Next, a fourth embodiment will be described. This embodiment is characterized by a control operation of an EGR (Exhaust Gas Recirculation) valve during restoration of the DPF 33 when an EGR device is provided. The other parts and control operations are similar to those of the above-described embodiments. Therefore, the same portions as those of the above-described embodiments will not here described.

Figure 13:
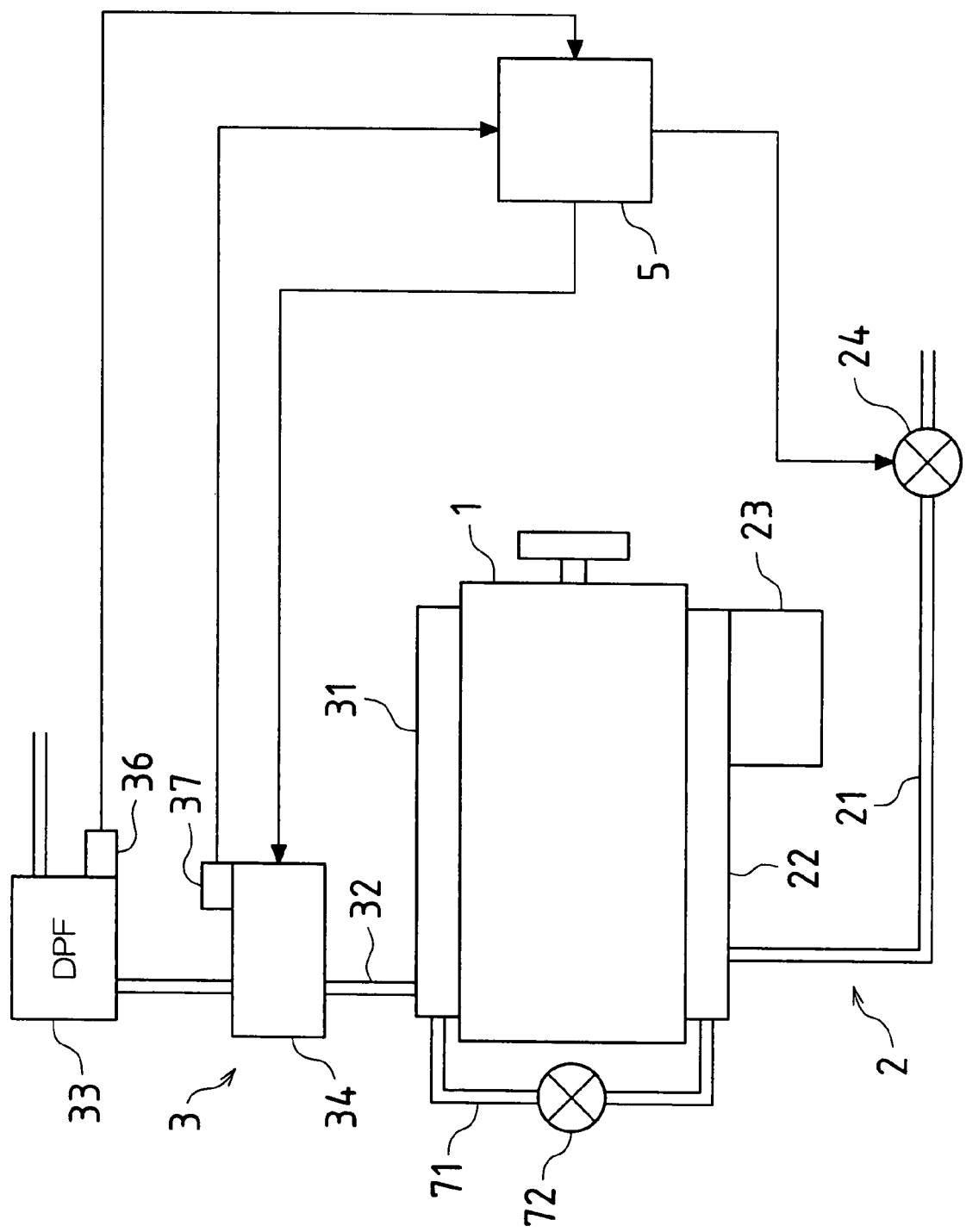
FIG. 13 is a diagram showing a fourth embodiment, corresponding to FIG. 1.

As shown in FIG. 13, an engine according to this embodiment is provided with an EGR path 71 for recirculating exhaust from the exhaust system 3 to the air intake system 2. The EGR path 71 is provided with an EGR valve 72 the opening degree of which can be adjusted.

This embodiment is characterized by an operation in which, while the air intake throttling operation is performed by the air intake throttling device 24, the opening degree of the EGR valve 72 is reduced, depending on the throttle amount of the butterfly valve.

Figure 14:
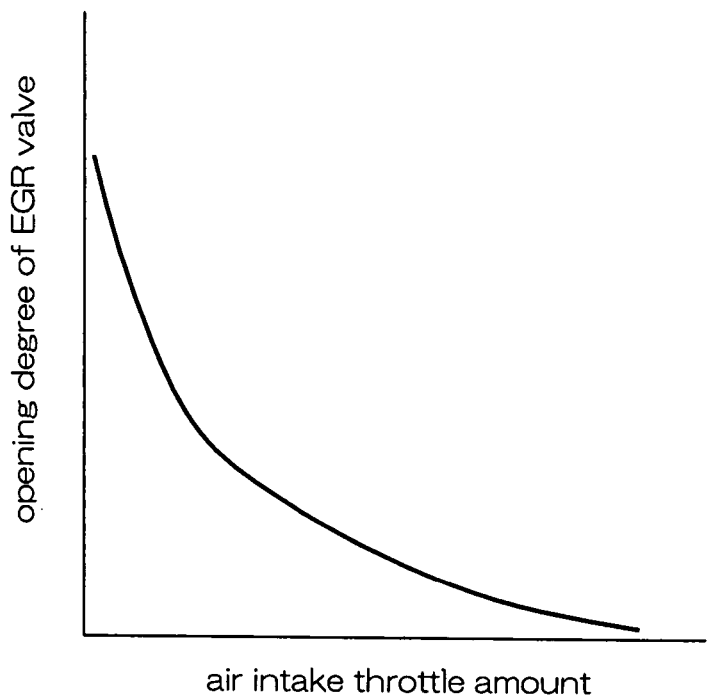
FIG. 14 is a diagram showing a relationship between air intake throttle amounts of an air intake throttling device and degrees of opening of an EGR valve during a control of the opening degree of the EGR value.
Figure 15:
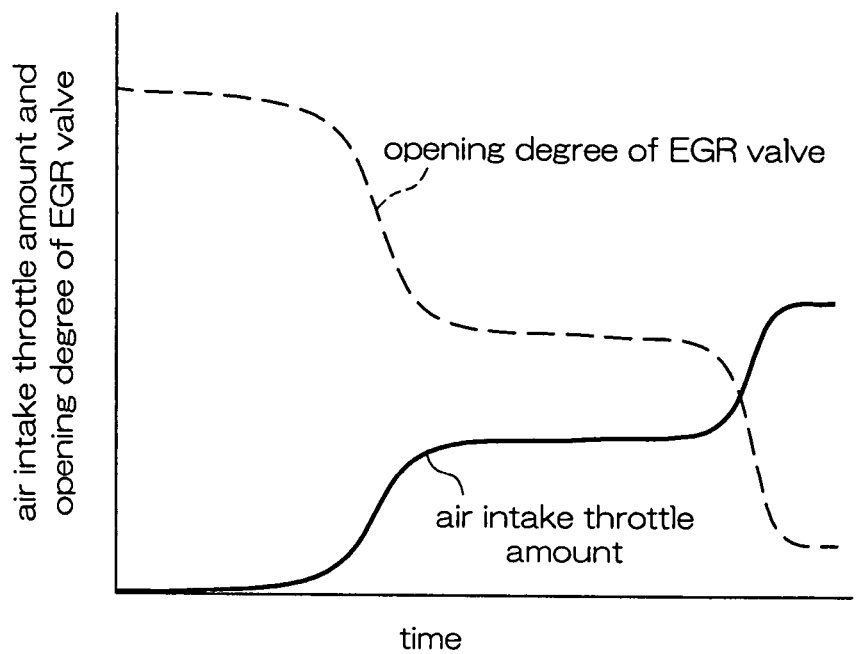
FIG. 15 is a diagram showing exemplary changes over time in the opening degree of the EGR valve with respect to the air intake throttle amount of the air intake throttling device.

FIG. 14 shows a relationship between air intake throttle amounts of the air intake throttling device 24 and degrees of opening of the EGR valve 72 during a control of the opening degree of the EGR valve 72 according to this embodiment. FIG. 15 shows exemplary changes over time in the opening degree of the EGR valve 72 with respect to the air intake throttle amount of the air intake throttling device 24.

A recirculation amount of EGR gas is determined, based on a differential pressure between the air intake side and the exhaust side, and the opening degree of the EGR valve 72. As described above, during restoration of the DPF 33, since the air intake throttling operation of the air intake throttling device 24 is performed, the air intake-side pressure is decreased. In other words, when the opening degree of the EGR valve 72 is constant, the differential pressure between the air intake side and the exhaust side becomes large, so that the recirculation amount of exhaust increases more than necessary, likely leading to faulty combustion. Therefore, in this embodiment, as the air intake throttle amount of the air intake throttling device 24 is increased (the air intake-side pressure is decreased), the opening degree of the EGR valve 72 is reduced, thereby maintaining a constant exhaust recirculation rate to maintain a satisfactory combustion state of air-fuel mixture.

Figure 16:
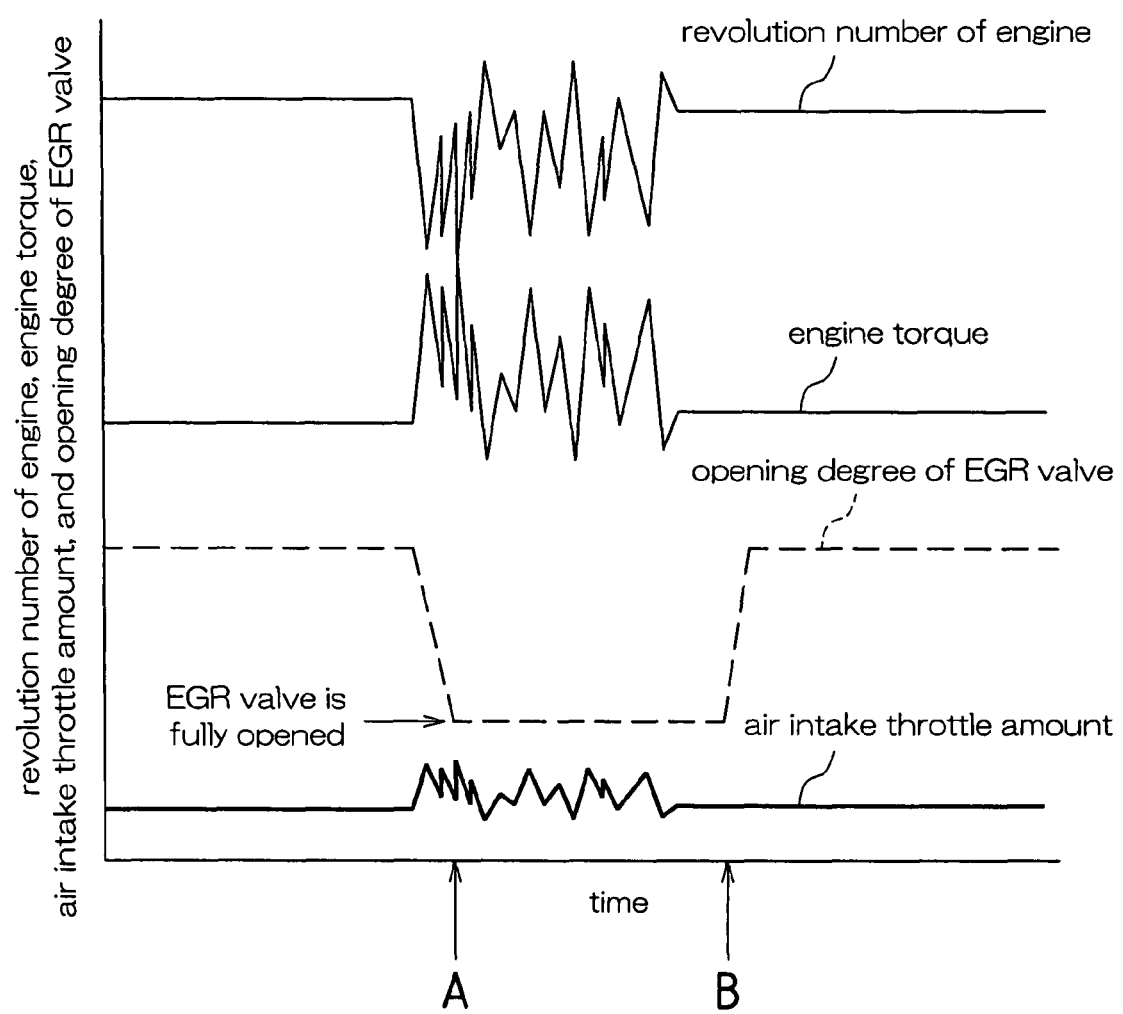
FIG. 16 is a diagram showing exemplary changes over time in the revolution number of the engine, the engine torque, the opening degree of the EGR valve, and the air intake throttle amount of the air intake throttling device in the fourth embodiment.

Also, in this embodiment, the revolution number of the engine and the engine torque are monitored during restoration of the DPF 33, and the EGR valve 72 is completely closed when changes in these amounts exceed predetermined amounts. FIG. 16 shows exemplary changes over time in the revolution number of the engine, the engine torque, the opening degree of the EGR valve 72, and the air intake throttle amount of the air intake throttling device 24 in this case. When the opening degree of the EGR valve 72 is changed, depending on the air intake throttle amount of the air intake throttling device 24, during the restoration of the DPF 33, change in the EGR recirculation amount is slightly delayed with respect to the air intake throttling operation of the air intake throttling device 24. Therefore, when the revolution number of the engine and the engine torque change significantly, the operation of changing the opening degree of the EGR valve 72 is likely to have an adverse influence on the combustion of air-fuel mixture. Therefore, as shown in FIG. 16, when the revolution number of the engine and the engine torque change significantly during the restoration of the DPF 33, it is determined that the opening degree of the EGR valve 72 cannot be caused to follow a change in the air intake throttle amount of the air intake throttling device 24, and the EGR valve 72 is forced to be completely closed (timing A in FIG. 16), so that the exhaust recirculation amount is caused to be "0", thereby avoiding faulty combustion. Thereafter, when changes in the revolution number of the engine and the engine torque become small, the control of changing the opening degree of the EGR valve 72, depending on the air intake throttle amount of the air intake throttling device 24, is resumed (timing B in FIG. 16).

Fifth Embodiment

Next, a fifth embodiment will be described. This embodiment is characterized in that, when a turbocharger is provided, a plurality of "threshold values" for changing restoration operations of the DPF 33 are set. The other parts and control operations are similar to those of the above-described embodiments. Therefore, the same portions as those of the above-described embodiments will not here described.

Figure 17:
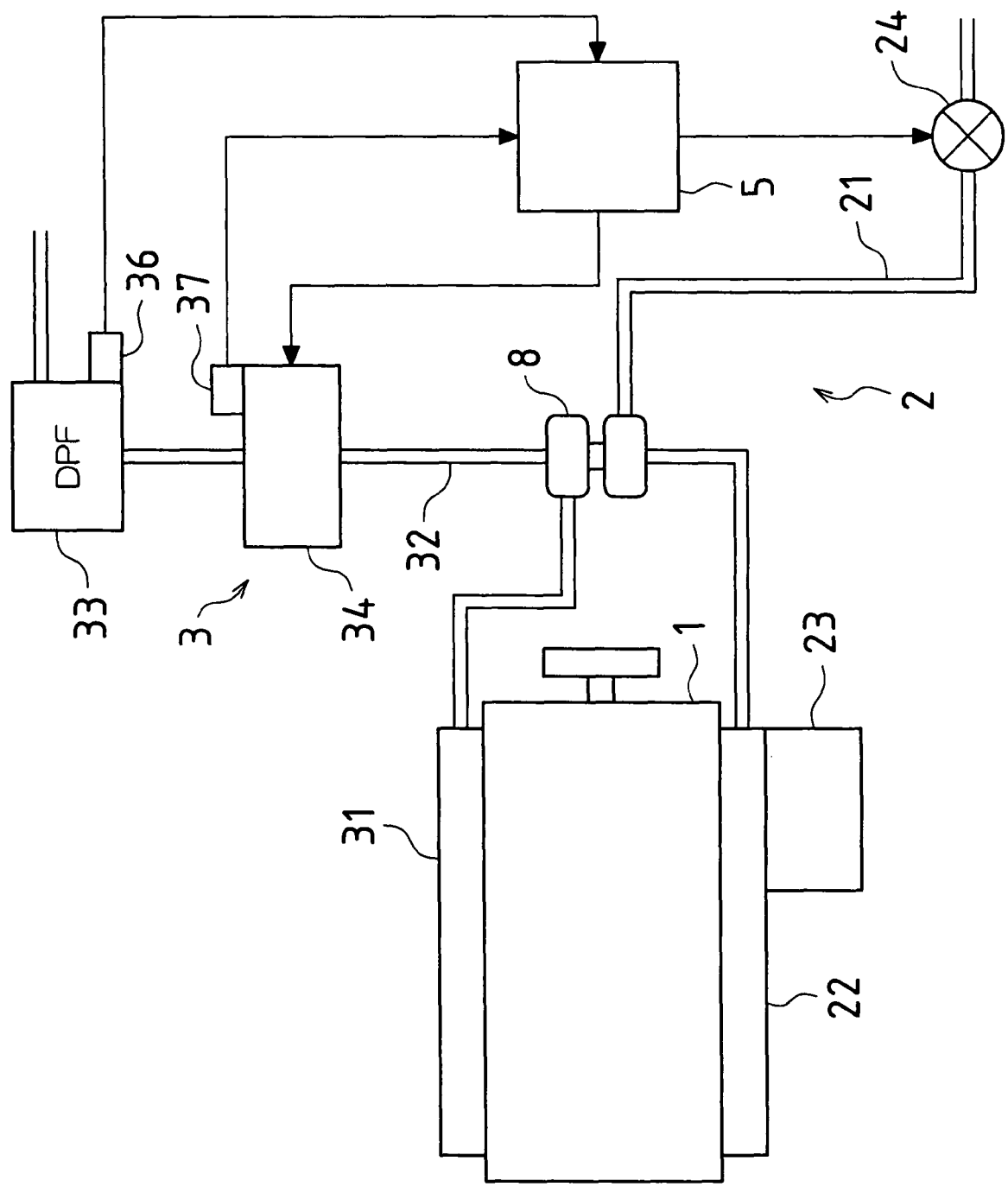
FIG. 17 is a diagram showing a fifth embodiment, corresponding to FIG. 1.

As shown in FIG. 17, an engine according to this embodiment comprises a turbocharger 8. The engine utilizes the fluid energy of exhaust gas to compress intake air to increase the air density, thereby increasing an output of the engine.

Figure 18:
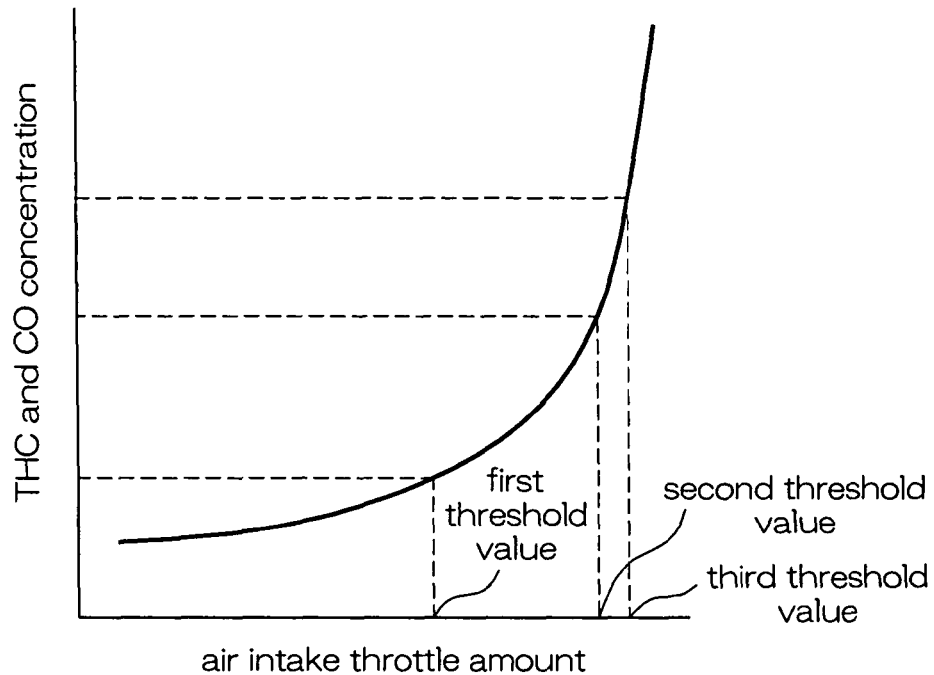
FIG. 18 is a diagram for describing an operation of setting each threshold value.

As a "threshold value" for changing restoration operations of the DPF 33, a first threshold value is set as in the second embodiment. The first threshold value is set as an air intake throttle amount when the CO and THC generation amount reaches a maximum tolerance amount (a CO and THC generation amount tolerance limit) of a range within which the CO and THC generation amount is relatively small (CO and THC generation amount tolerance range). On the other hand, a second threshold value is set as an air intake throttle amount when surging of the turbocharger 8 occurs (see a first threshold value and a second threshold value in FIG. 18). The surging occurs because the compression ratio is maintained high by the turbocharger 8 irrespective of a reduction in the intake air amount caused by increasing the air intake throttle amount. In other words, the second threshold value is set as an air intake throttle amount at the limit of engine running in this embodiment.

Note that, regarding the restoration operation of the DPF 33 in this embodiment, operations after the air intake throttle amount reaches the first threshold value are performed in a manner similar to that of the second embodiment. Specifically, when the exhaust temperature increase control start condition is satisfied, the air intake throttling operation of the air intake throttling device 24 is initially started. When the air intake throttle amount reaches the first threshold value without the exhaust gas temperature reaching the restoration operable temperature, the air intake throttling operation of the air intake throttling device 24 is temporarily suspended (the air intake throttle amount is maintained), and the heating activation of the exhaust temperature increasing device 34 is started. In other words, the exhaust gas temperature is increased while the CO and THC generation amount is suppressed within the CO and THC generation amount tolerance range. Even if a predetermined time has passed since the activation of the exhaust temperature increasing device 34, the exhaust gas temperature detected by the exhaust temperature detecting sensor 37 may not reach the restoration operable temperature. In this case, the air intake throttling operation of the air intake throttling device 24 is resumed so as to increase the air intake throttle amount with the second threshold value being set as an upper limit thereof (within a range which does not cause surging of the turbocharger 8).

Figure 19:
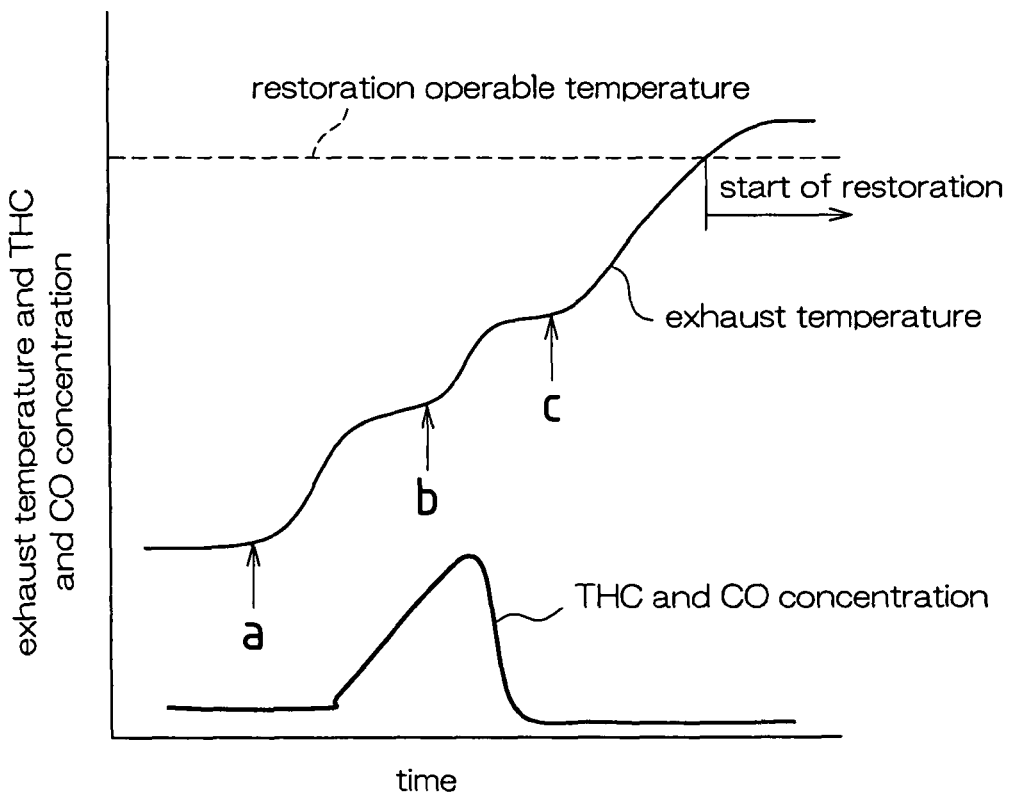
FIG. 19 is a diagram showing changes over time in an exhaust gas temperature and a CO and THC concentration of exhaust gas during a DPF restoration operation of the fifth embodiment.

FIG. 19 is a diagram showing changes over time in the exhaust gas temperature and the CO and THC concentration of exhaust gas when the above-described operation is executed. As can be seen from FIG. 19, the exhaust gas temperature is gradually increased and the CO and THC concentration of exhaust gas is also gradually increased by the air intake throttling operation until the first threshold value is reached (the starting point of the air intake throttling operation is indicated by point a in FIG. 19). Thereafter, when the air intake throttle amount reaches the first threshold value and the air intake throttling operation is then switched to the heating activation of the exhaust temperature increasing device 34 (point b in FIG. 19), the exhaust gas temperature is gradually increased, while the oxidation catalyst function of the DPF 33 is exhibited due to heating to clean CO and THC, so that the CO and THC concentration is decreased. Thereafter, the heating ability of the exhaust temperature increasing device 34 reaches the limit, so that the air intake throttling operation of the air intake throttling device 24 is resumed (point c in FIG. 19), thereby further increasing the exhaust gas temperature. As a result, when the exhaust gas temperature reaches the restoration operable temperature, restoration of the DPF 33 is started. Note that, when the exhaust gas temperature reaches the restoration operable temperature partway through the series of operations, the DPF 33 is restored by maintaining the state.

—Variation of Fifth Embodiment—

As a variation of the fifth embodiment, setting of a threshold value and switching of restoration operations of the DPF 33, depending on the threshold value, where a turbocharger is provided with a waste gate valve, will be described.

Figure 20:
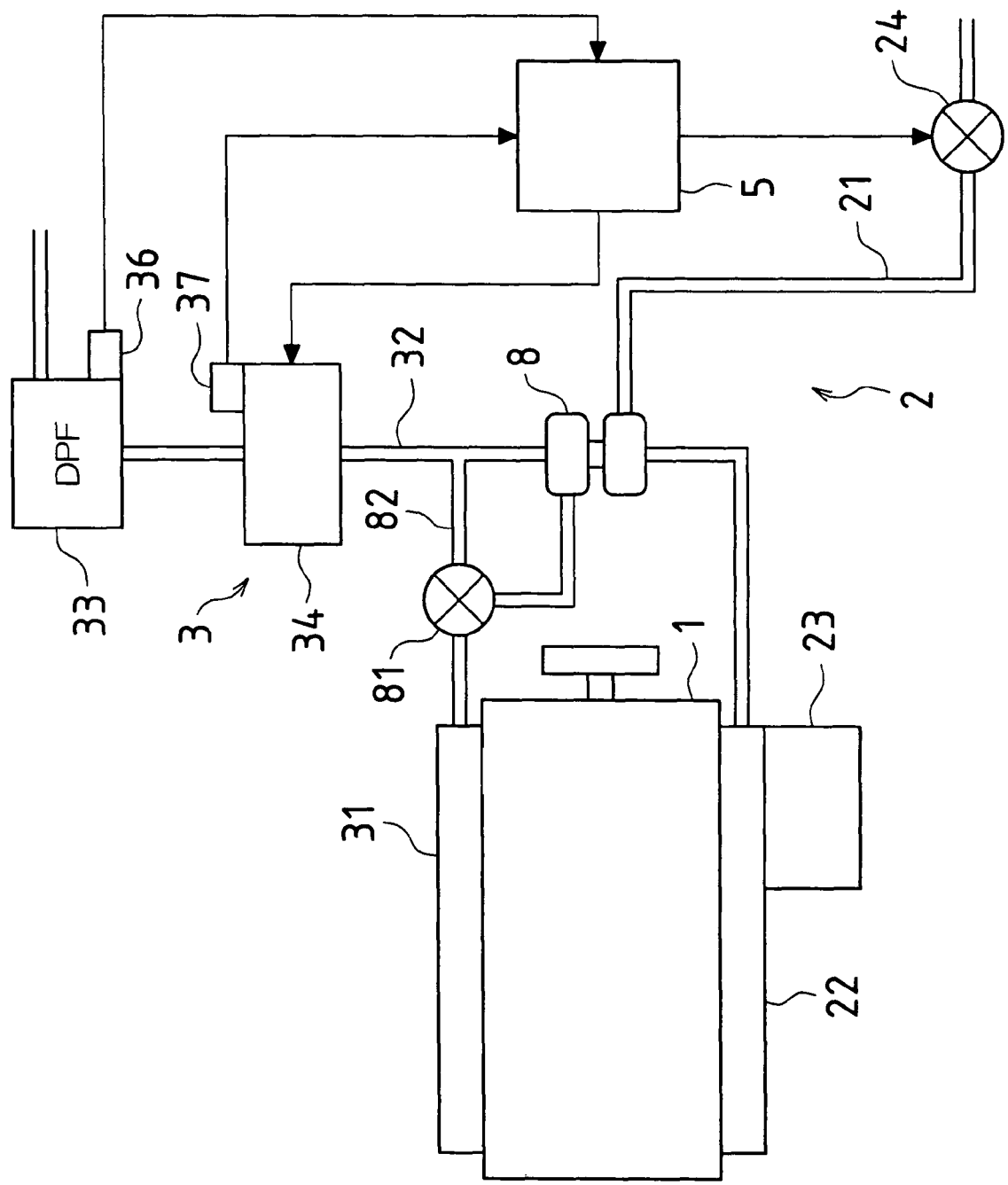
FIG. 20 is a diagram showing a variation of the fifth embodiment, corresponding to FIG. 1.

As shown in FIG. 20, an engine according to this variation is provided with a turbocharger 8. An exhaust pipe 32 is provided with a waste gate valve 81, and a bypass path 82 for causing exhaust gas to bypass the turbocharger 8 when the waste gate valve 81 is opened.

As "threshold values" for switching restoration operations of the DPF 33, a first threshold value and a second threshold value similar to those of the fifth embodiment are set. The first threshold value is set as an air intake throttle amount when the CO and THC generation amount tolerance limit is reached. The second threshold value is set as an air intake throttle amount when surging of the turbocharger 8 occurs while the closed state of the waste gate valve 81 is maintained.

In addition, a third threshold value is set in this embodiment. When surging of the turbocharger 8 occurs (the waste gate valve 81 is closed and the air intake throttle amount then reaches the second threshold value), the surging of the turbocharger 8 is eliminated by opening the waste gate valve 81. Thereafter, by further reducing air intake to a certain level (a certain air intake throttle amount), the engine is likely to stall due to misfire caused by a delay in the ignition time by the air intake throttling operation. The third threshold value is set as such an air intake throttle amount (engine running limit (the limit of misfire)) (see FIG. 18).

A restoration operation of the DPF 33 of this variation is performed as follows. When the exhaust temperature increase control start condition is satisfied, the air intake throttling operation of the air intake throttling device 24 is initially started. When the air intake throttle amount reaches the first threshold value without the exhaust gas temperature reaching the restoration operable temperature, the air intake throttling operation of the air intake throttling device 24 is temporarily suspended (the air intake throttle amount is maintained), and the heating activation of the exhaust temperature increasing device 34 is started. In other words, the exhaust gas temperature is increased while the CO and THC generation amount is suppressed within the CO and THC generation amount tolerance range. Even if a predetermined time has passed since the activation of the exhaust temperature increasing device 34, the exhaust gas temperature detected by the exhaust temperature detecting sensor 37 may not reach the restoration operable temperature. In this case, the air intake throttling operation of the air intake throttling device 24 is resumed so as to increase the air intake throttle amount while the waste gate valve 81 is maintained closed (turbocharging is being performed) until the air intake throttle amount reaches the second threshold value. Thereafter, when the air intake throttle amount reaches the second threshold value without the exhaust gas temperature reaching the restoration operable temperature, the waste gate valve 81 is opened to eliminate surging of the turbocharger 8, and in this situation, the air intake throttle amount is further increased with the third threshold value being set as an upper limit thereof.

Figure 21:
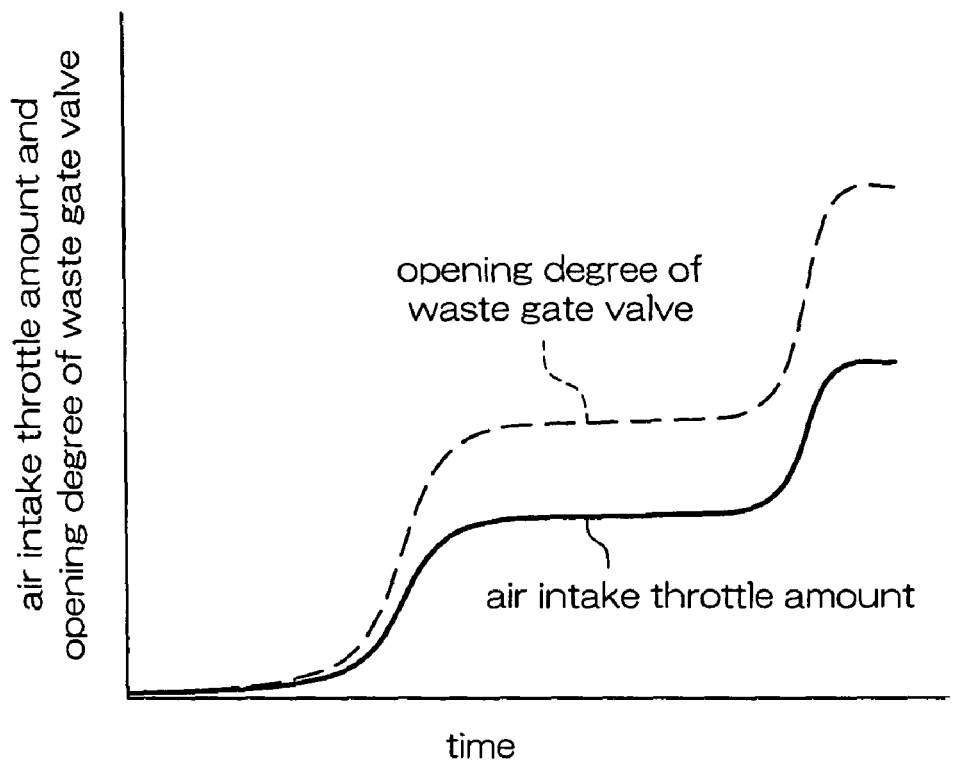
FIG. 21 is a diagram showing exemplary changes over time in the air intake throttle amount of an air intake throttling device and the opening degree of a waste gate valve.

FIG. 21 shows exemplary changes over time in the air intake throttle amount of the air intake throttling device 24 and the opening degree of the waste gate valve 81. Note that, when the waste gate valve 81 is opened as described above, there is no longer the expansion work of exhaust gas in the turbocharger 8, so that exhaust gas can be introduced to the DPF 33 while the exhaust gas temperature is maintained high, thereby making it possible to quickly increase the exhaust gas temperature introduced to the DPF 33 to the restoration operable temperature.

Note that, in the above-described variation, the exhaust system 3 is provided with the bypass path 82 and the waste gate valve 81, and the waste gate valve 81 is opened so as to avoid surging of the turbocharger, thereby making it possible to perform a further reduction in air intake. Instead of this, the air intake system 2 may be provided with a bypass path which bypasses the turbocharger 8 and an air intake bypass valve which opens or closes the bypass path. The air intake bypass valve may be opened so as to avoid surging of the turbocharger, thereby making it possible to perform a further reduction in air intake.

Sixth Embodiment

Next, a sixth embodiment will be described. This embodiment is characterized by an operation of estimating the PM accumulation amount. The other parts and control operations are similar to those of the above-described embodiments. Therefore, the same portions as those of the above-described embodiment will not here described.

A pressure immediately upstream from the DPF 33 which is detected by the PM accumulation amount detecting sensor 36 comprised of a pressure sensor, increases with an increase in an internal temperature of the DPF 33. Therefore, when the PM accumulation amount is estimated based on the pressure immediately upstream from the DPF 33, the internal temperature of the DPF 33 also needs to be taken into consideration in addition to the pressure. When the load or the revolution number of the engine changes, so that the exhaust gas temperature increases, the increase rate of the actual internal temperature of the DPF 33 is delayed from that of the exhaust gas temperature. This is because the DPF 33 itself has a heat capacity.

In this embodiment, taking into consideration that the internal temperature of the DPF 33 has an influence on the pressure immediately upstream from the DPF 33 described above, and that the increase of the actual internal temperature of the DPF 33 is delayed from that of the exhaust gas temperature, the estimated value of the PM accumulation amount calculated from the actually detected values (the values of the pressure immediately upstream from the DPF 33 and the exhaust gas temperature) may be corrected using a correction amount which depends on these pressure and temperature values.

Figure 22:
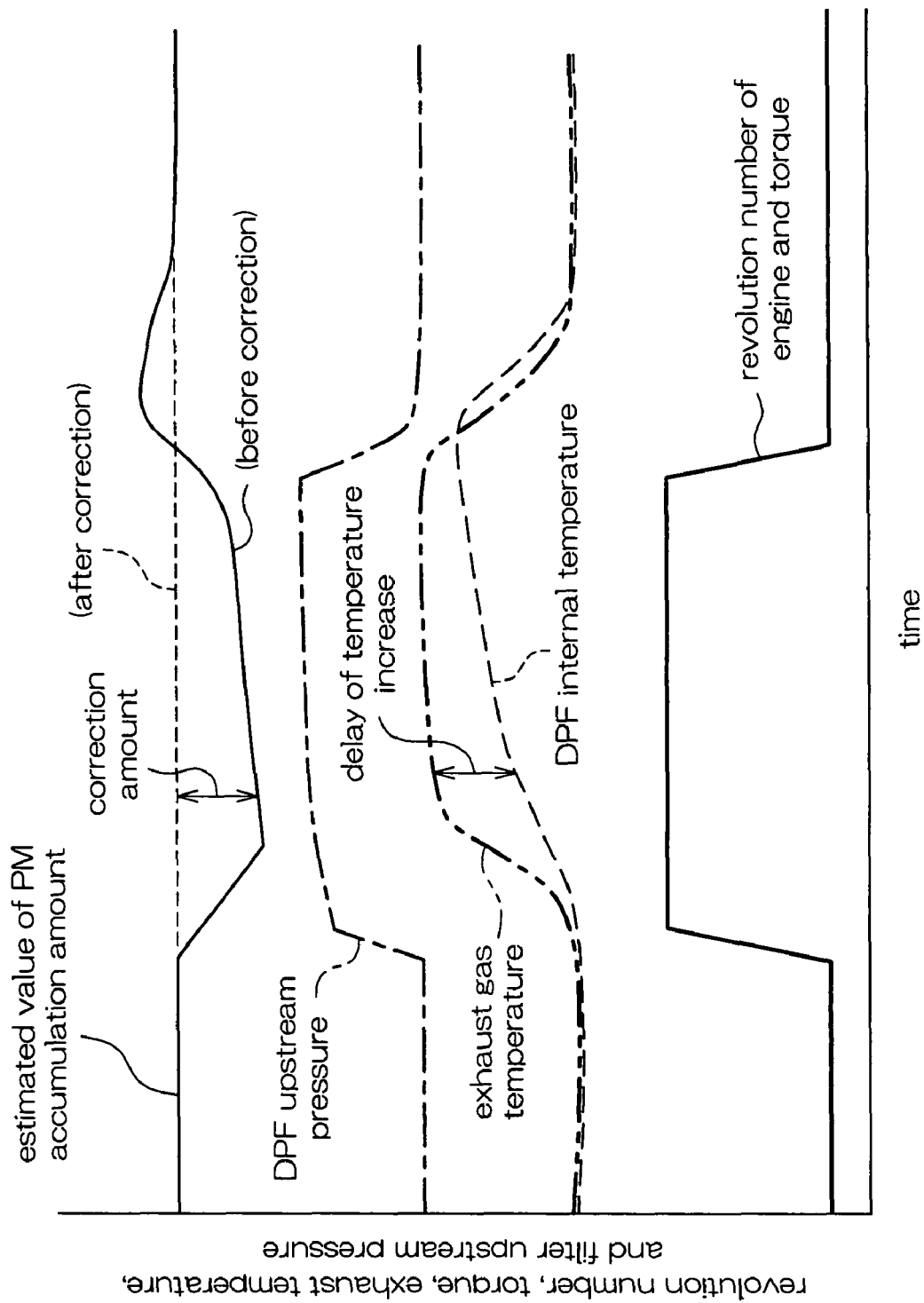
FIG. 22 is a diagram showing exemplary changes over time in the revolution number of an engine, an exhaust gas temperature, an internal temperature of a DPF, a pressure immediately upstream from the DPF, and an estimated value of a PM accumulation amount in a sixth embodiment.

FIG. 22 shows exemplary changes over time in the revolution number of the engine, the exhaust gas temperature (detected value), the internal temperature of the DPF 33, the pressure immediately upstream from the DPF 33 (detected value), and the estimated value of the PM accumulation amount. As shown in FIG. 22, as the revolution number of the engine is increased, the exhaust gas temperature and the pressure immediately upstream from the DPF 33 rapidly increase. In contrast to this, the internal temperature of the DPF 33 slowly increases. The detected pressure immediately upstream from the DPF 33 is affected by the internal temperature of the DPF 33 and therefore is slightly deviated from the true pressure value. Specifically, the pressure immediately upstream from the DPF 33 is detected as a pressure lower than the true pressure value. When the PM accumulation amount is estimated based only on the detected pressure value, the resultant accumulation amount is smaller than the actual accumulation amount.

Therefore, here, the internal temperature of the DPF 33 is estimated, depending on a change in the detected exhaust gas temperature, and a correction amount for the estimated value of the PM accumulation amount is determined based on the estimated internal temperature of the DPF 33 and the detected pressure immediately upstream from the DPF 33. Specifically, estimated values of the PM accumulation amount indicated by a solid line in FIG. 22 are calculated based on the detected pressures immediately upstream from the DPF 33. By correcting the estimated values using predetermined correction amounts, estimated values of the PM accumulation amount indicated by a dashed line in FIG. 22 are calculated. Thereby, the PM accumulation amount can be correctly estimated by considering that the pressure immediately upstream from the DPF 33 is affected by the internal temperature of the DPF 33 and that the actual increase of the internal temperature of the DPF 33 is delayed from the increase of the exhaust gas temperature.

Although it has been described in the sixth embodiment that the internal temperature of the DPF 33 is estimated, depending on a change in the detected exhaust gas temperature, the internal temperature of the DPF 33 may be estimated, depending on a change in the revolution number or torque of the engine.

Seventh Embodiment

Next, a seventh embodiment will be described. This embodiment is characterized by a control which sets timing of starting the restoration operation of the DPF 33. The other parts and control operations are similar to those of the above-described embodiments. Therefore, the same portions as those of the above-described embodiment will not here described.

As a PM collection operation and a restoration operation of the DPF 33 are repeatedly performed, PM which is not removed by the restoration operation is accumulated in the DPF 33. Such PM includes the ash of lubricating oil, the abrasion powder of the engine, and the like. Due to their presence, even if the restoration operation is performed for a long time, the pressure immediately upstream from the DPF 33 cannot be returned (decreased) to the immediately upstream pressure of a brand-new product. In such a situation, when a pressure at which restoration of the DPF 33 is started is set to be a predetermined value, the following problem arises.

Figure 23:
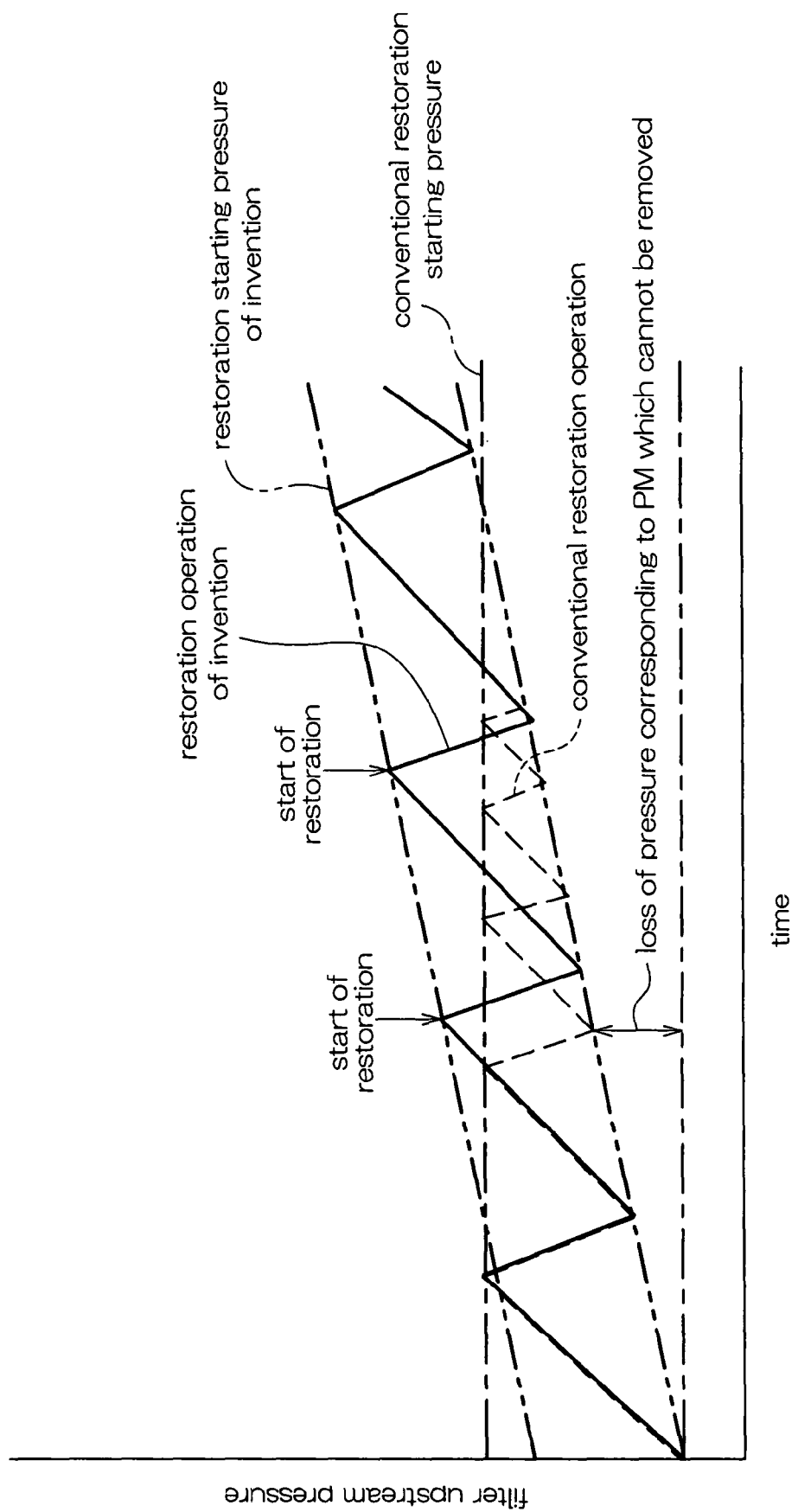
FIG. 23 is a diagram showing changes in a pressure immediately upstream from a DPF in a seventh embodiment.

Specifically, a restoration operation may be ended when a predetermined time has passed since the start of the restoration operation. In this case, at the end of the restoration operation, the pressure immediately upstream from the DPF 33 has already been higher than that of a brand-new product, so that a difference from the restoration starting pressure is smaller. The difference is decreased every time the PM collection operation and restoration operation of the DPF 33 is repeated. Therefore, a time interval from the time of the end of the restoration operation until the pressure immediately upstream from the DPF 33 reaches the restoration starting pressure decreases, so that the frequency of execution of a restoration operation increases. In FIG. 23, a dashed line indicates a situation where the frequency of execution of a restoration operation gradually increases.

On the other hand, if a restoration operation is ended when the pressure immediately upstream from the DPF 33 decreases to a predetermined pressure (restoration ending pressure) after the start of the restoration operation, the pressure immediately upstream from the DPF 33 at the end of restoration increases every time the PM collection operation and restoration operation of the DPF 33 are repeated as described above. Therefore, even when the restoration operation is performed for a long time, the pressure immediately upstream from the DPF 33 does not decrease to the restoration ending pressure. In such a situation, the restoration operation cannot be end.

Therefore, in this embodiment, a fuel injection amount of an engine to which the DPF 33 is attached is integrated since it is brand-new. Both the restoration starting pressure and the restoration ending pressure are updated with gradually increasing values, depending on the integration value. In FIG. 23, a dash-dot-dot line indicates set values of the restoration starting pressure and the restoration ending pressure. In FIG. 23, a solid line indicates how restoration operations are executed (changes in the pressure immediately upstream from the DPF 33). As can be seen from FIG. 23, according to this embodiment, restoration operations can be executed in constant intervals, and a situation where a restoration operation cannot be ended is avoided.

Eighth Embodiment

Next, an eighth embodiment will be described. This embodiment is characterized by setting of a restoration temperature (target temperature) of the DPF 33. The other parts and control operations are similar to those of the above-described embodiments. Therefore, the same portions as those of the above-described embodiment will not here described.

Figure 24:
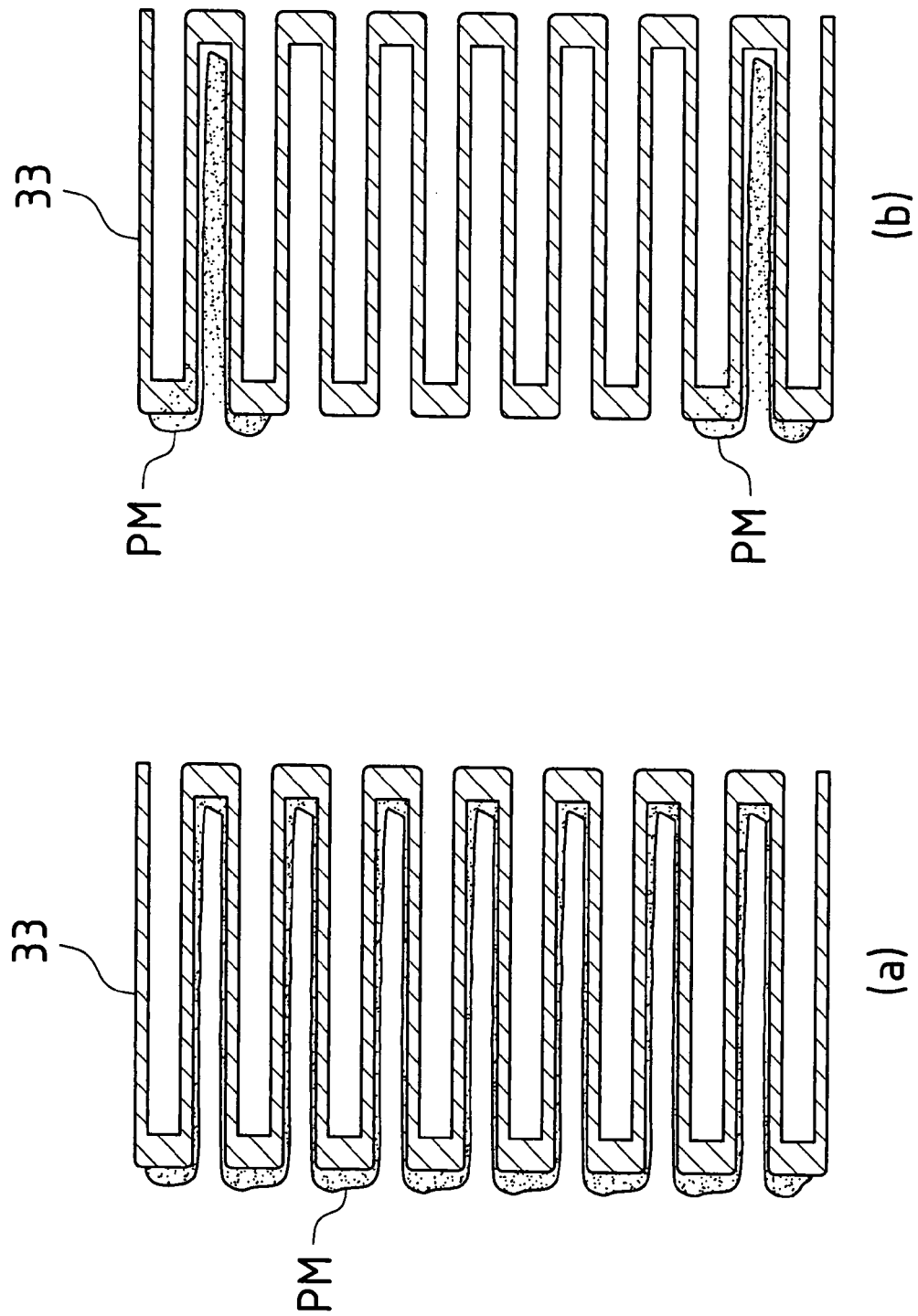
FIG. 24 is a diagram according to an eighth embodiment.

When the DPF 33 is restored, the internal temperature distribution is such that a center portion thereof has a high temperature (the restoration operable temperature or more), while an outer circumferential portion thereof has a relatively low temperature because it is exposed to the atmosphere. Therefore, it is likely that the outer circumferential portion does not reach the restoration operable temperature, so that faulty restoration occurs. If such a state continues, PM is accumulated in high density in the outer circumferential portion, and the PM is oxidized and its temperature is considerably increased during a restoration operation or the like, likely leading to melting damage of the DPF 33. FIG. 24(a) is a cross-sectional view showing an inner portion of the DPF 33 before the start of a restoration operation. FIG. 24(b) is a cross-sectional view of the inner portion of the DPF 33 after the restoration operation, indicating that PM is accumulated in the outer circumferential portion.

Therefore, in this embodiment, a pressure immediately upstream from the DPF 33 is detected upon completion of a restoration operation. When the pressure is higher than a predetermined value, it is determined that faulty restoration occurs in the outer circumferential portion of the DPF 33 and PM is accumulated in the outer circumferential portion. Therefore, a restoration temperature (target temperature) in the next restoration operation is set to be higher than the current restoration temperature (e.g., increased by 50 degrees). Thereby, in the next restoration operation, the temperature of the outer circumferential portion of the DPF 33 is increased. When the temperature reaches the restoration operable temperature, PM can be removed from the outer circumferential portion. When the pressure immediately upstream from the DPF 33 is still higher than the predetermined value upon completion of the current restoration operation, a restoration temperature (target temperature) in the next restoration operation is set to be even higher. Thus, the restoration temperature continues to be updated until the restoration temperature reaches the temperature at which PM can be removed from the outer circumferential portion of the DPF 33 by a restoration operation.

Figure 25:
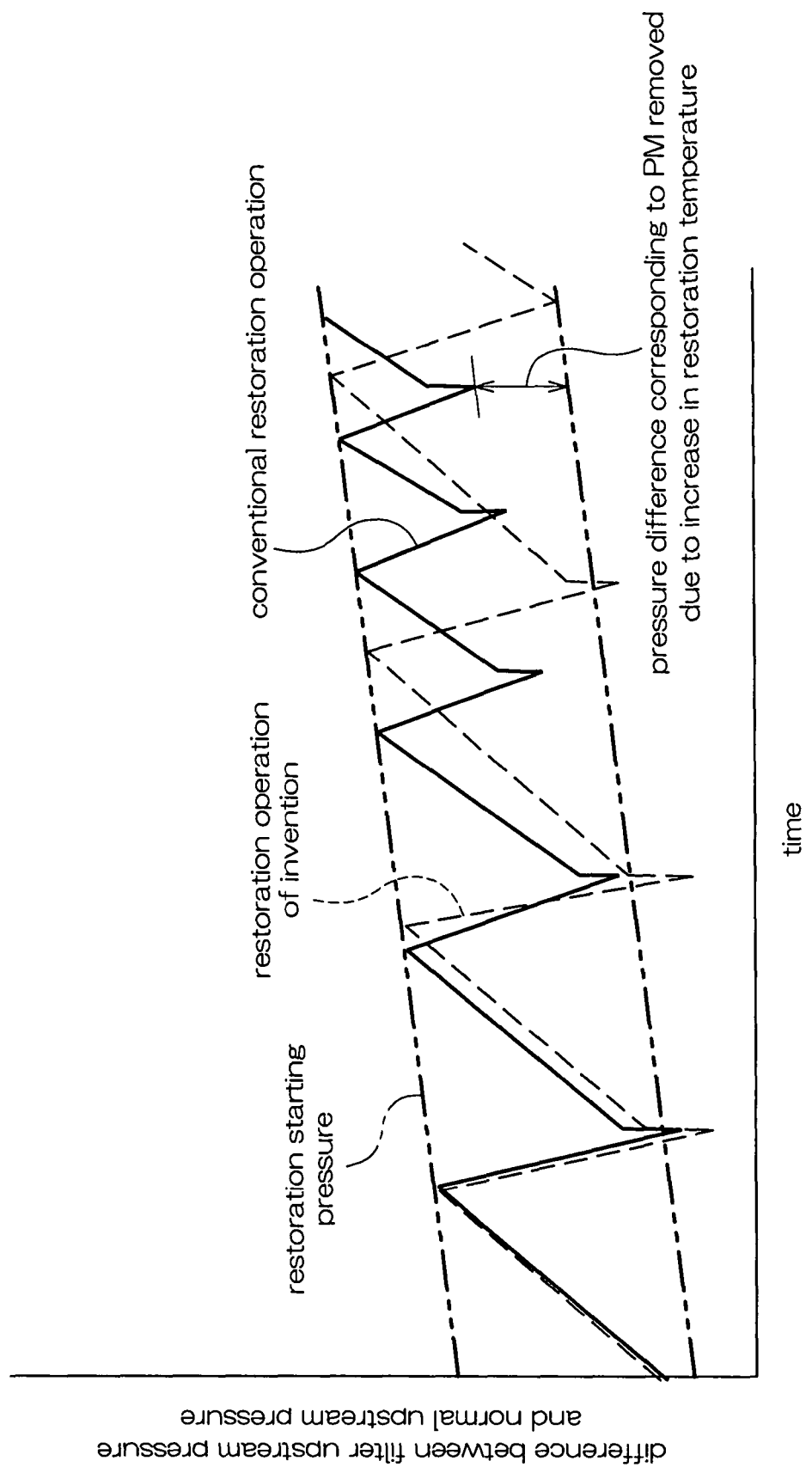
FIG. 25 is a diagram showing exemplary changes over time in a pressure immediately upstream from a DPF when a restoration temperature is changed and when the restoration temperature is not changed in an eighth embodiment.

FIG. 25 is a diagram showing changes over time in the pressure immediately upstream from the DPF 33 when the restoration temperature is changed as described above and when the restoration temperature is not changed. In FIG. 25, a solid line indicates changes in the pressure when the restoration temperature is not changed, while a dashed line indicates changes in the pressure when the restoration temperature is changed. Thus, when the restoration temperature is not changed, the accumulation amount of PM in the outer circumferential portion of the DPF 33 increases, so that the pressure immediately upstream from the DPF 33 upon completion of a restoration operation also increases. In contrast to this, in this embodiment, by changing the restoration temperature, it is possible to effectively remove PM from the outer circumferential portion of the DPF 33 (the pressure immediately upstream from the DPF 33 is maintained low upon completion of a restoration operation), thereby making it possible to execute restoration operations in constant intervals without an increase in the frequency of the restoration operation.

Ninth Embodiment

Next, a ninth embodiment will be described. This embodiment is characterized by setting of timing with which restoration of the DPF 33 is ended. The other parts and control operations are similar to those of the above-described embodiments. Therefore, the same portions as those of the above-described embodiment will not here described.

During a restoration operation of the DPF 33, the air intake throttling operation or the heating operation of the electric heater is performed, so that the fuel efficiency of the engine is deteriorated. Therefore, the restoration operation is preferably executed as quickly as possible.

Figure 26:
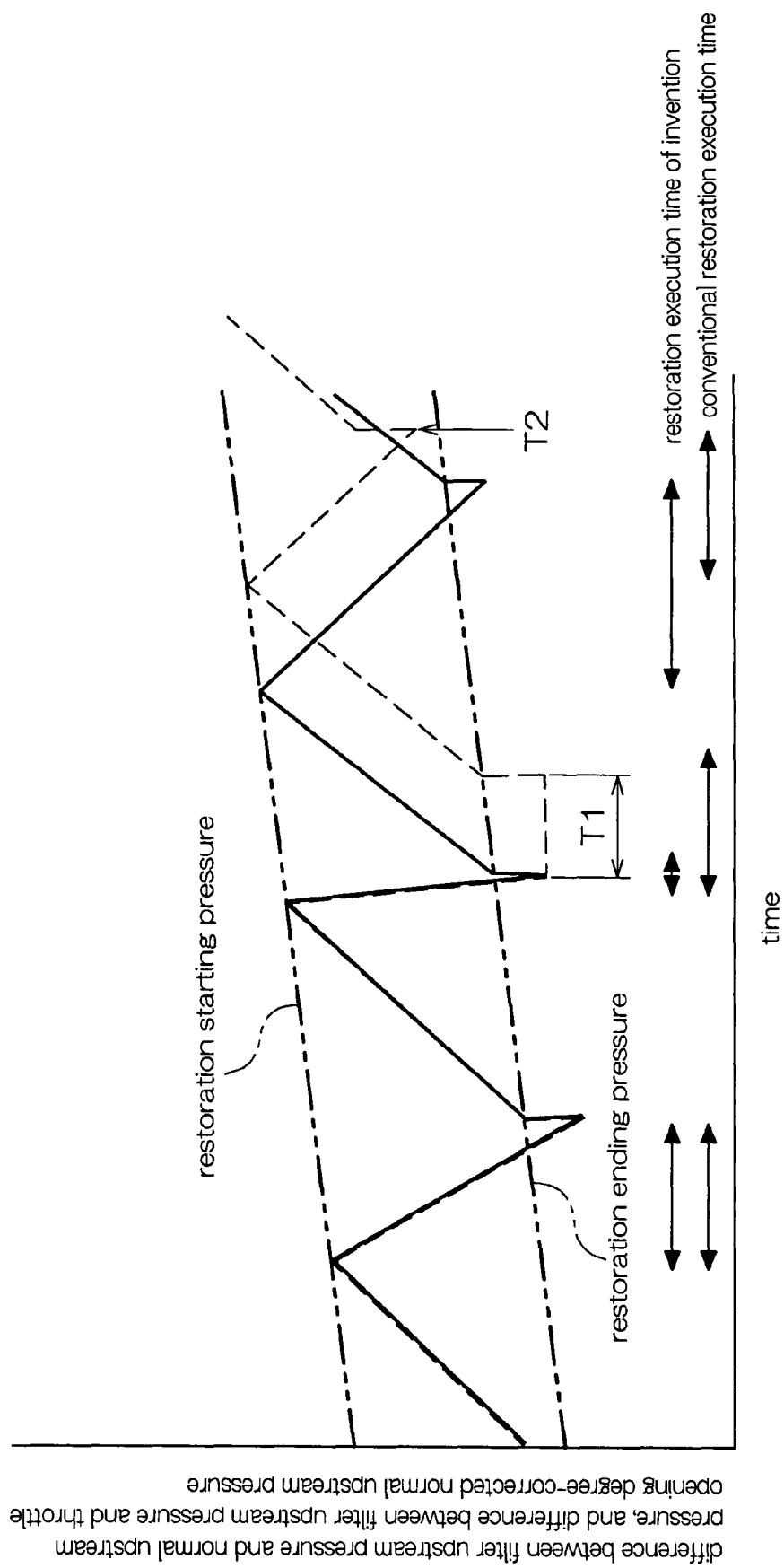
FIG. 26 is a diagram showing changes in a pressure immediately upstream from a DPF in a ninth embodiment.

In this embodiment, as in the seventh embodiment, for example, the fuel injection amount of the engine is integrated from when it is brand-new (the DPF 33 is attached), and the restoration ending pressure is updated with a gradually increasing value, depending on the integrated value. In FIG. 26, a dashed line indicates changes in pressure in a case where a restoration operation is ended when a predetermined time has passed since the start of the restoration operation. As shown in FIG. 26, when the restoration ending timing is set based on time, the restoration operation may be continued, though restoration has been sufficiently done, so that a useless restoration operation may be performed (time T1 in FIG. 26), or the restoration operation may be ended, though restoration has not yet been completed (timing T2 in FIG. 26).

In contrast to this, according to this embodiment, the execution time of a restoration operation is changed, depending on the state of restoration of the DPF 33. Thereby, the restoration operation (the air intake throttling operation or the heating operation of the electric heater) can be ended substantially at the same time when restoration is completed (see a solid line in FIG. 26). Therefore, the situation where a useless restoration operation is performed and the situation where a restoration operation is ended, though restoration has not yet been completed, can be avoided, thereby making it possible to improve the reliability of a restoration operation.

Tenth Embodiment

Next, a tenth embodiment will be described. This embodiment is characterized by an operation of setting (returning) the restoration temperature (target temperature) of the DPF 33 which is set to be high in the eighth embodiment, to be lower. The other parts and control operations are similar to those of the above-described embodiments. Therefore, the same portions as those of the above-described embodiment will not here described.

When the pressure immediately upstream from the DPF 33 sharply decreases, i.e., removal of PM has been completed quickly, heat is largely generated in the DPF 33, leading to abnormal restoration which is likely to damage the DPF 33. Therefore, in this embodiment, the pressure immediately upstream from the DPF 33 is monitored. When the pressure sharply decreases, the restoration temperature (target temperature) of the DPF 33 which is set to be high in the eighth embodiment, is set to be lower.

Figure 27:
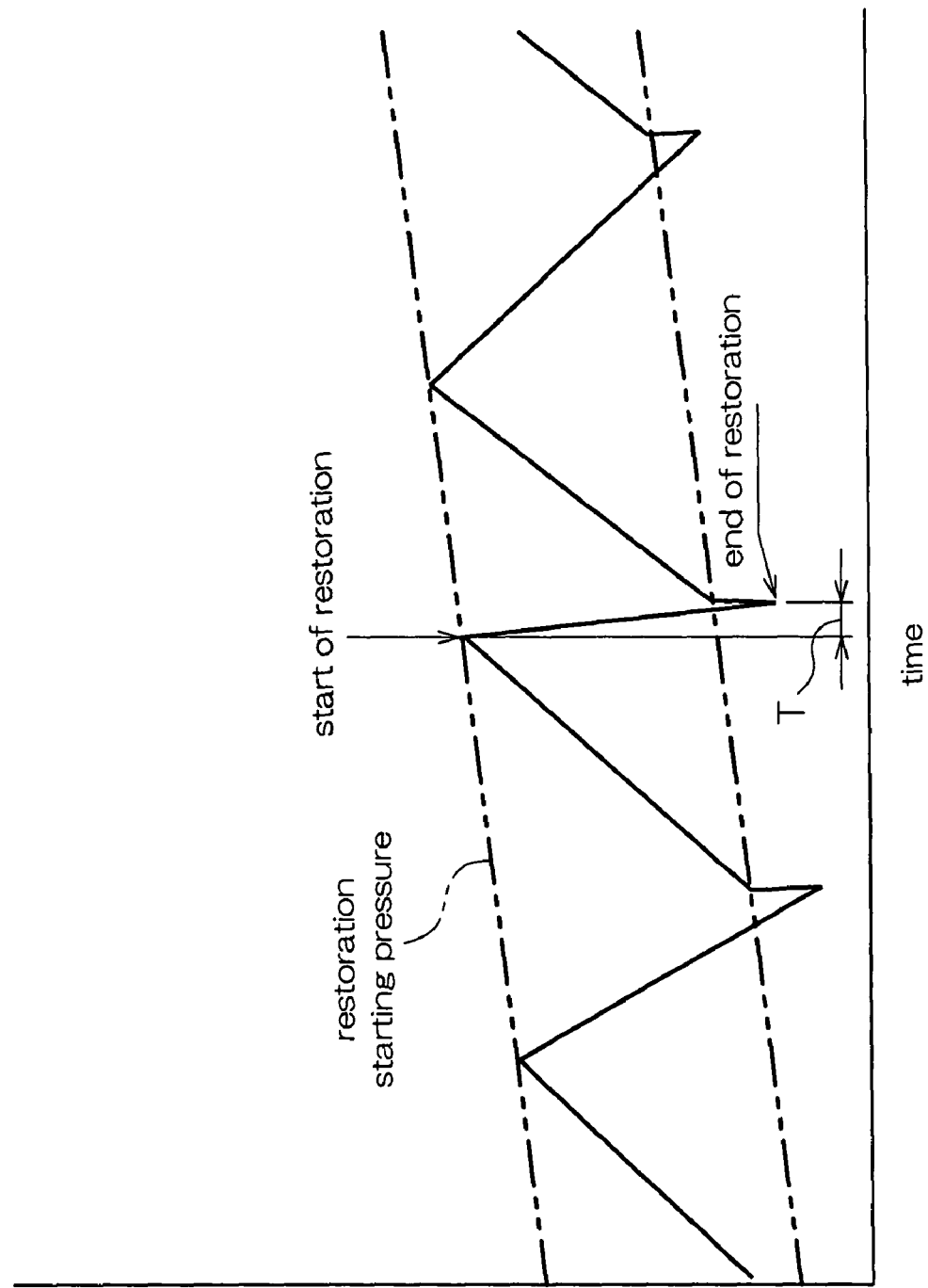
FIG. 27 is a diagram showing changes in a pressure immediately upstream from a DPF in a tenth embodiment.

Specifically, when the execution time of a restoration operation is extremely short or when a change gradient (decreasing gradient) of the pressure immediately upstream from the DPF 33 is steep (a region T in FIG. 27), it is determined that PM remaining in the outer circumferential portion of the DPF 33 has been removed, so that the restoration temperature (target temperature) of the DPF 33 is set to be lower. As this operation, the restoration temperature may be decreased by a predetermined temperature (e.g., 50 degrees) every time a restoration operation is executed, or alternatively, the restoration temperature may be decreased to the restoration operable temperature (300° C.) at once.

—Variation of Tenth Embodiment—

A variation of the tenth embodiment will be hereinafter described. In this embodiment, when the pressure immediately upstream from the DPF 33 sharply decreases, a restoration operation is ended even if the restoration operation has not yet been completed. Thereby, abnormal restoration is reliably avoided in the DPF 33 to avoid damage of the DPF 33.

Figure 28:
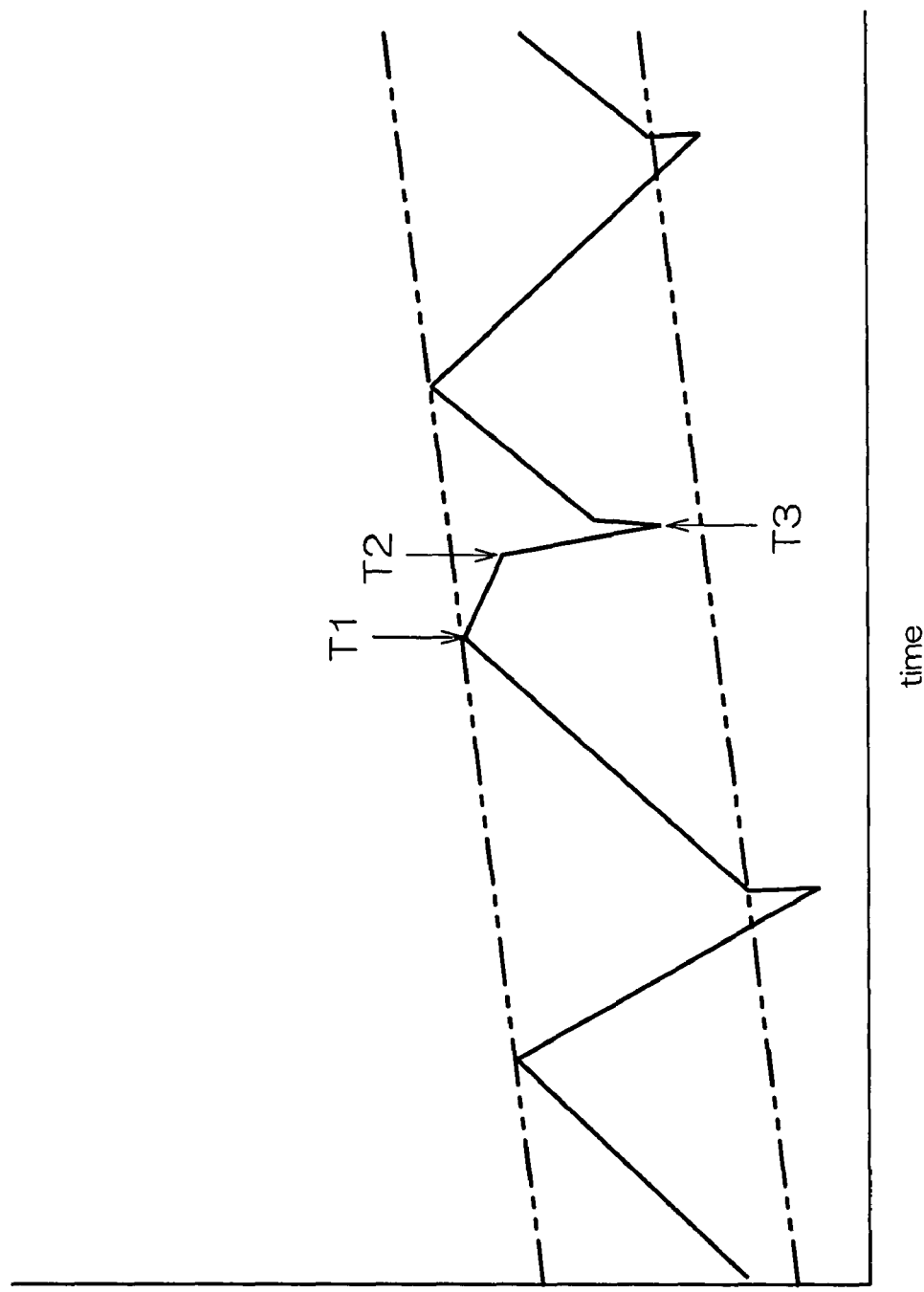
FIG. 28 is a diagram showing changes in a pressure immediately upstream from a DPF in a variation of the tenth embodiment.

In FIG. 28, a restoration operation is started with timing T1, restoration proceeds so that the pressure immediately upstream from the DPF 33 gradually (relatively slowly) decreases, and thereafter, the pressure sharply decreases (the pressure sharply decreases with timing T2 in FIG. 28). Therefore, the restoration operation is ended with timing T3 in FIG. 28 (the air intake throttling operation and the heating operation of the electric heater is forbidden), thereby avoiding damage of the DPF 33.

Eleventh Embodiment

Next, an eleventh embodiment will be described. This embodiment relates to a technique for avoiding melting damage of the DPF 33 which is caused because the restoration reaction of the DPF 33 continues after the engine is suspended. The other parts and control operations are similar to those of the above-described embodiments. Therefore, the same portions as those of the above-described embodiment will not here described.

Figure 29:
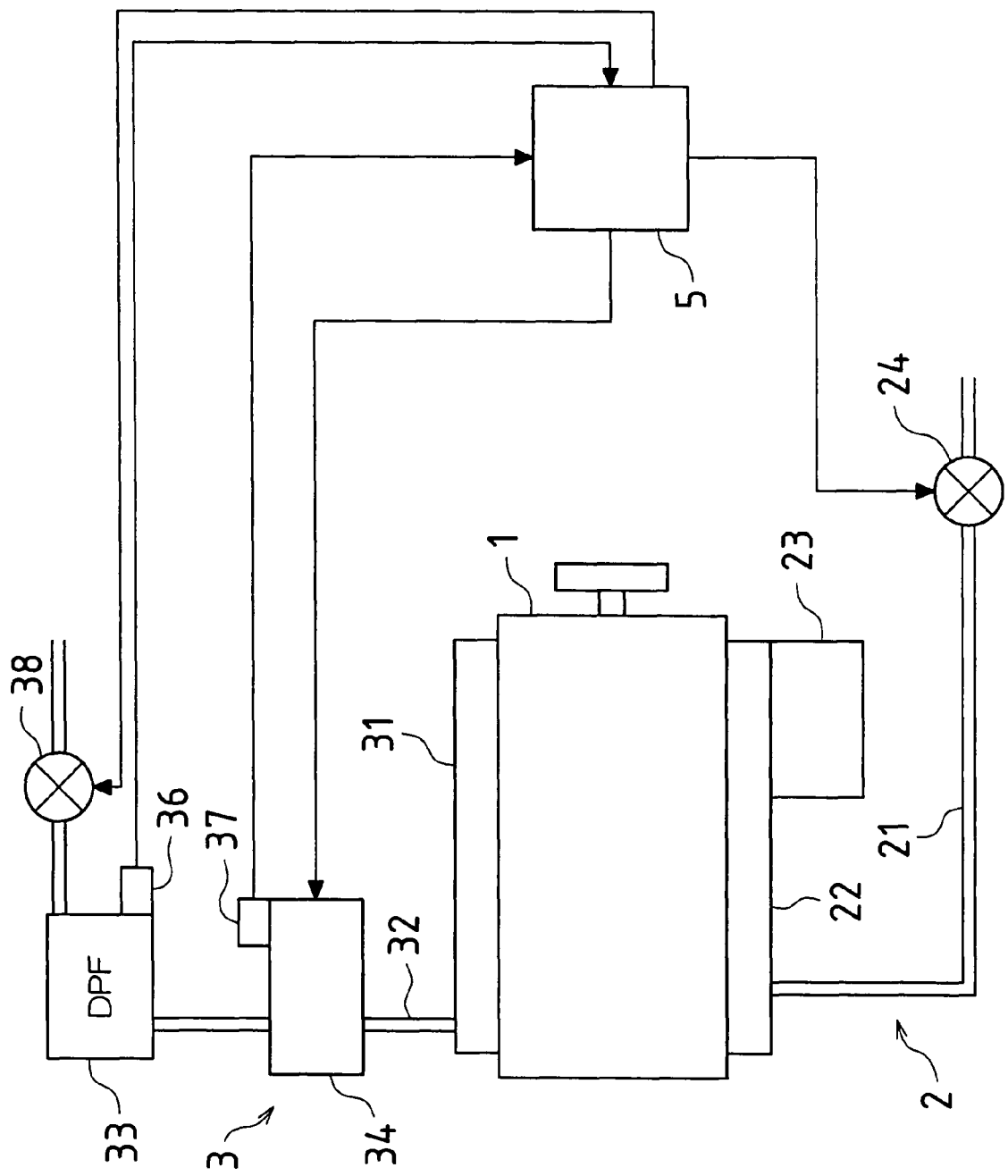
FIG. 29 is a diagram showing an eleventh embodiment, corresponding to FIG. 1.

As shown in FIG. 29, in an engine according to this embodiment, the exhaust pipe 32 is provided with an exhaust throttling device (exhaust throttling means) 38 downstream from the DPF 33. Specifically, the exhaust throttling device 38 comprises a butterfly valve and an actuator which rotates the butterfly valve to change the flow path area of the exhaust pipe 32 (both not shown) as with the air intake throttling device 24, and the actuator is controlled by the controller 5. Note that the valve mechanism is not limited to butterfly valves, and shutter valves and the like are applicable.

Figure 30:
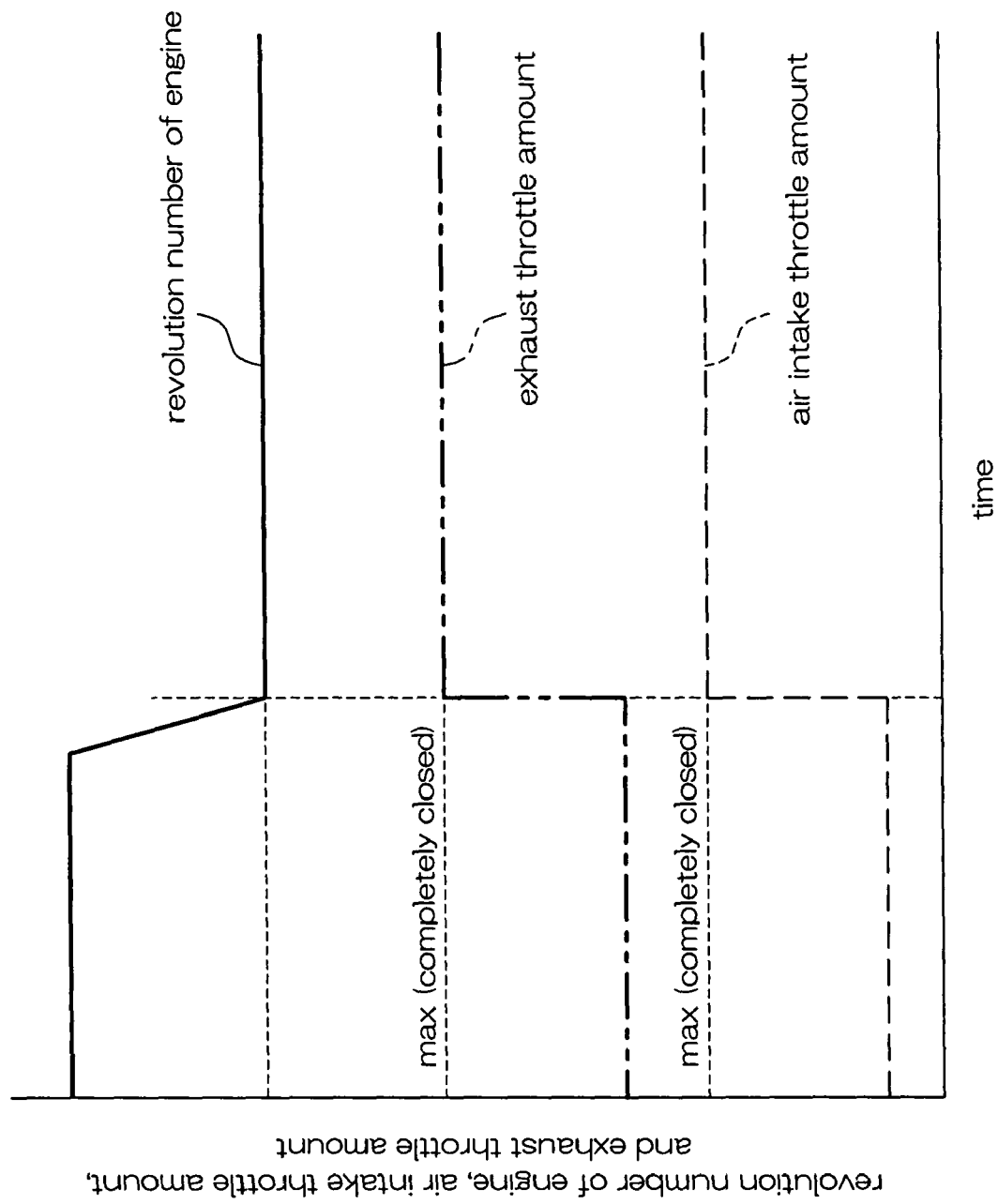
FIG. 30 is a diagram showing changes over time in the revolution number of an engine, an exhaust throttle amount, and an air intake throttle amount in an eleventh embodiment.

In this embodiment, as shown in FIG. 30 (indicating changes over time in the revolution number of the engine, the exhaust throttle amount, and the air intake throttle amount), when the engine is suspended, the throttle amount of the air intake throttling device 24 is maximized (completely closed), and the throttle amount of the exhaust throttling device 38 is maximized (completely closed). Thereby, air (oxygen) is prevented from being introduced to the DPF 33 from the air intake system 2 and the exhaust system 3, thereby forbidding progress of the restoration reaction of the DPF 33. Thereby, melting damage of the DPF 33 is avoided.

—Variation in Eleventh Embodiment—

Figure 31:
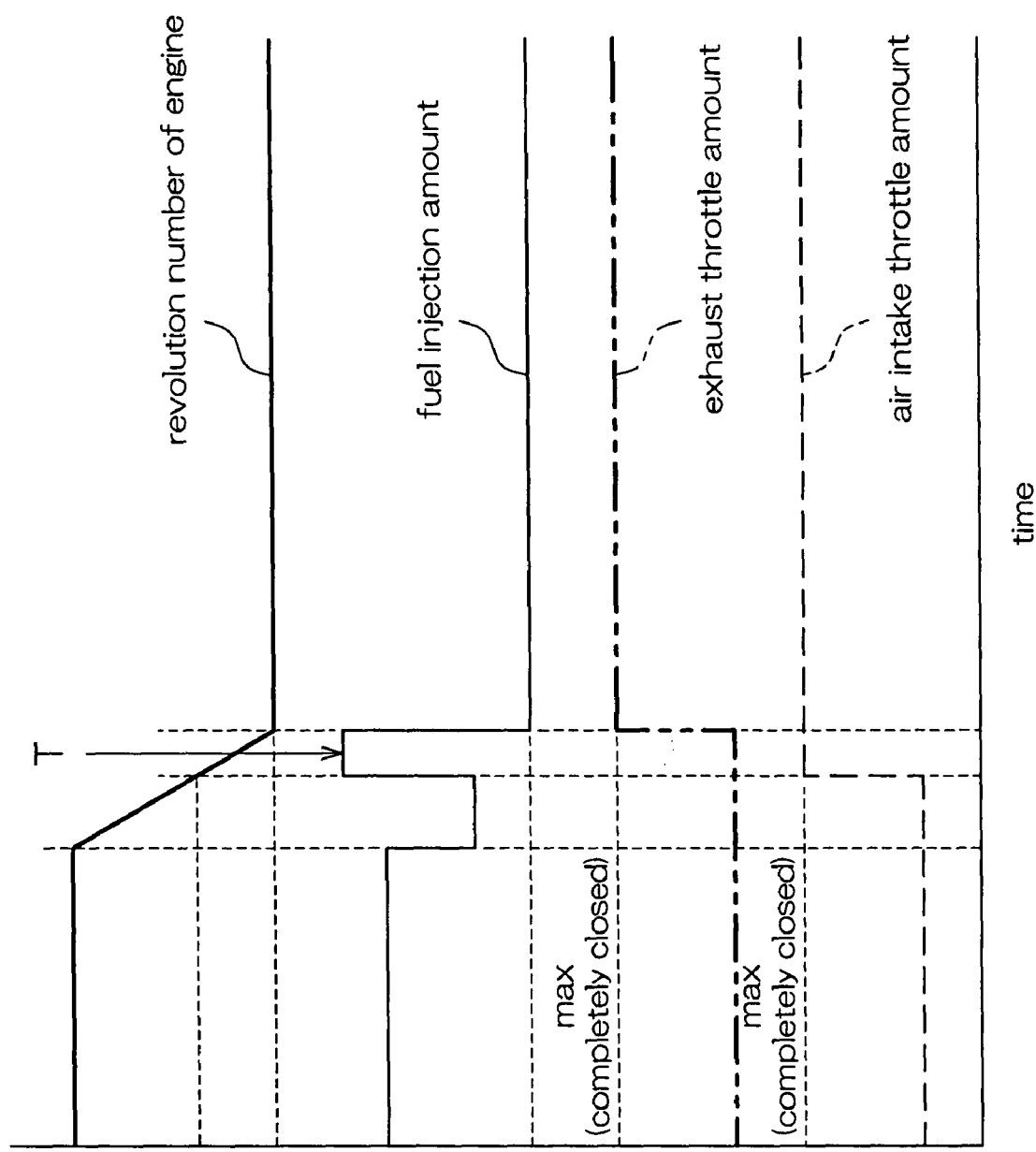
FIG. 31 is a diagram showing changes over time in the revolution number of an engine, a fuel injection amount, an exhaust throttle amount, and an air intake throttle amount in a variation of the eleventh embodiment.

A variation of the eleventh embodiment will be hereinafter described. In this embodiment, as shown in FIG. 31 (indicating changes over time in the revolution number of the engine, the fuel injection amount, the exhaust throttle amount, and the air intake throttle amount), not only the throttle amount of the air intake throttling device 24 is maximized (completely closed) and the throttle amount of the exhaust throttling device 38 is maximized (completely closed) when the engine is suspended, but also fuel injection which has been suspended in the engine suspension operation is executed when the revolution number of the engine decreases to a predetermined revolution number (e.g., about 700 rpm) (timing T in FIG. 31). Thereby, oxygen remaining in the cylinder is subjected to combustion so as to avoid introduction of oxygen to the DPF 33, thereby forbidding progress of the restoration reaction of the DPF 33 so as to avoid melting damage of the DPF 33. In this case, the fuel injection amount is preferably set to be larger than the fuel injection amount immediately before the start of the engine suspension operation, thereby reliably performing combustion of remaining oxygen. The throttle amount of the exhaust throttling device 38 may be maximized either after the throttle amount of the air intake throttling device 24 is maximized and immediately after fuel injection is executed during suspension of the engine, or at the same time when the throttle amount of the exhaust throttling device 38 is maximized.

Twelfth Embodiment

Next, a twelfth embodiment will be described. The twelfth embodiment is the same as the first embodiment which has been described with reference to FIG. 1, except for the following points. Therefore, the same portions will be described as less as possible, and differences will be mainly described.

Firstly, a specific structure of the filter main body housed in the casing of the DPF 33 and a configuration of the PM accumulation amount detecting sensor 36 will be described.

—Filter Main Body 35—

Figure 32:
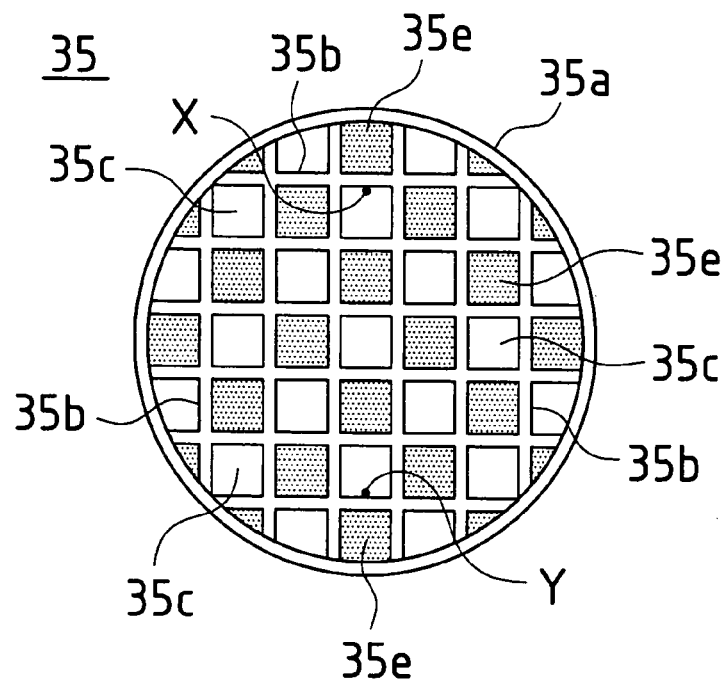
FIG. 32 is a diagram showing a filter main body as viewed from a direction along a flow direction of exhaust gas.

A specific structure of a filter main body 35 will be hereinafter described. As shown in FIG. 32 (a view of the filter main body 35 as viewed in a direction along a flow direction of exhaust gas) and FIG. 33 (a cross-sectional view of the filter main body 35 as viewed in a direction perpendicular to the flow direction of exhaust gas), the filter main body 35, which has substantially a cylindrical shape, comprises an outer circumferential wall 35a and a partition wall 35b which is integrally formed in a lattice within an internal circumference of the outer circumferential wall 35a. By the partition wall 35b, a number of flow paths 35c, 35d, ... are formed in a honeycomb structure.

Figure 33:
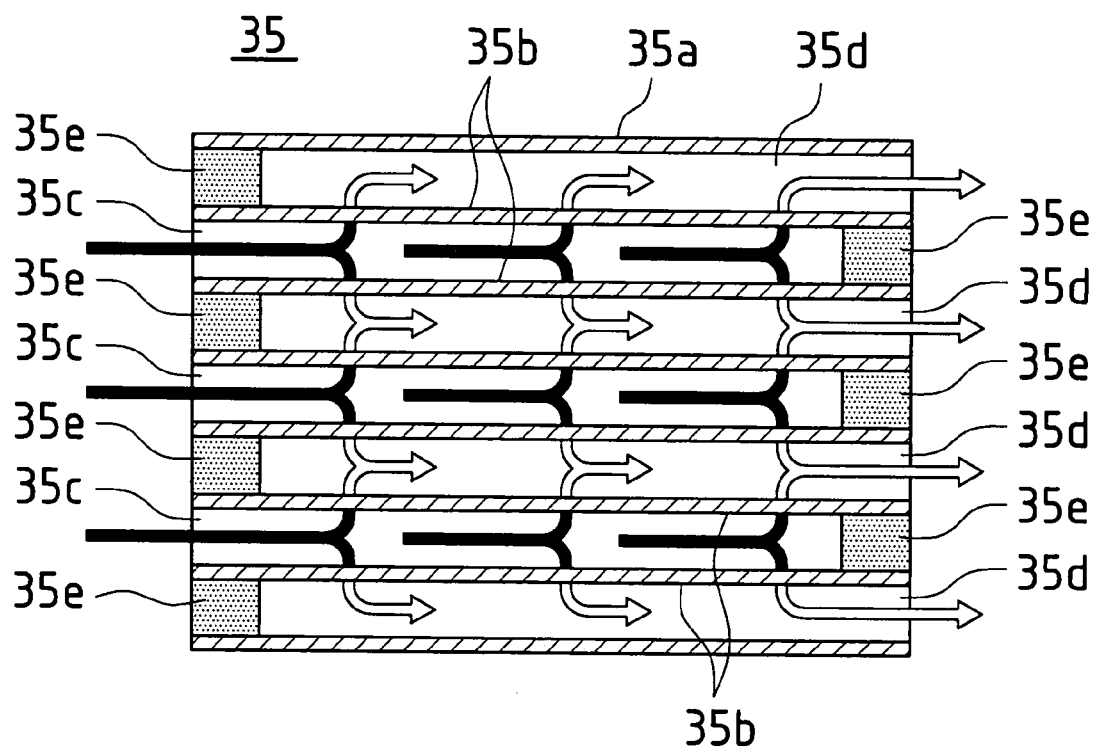
FIG. 33 is a diagram showing the filter main body as viewed from a direction perpendicular to the flow direction of exhaust gas.

As the flow paths 35c, 35d, ..., primary flow paths 35c which are sealed by sealing members 35e only at an exhaust gas flow-out side, and secondary flow paths 35d which are sealed by sealing members 35e only at an exhaust gas flow-in side, are alternately provided. With this structure, exhaust gas flowing into the primary flow path 35c passes through the partition wall 35b to flow into the secondary flow path 35d before being emitted out through the exhaust pipe 32. In other words, when the exhaust gas passes through the partition wall 35b, PM contained in the exhaust gas is collected at the primary side of the filter main body 35. In FIG. 33, arrows indicate flows of exhaust gas in the flow paths 35c, 35d, ..., and closed arrows indicate exhaust gas containing PM, i.e., exhaust gas flowing in the primary flow paths 35c. Open arrows indicate exhaust gas after PM is collected and removed, i.e., exhaust gas flowing in the secondary flow paths 35d.

The filter main body 35 is formed of a nonconductive material, such as porous cordierite ceramics, silicon carbide, alumina, mullite, silicon nitride, or the like, which has heat resistance, oxidation resistance, and thermal shock resistance. The filter main body 35 also has an oxidation catalyst, such as platinum or the like. Thereby, in the DPF 33, when the exhaust gas temperature exceeds a predetermined temperature (e.g., 300° C.; hereinafter referred to as a "restoration operable temperature"), the chemical reaction is carried out, so that PM is removed by oxidation, i.e., the DPF 33 is restored.

—PM Accumulation Amount Detecting Sensor 36—

This embodiment is characterized by a configuration of the PM accumulation amount detecting sensor 36 for detecting the PM accumulation amount in the filter main body 35. Hereinafter, the configuration of the PM accumulation amount detecting sensor 36 will be described.

Figure 34:
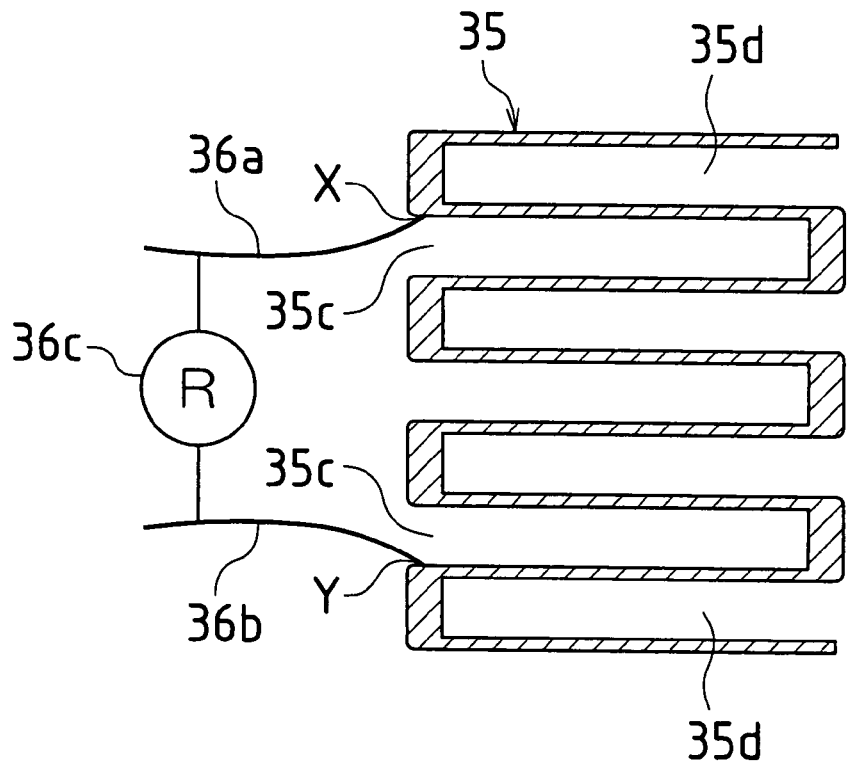
FIG. 34 is a cross-sectional view schematically showing a filter main body before accumulation of PM.

FIG. 34 is a cross-sectional view schematically showing the filter main body 35 (corresponding to FIG. 33). As shown in FIG. 34, electrical wires (conductive wires) 36a and 36b are connected to two portions (points X and Y in FIG. 34) of an inner surface of the primary flow path 35c in the filter main body 35. An electrical resistance detecting sensor 36c is connected to the electrical wires 36a and 36b. In other words, the electrical resistance detecting sensor 36c can detect an electrical resistance value between the two portions X and Y (the portions to which the electrical wires 36a and 36b are connected) of the inner surface of the primary flow path 35c. Information about the electrical resistance value thus detected is transmitted to an accumulation amount estimating means (described below) provided in the restoration controller 5.

Figure 35:
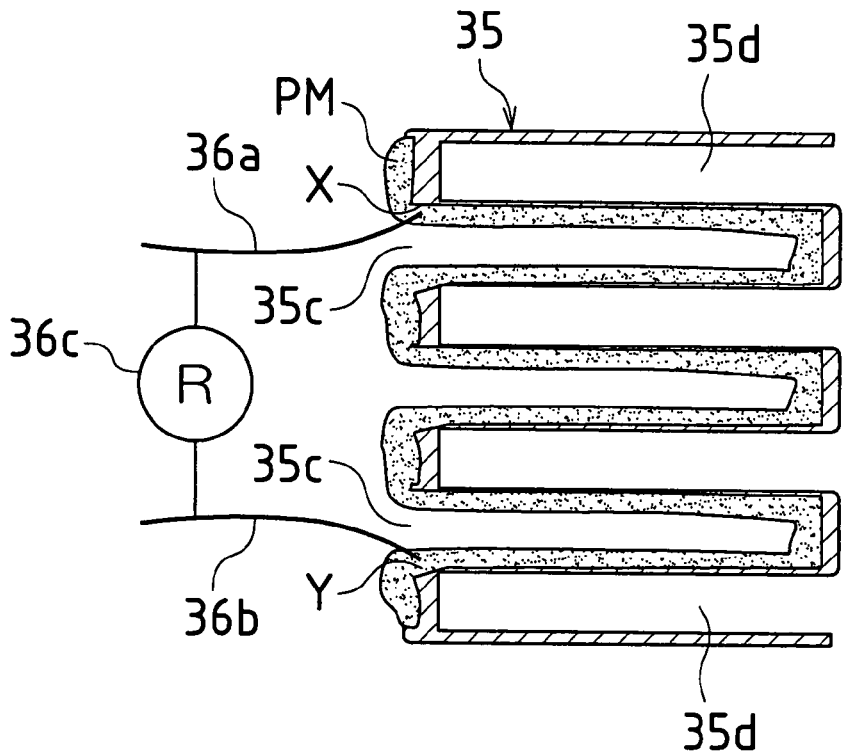
FIG. 35 is a cross-sectional view schematically showing the filter main body after accumulation of PM.
Figure 36:
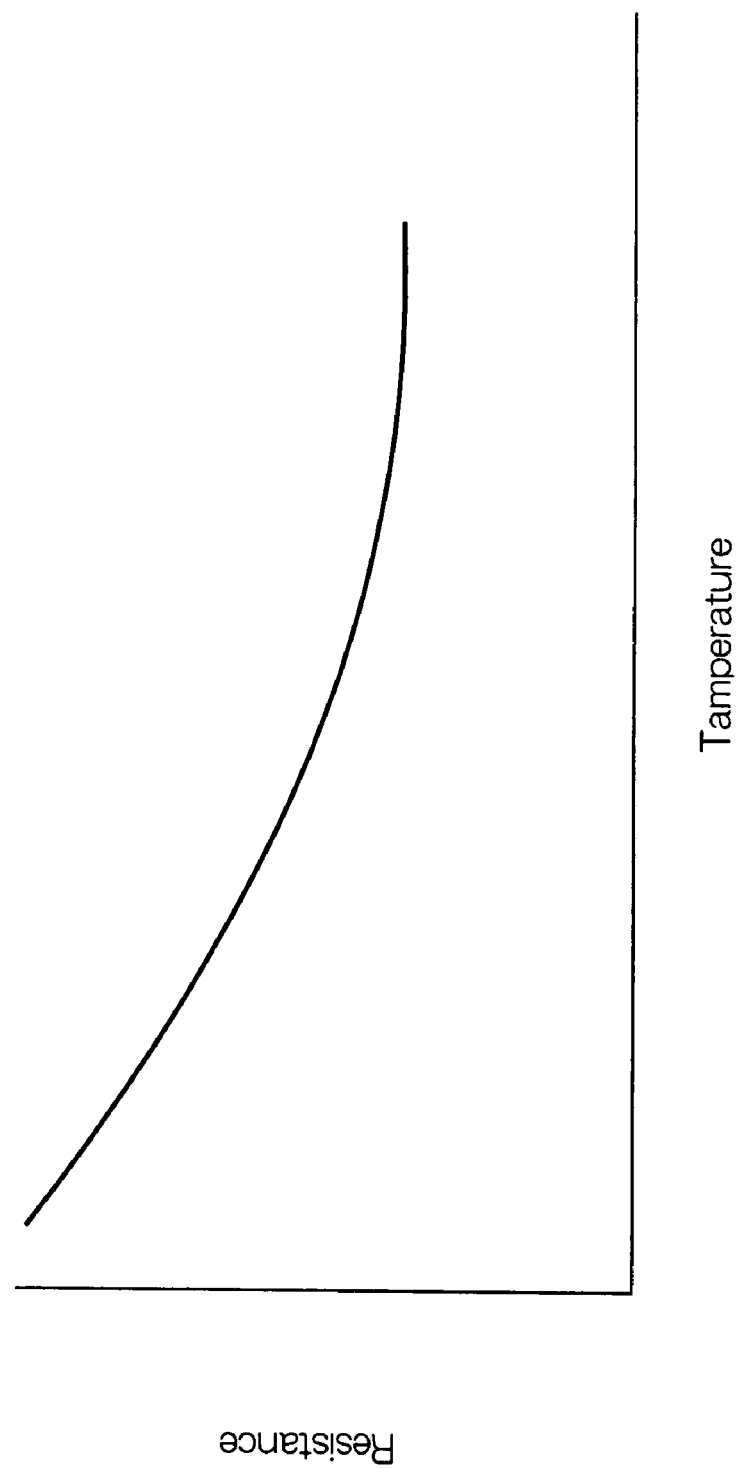
FIG. 36 is a diagram showing a relationship between filter temperatures and electrical resistance values.

The connection portions X and Y of the electrical wires 36a and 36b with respect to the inner surface of the primary flow path 35c are placed and separated by a distance such that, when PM is accumulated on the inner surface of the primary flow path 35c to such an extent that a restoration operation of the DPF is required (e.g., PM is attached to about 70% of the inner surface of the primary flow path 35c), PM is continuously attached across between the two connection portions X and Y of the electrical wires 36a and 36b as shown in FIG. 35, i.e., the two connection portions X and Y are electrically conductive via PM. In other words, if the distance is excessively short, the two points X and Y are electrically conductive when only a small amount of PM is attached. Conversely, if the distance is excessively long, the two points X and Y are not electrically conductive when PM is attached in an amount which requires a restoration operation of the DPF. The distance is set to be a value which avoids these situations.

Also, an exhaust temperature increasing device (exhaust heating means) 34 is provided upstream from the DPF 33 in the exhaust pipe 32 (see FIG. 1). The exhaust temperature increasing device 34, which is comprised of an electric heater, receives electric power from an electric generator (alternator; not shown) and generates heat, thereby making it possible to heat exhaust gas flowing through the exhaust pipe 32. Specifically, exhaust gas may be indirectly heated by heating the exhaust pipe 32, or gas may be directly heated by providing a heater line in the exhaust pipe 32. Note that a flame burner may be applicable as the exhaust temperature increasing device 34.

Also, an exhaust temperature detecting sensor (exhaust temperature detecting means) 37 for detecting the exhaust gas temperature is attached to the exhaust temperature increasing device 34. The exhaust temperature detecting sensor 37 may be provided in the exhaust temperature increasing device 34, or may be attached to the exhaust pipe 32 immediately upstream from the DPF 33.

This engine is provided with a restoration controller 5 for controlling the restoration operation of the DPF 33. The controller 5 receives a PM accumulation amount detection signal (a signal based on an electrical resistance) transmitted from the PM accumulation amount detecting sensor 36 and an exhaust temperature detection signal transmitted from the exhaust temperature detecting sensor 37. As described above, the restoration controller 5, which is provided with an accumulation amount estimating means, calculates a PM accumulation amount on a surface of the primary flow path 35c of the filter main body 35 based on an electrical resistance value detected by the electrical resistance detecting sensor 36c. Specifically, since the electrical resistance value varies depending on the filter temperature, a temperature of the filter main body 35 is detected by a means (not shown), such as a temperature sensor or the like, and the electrical resistance value detected by the electrical resistance detecting sensor 36c is subjected to a correction calculation based on the temperature of the filter main body 35, thereby estimating the PM accumulation amount with high accuracy.

As can be seen from the relationship between filter temperatures and electrical resistance values in FIG. 6, even when the PM accumulation amount is the same, the higher the filter temperature, the lower the electrical resistance value. In view of this, for example, a correction calculation is performed using the following correction expression, thereby making it possible to estimate the PM accumulation amount with high accuracy.

$$R = aT^2 + bT + c$$

R: electrical resistance value, T: temperature, a, b, c: coefficients

The controller 5 transmits control signals to the air intake throttling device 24 and the exhaust temperature increasing device 34 in accordance with the estimated PM accumulation amount and the exhaust temperature detection signal from the exhaust temperature detecting sensor 37. Specifically, the actuator of the air intake throttling device 24 is activated in accordance with the air intake throttling control signal transmitted to the air intake throttling device 24, so that the butterfly valve is rotated so as to obtain the opening degree corresponding to the air intake throttling control signal. Also, the electric heater is ON/OFF controlled in accordance with the exhaust temperature increase control signal transmitted to the exhaust temperature increasing device 34, thereby controlling the exhaust gas heating operation by the electric heater.

—DPF Restoration Control Operation—

Next, a DPF restoration control operation of the thus-configured system will be described.

In this embodiment, the air intake throttling device 24 and the exhaust temperature increasing device 34 are controlled, depending on the PM accumulation amount and the exhaust gas temperature in the DPF 33. Specifically, the controller 5 receives an electrical resistance signal from the PM accumulation amount detecting sensor 36 and estimates the PM accumulation amount using the accumulation amount estimating means provided in the controller 5. When it is determined that the PM accumulation amount has exceeded a predetermined amount, and it is determined based on the exhaust temperature detection signal received by the controller 5 from the exhaust temperature detecting sensor 37 that the exhaust gas temperature has not reached the restoration operable temperature (hereinafter the case where these two conditions are satisfied is referred to as a "case where the exhaust temperature increase control start condition is satisfied"), one or both of the air intake throttling device 24 and the exhaust temperature increasing device 34 are activated so as to increase the exhaust gas temperature to the restoration operable temperature. Thereby, a restoration operation of the DPF 33 is performed while the engine main body 1 continues to be run. Hereinafter, a plurality of specific operations will be described.

—Air Intake Throttling Priority Operation—

An operation in which priority is given to the air intake throttling of the air intake throttling device 24 is substantially similar to the first embodiment. When the exhaust temperature increase control start condition is satisfied, the controller 5 initially transmits an air intake throttling control signal to the air intake throttling device 24. Thereby, the actuator of the air intake throttling device 24 is activated to rotate the butterfly valve so as to obtain an opening degree corresponding to the air intake throttling control signal, so that the flow path area of the air intake pipe 21 is reduced. As a result, the intake air amount is reduced to enrich the air-fuel ratio, so that the combustion temperature in the combustion chamber is increased and therefore the exhaust gas temperature is increased. When the exhaust gas temperature thereby reaches the restoration operable temperature, the DPF 33 is restored without activation of the exhaust temperature increasing device 34.

Figure 37:
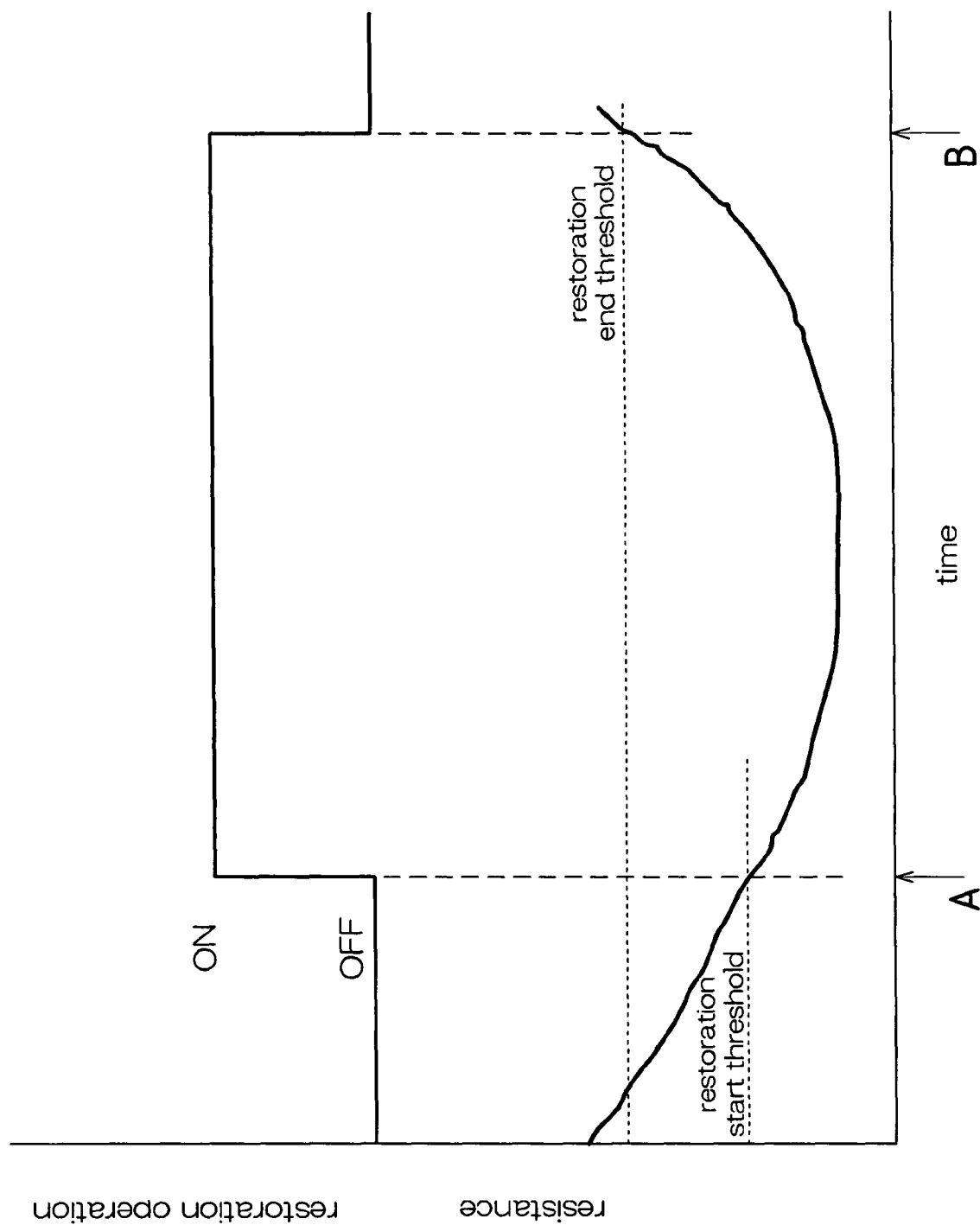
FIG. 37 is a timing chart showing changes over time in an electrical resistance value and restoration operation timing.

FIG. 37 is a timing chart showing changes over time in the electrical resistance value detected by the electrical resistance detecting sensor 36c and restoration operation timing in this case. Initially, the engine is run without execution of a restoration operation. As PM is accumulated, the electrical resistance value gradually decreases. When the electrical resistance value becomes smaller than a predetermined restoration starting threshold value (timing A in FIG. 37), a restoration operation is started. Immediately after the start of the restoration operation, the temperature of the filter main body 35 has not yet reached the restoration operable temperature, so that the electrical resistance value continues decreasing. When the temperature of the filter main body 35 reaches the restoration operable temperature, PM starts to be removed, so that the electrical resistance value gradually increases. Thereafter, when the electrical resistance value exceeds a predetermined restoration ending threshold value (timing B in FIG. 37), the restoration operation is ended. Note that an electrical resistance value set as the restoration ending threshold value is set to be higher than an electrical resistance value set as the restoration starting threshold value, thereby avoiding a situation where start and suspension of a filter restoration operation are frequently repeated.

Figure 38:
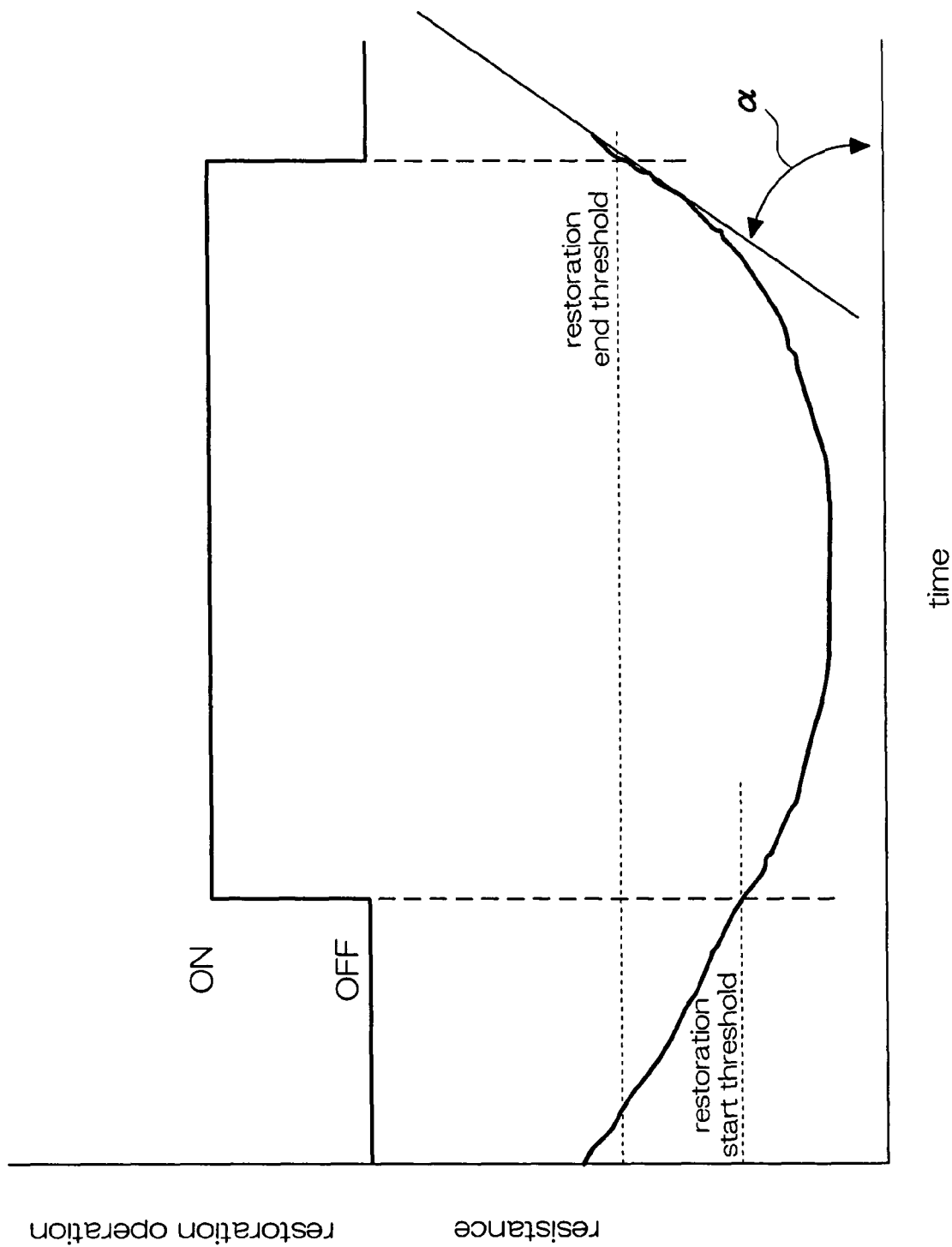
FIG. 38 is a diagram for describing an operation of suspending a filter restoration operation, depending on a change rate of an electrical resistance value, corresponding to FIG. 37.

Note that, when a change rate of the electrical resistance value detected by the electrical resistance detecting sensor 36c during a restoration operation (an increase amount of the electrical resistance value per unit time) becomes higher than a predetermined abnormality determination change rate (a slope a becomes larger than a predetermined angle in FIG. 38), the filter restoration operation is forcedly suspended. The reason is as follows. When the electrical resistance value sharply changes in this manner, a portion of the filter main body 35 is likely to locally have an abnormally high temperature (abnormal restoration). If the "abnormal restoration" state continues, melting damage of the DPF 33 is likely to occur. Therefore, when the change rate of the electrical resistance value becomes high, the restoration operation is ended. Thereby, it is possible to extend the life of the DPF 33.

As described above, in this embodiment, the electrical wires 36a and 36b are connected to the two portions X and Y of the surface of the primary flow path 35c of the filter main body 35, and the PM accumulation amount is recognized based on the electrical resistance between the two points X and Y. Specifically, as the PM accumulation amount increases, so that the accumulation thickness increases, the electrical resistance value gradually decreases. Therefore, by recognizing a change in the electrical resistance value, the PM accumulation amount can be detected. Therefore, the reliability of the PM accumulation amount detecting operation can be improved as compared to the conventional art in which a pressure difference between an upstream side and a downstream side of a filter is detected by a pressure sensor, or a PM generation amount or the like corresponding to a running state of an engine is read out and calculated from a map. In addition, this embodiment provides a relatively simple configuration in which wires (conductive wires) for detecting an electrical resistance are connected to the filter, thereby making it possible to improve the practicability.

Thirteenth Embodiment

Next, a thirteenth embodiment will be described. This embodiment is different from the first embodiment in the configuration of the PM accumulation amount detecting sensor 36. Therefore, only the configuration of the PM accumulation amount detecting sensor 36 will be here described.

Figure 39:
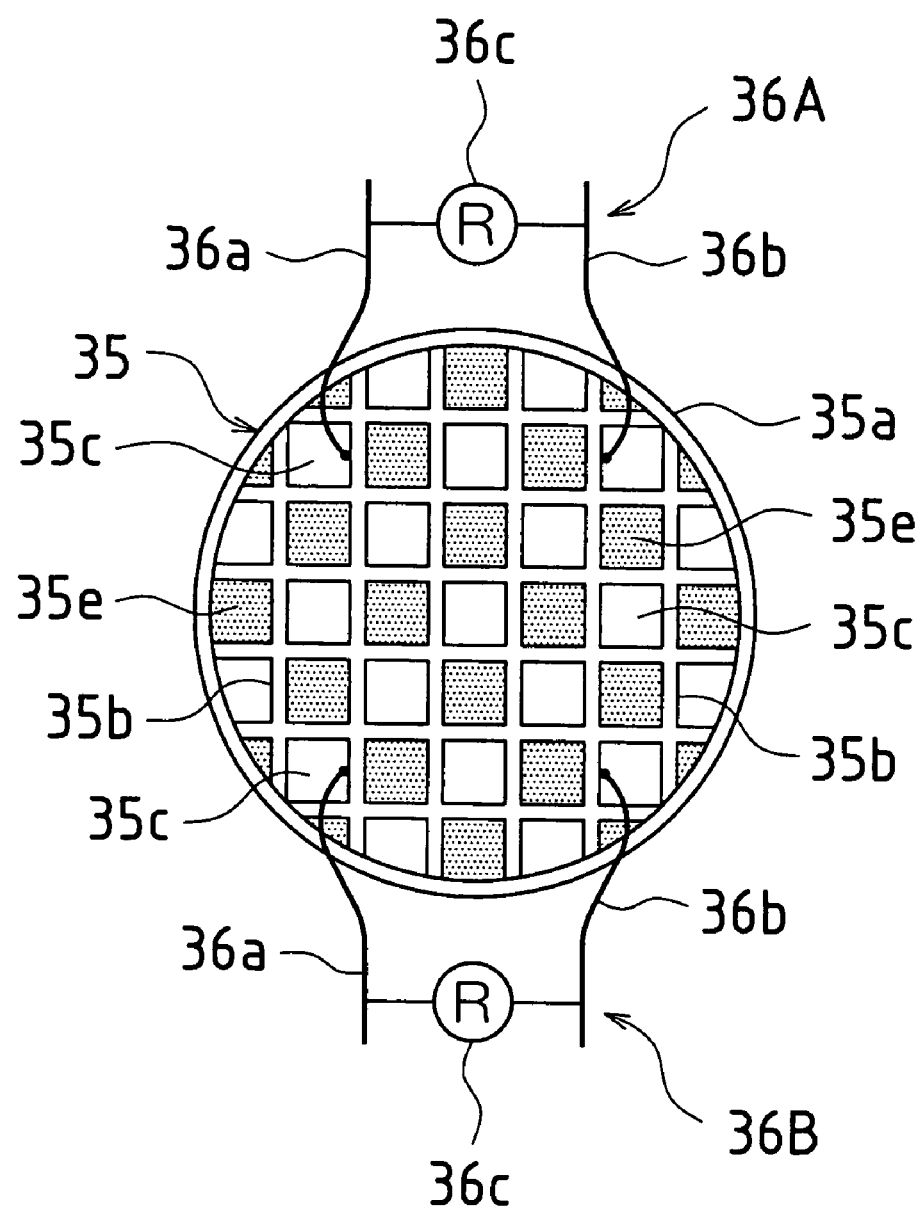
FIG. 39 is a diagram showing a thirteenth embodiment, corresponding to FIG. 32.

Although the single PM accumulation amount detecting sensor 36 having a pair of the electrical wires 36a and 36b is provided in the first embodiment, two PM accumulation amount detecting sensors 36A and 36B each having a pair of electrical wires 36a and 36b are provided in this embodiment as shown in FIG. 39. The electrical wires 36a and 36b of the PM accumulation amount detecting sensors 36A and 36B are connected to the filter main body 35 at the same distance from a center point of the filter main body 35.

Assuming that the two PM accumulation amount detecting sensors 36A and 36B are provided, even if disconnection occurs in the electrical wires 36a and 36b of one PM accumulation amount detecting sensor (e.g., 36A), it is possible to detect an electrical resistance between two points on the filter main body 35 by the other PM accumulation amount detecting sensor (e.g., 36B), thereby making it possible to secure the reliability of the PM accumulation amount detecting operation.

Also, in the configuration of this embodiment, when disconnection occurs in the electrical wires 36a and 36b of one PM accumulation amount detecting sensor (e.g., 36A), an electrical resistance value detected by the PM accumulation amount detecting sensor 36A is continually infinite. Therefore, by recognizing this state, the occurrence of disconnection of the electrical wires 36a and 36b of the PM accumulation amount detecting sensor 36A can be readily recognized, thereby making it possible to invalidate an output signal from the PM accumulation amount detecting sensor 36A.

Also, in this embodiment, since the two PM accumulation amount detecting sensors 36A and 36B are provided, each of them detects an electrical resistance between two points of the filter main body 35. Therefore, if these detected electrical resistance values are different from each other, the lower electrical resistance value is recognized as a true electrical resistance value, and the PM accumulation amount is estimated based on the lower electrical resistance value. This is to address nonuniform accumulation (biased accumulation) of PM with respect to the filter main body 35. Of the portions where electrical resistances are detected, a portion having a largest PM accumulation amount is used as a reference to determine timing of starting the filter restoration operation. For example, assuming that an electrical resistance value detected by one PM accumulation amount detecting sensor (e.g., 36A) is higher than an electrical resistance value detected by the other PM accumulation amount detecting sensor (e.g., 36B), there is a possibility that, although the electrical resistance value detected by the PM accumulation amount detecting sensor 36A is recognized as a true electrical resistance value, PM is excessively accumulated at a portion which is subjected to detection of the PM accumulation amount detecting sensor 36B. In this case, a temperature is excessively increased at that portion during a filter restoration operation, likely leading to damage of the filter main body 35. To avoid such a situation, a lowest detected electrical resistance value (an electrical resistance value at a portion where PM is most accumulated) is recognized as a true electrical resistance value as described above.

Although the two PM accumulation amount detecting sensors 36A and 36B each having a pair of electrical wires 36a and 36b are provided in this embodiment, three or more PM accumulation amount detecting sensors may be provided. Also, in this case, as described above, a lowest detected electrical resistance value is preferably recognized as a true electrical resistance value, thereby avoiding damage of the filter main body 35 during a restoration operation.

Fourteenth Embodiment

Next, a fourteenth embodiment will be described. This embodiment is different from the first and thirteenth embodiments in the configuration of the PM accumulation amount detecting sensor 36. Therefore, only the configuration of the PM accumulation amount detecting sensor 36 will also be here described.

Figure 40:
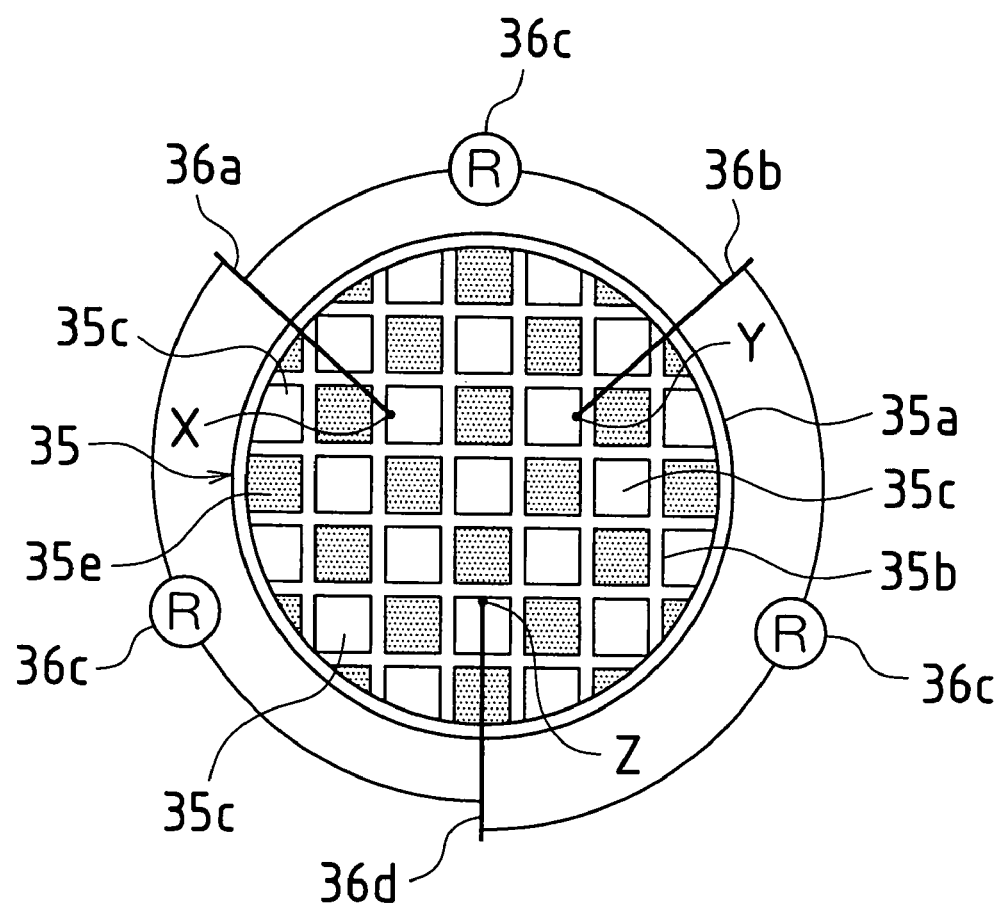
FIG. 40 is a diagram showing a fourteenth embodiment, corresponding to FIG. 32.

In this embodiment, as shown in FIG. 40, an electrical resistance between each of three points (points X, Y and Z in FIG. 40) on the filter main body 35 is detected. Specifically, electrical wires (conductive wires) 36a, 36b and 36d are connected to the three points, respectively. Electrical resistance detecting sensors 36c, 36c and 36c are provided so as to detect electrical resistances between these electrical wires 36a, 36b and 36d.

According to the configuration of this embodiment, when no disconnection occurs in the electrical wires connected to the points (X, Y and z), $r1=r2=r3=r$ where r1, r2 and r3 represent resistance values between the points (in the absence of biased accumulation). Electrical resistance values detected between the points are represented by:

$R(X,Y)=R(Y,Z)=R(Z,X)=R=(2/3)r$ where R(X, Y) represents a resistance value between "point X" and "point Y", R(Y, Z) represents a resistance value between "point Y" and "point Z", and R(Z, X) represents a resistance value between "point Z" and "point X".

On the other hand, when disconnection occurs in one of the electrical wires connected to the points (disconnection in an electrical wire connected to "point X"), $R(X,Y)=\infty$ $R(Z,X)=\infty$ $R(Y,Z)=r.$ The electrical resistance value of R(Y, Z) suddenly increases by a factor of 1.5 (1.5 times higher than when disconnection does not occur). Thereby, by recognizing such a sharp increase in the electrical resistance value, disconnection in a wire can be readily recognized.

Note that, even in such a configuration for detecting electrical resistances between three points on the filter main body 35, a lowest detected electrical resistance value is recognized as a true electrical resistance value as described above.

Fifteenth Embodiment

Next, a fifteenth embodiment will be described. This embodiment is also different from the above-described embodiments in the configuration of the PM accumulation amount detecting sensor 36. Therefore, only the configuration of the PM accumulation amount detecting sensor 36 will be here described.

The PM accumulation amount detecting sensor 36 according to this embodiment has a function of detecting an electrical resistance between two points as in the first and thirteenth embodiments. In addition, a function of detecting a temperature at a connection portion of the electrical wire 36a on the filter main body 35 is also provided.

Figure 41:
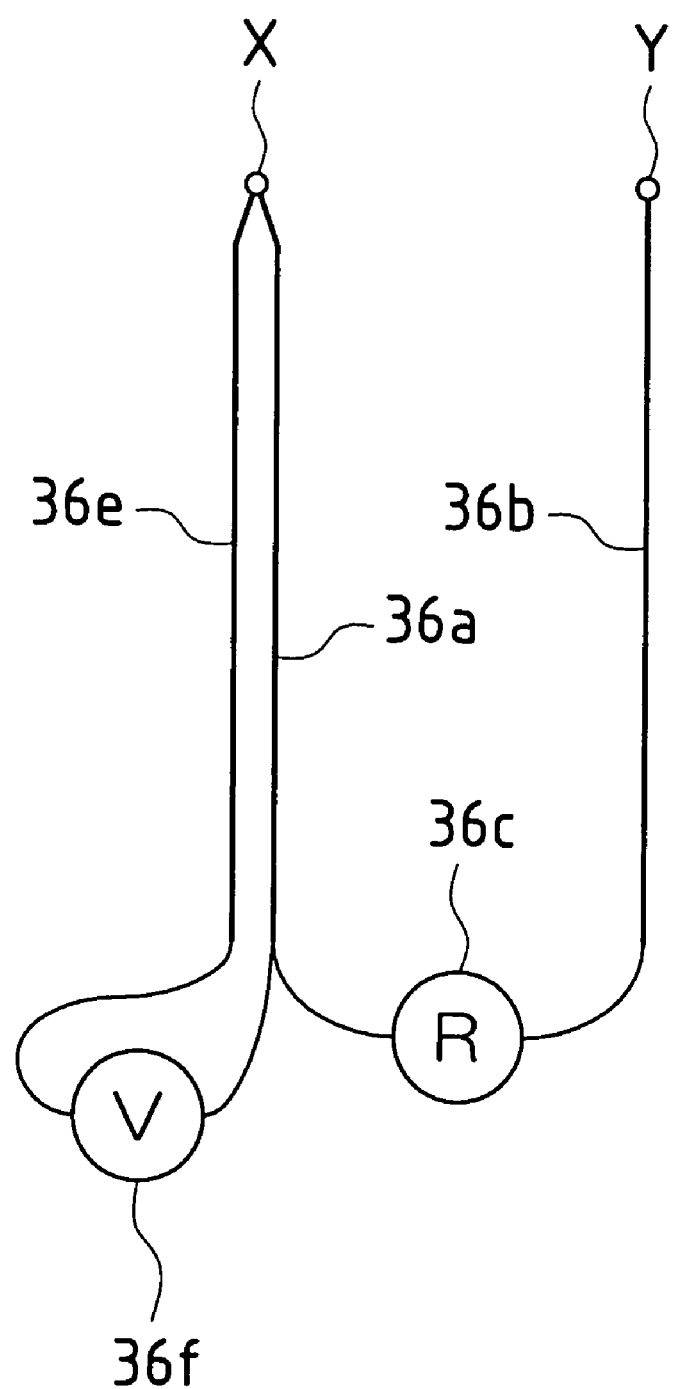
FIG. 41 is a schematic diagram showing a configuration of a PM accumulation amount detecting sensor in a fifteenth embodiment.

Specifically, as shown in FIG. 41, an electrical wire 36e made of a material different from that of the electrical wire 36a is connected to a point (point X above) which is subjected to measurement of an electrical resistance. A closed circuit is formed by the electrical wires 36a and 36e. A voltage detecting sensor 36f is connected to the circuit. Regarding specific materials for the electrical wires 36a, 36b and 36e, the electrical wires 36a and 36b for detecting an electrical resistance are made of Alumel (alloy of Ni and Al), and the electrical wire 36e for detecting a voltage is made of Chromel (alloy of Ni and Cr). In other words, the electrical wire 36a for detecting an electrical resistance is used to construct a thermocouple.

With the configuration of this embodiment, by measuring a temperature of a point where an electrical resistance is to be measured, it can be determined whether or not a restoration operation is being normally performed (a restoration operation is being performed at appropriate temperature).

When a plurality of PM accumulation amount detecting sensors 36A and 36B are provided as in the thirteenth embodiment and each of them is provided with a function as a thermocouple, it can be recognized whether or not the temperature of the filter main body 35 is biased, by measuring a temperature at each point during a restoration operation. When the temperature is biased, it can be determined that biased accumulation of PM occurs. Thereby, it is possible to determine whether or not the DPF 33 needs to be subjected to a maintenance process. Also, in the PM accumulation amount detecting sensor 36 of FIG. 41, by constructing a thermocouple with respect to the right electrical wire 36b as is similar to the left electrical wire 36a, a temperature can be measured at a plurality of points.

Note that, when the PM accumulation amount is calculated based on a filter temperature in this manner, a thermocouple employing the PM accumulation amount detecting sensor 36 as described above or an individual temperature sensor may be used as a means for measuring the filter temperature.

Sixteenth Embodiment

Next, a sixteenth embodiment will be described. This embodiment comprises a pressure sensor (not shown) for detecting a pressure difference between an upstream side and a downstream side of the DPF 33 in addition to the PM accumulation amount detecting sensor 36 of the above-described embodiments. Specifically, the controller 5 receives an output from the PM accumulation amount detecting sensor 36 and an output from the pressure sensor. Also, the controller 5 comprises a maintenance determining means for determining whether or not the DPF 33 needs to be subjected to a maintenance process, based on the outputs.

In general, examples of matter accumulated on the DPF 33 include matter which cannot be removed (e.g., ash due to attachment of lubricating oil, engine abrasion powder, etc.) in addition to the above-described PM which can be removed by a restoration operation. When an accumulation state is monitored only by detecting a differential pressure using a pressure sensor, it is difficult to determine whether an increase in the differential pressure is caused by the above-described PM or by engine abrasion powder or the like. To achieve this determination, it is necessary to determine the necessity of maintenance, such as cleaning of the DPF or the like, based on the total run time of the engine.

In contrast to this, according to the configuration of this embodiment, for example, when a differential pressure detected by the pressure sensor is relatively high and an electrical resistance value detected by the electrical resistance detecting sensor 36c is relatively low, it can be determined that the accumulation amount of PM which can be removed by a restoration operation is large. On the other hand, when a differential pressure detected by the pressure sensor is relatively high and an electrical resistance value detected on the filter by the electrical resistance detecting sensor 36c is relatively high, it can be determined that the accumulation amount of PM which cannot be removed by a restoration operation is large. Therefore, by using the maintenance determining means, it is easy to determine whether the filter can be cleaned by execution of a restoration operation or the maintenance of the DPF 33 is required.

Seventeenth Embodiment

Next, a seventeenth embodiment will be described. In this embodiment, a filter restoration operating condition is previously determined based on a filter surface temperature upon the start of a restoration operation.

Specifically, the filter surface temperature is measured at the same time when the PM accumulation amount is detected. A restoration operation is started after previously determining a restoration operation continuation time, a reduction in air intake amount, a heat level of the electric heater, and the like, as filter restoration operation conditions, based on a difference between the filter surface temperature upon the start of a restoration operation and the restoration target temperature. According to this, a filter restoration operation can be executed under appropriate conditions, thereby making it possible to minimize and suppress a deterioration in fuel efficiency due to a restoration operation or the like.

Eighteenth Embodiment

Next, an eighteenth embodiment will be described. In this embodiment, when a filter temperature upon the start of the engine is lower than or equal to a predetermined temperature, a filter restoration operation is forcedly forbidden.

In the DPF 33, assuming that the filter temperature is lower than or equal to a predetermined temperature (cold state) upon the start of the engine, if a filter restoration operation, such as reduction of the air intake amount, changing of the fuel injection time or its pattern, or the like, is executed, CO or THC does not react with a catalyst due to incomplete combustion of air-fuel mixture, so that CO and THC are emitted, as they are, to the atmosphere, resulting in irritating odor. Therefore, in this embodiment, the filter restoration operation is forcedly forbidden during the cold state so as to suppress incomplete combustion of air-fuel mixture, thereby reducing the emission amount of CO and THC. Specifically, when the temperature of engine cooling water is lower than or equal to 50° C., a filter restoration operation is forbidden. When the engine cooling water temperature exceeds 50° C. and the exhaust temperature increase control start condition is satisfied, a filter restoration operation is started.

Other Embodiments

Although the engines comprising a single DPF 33 have been described in the embodiments and variations above, the present invention is applicable to an engine comprising a plurality of DPFs which are connected in parallel or in series.

Also, although it has been mainly described in the embodiments above that the DPF 33 is restored by a reduction in air intake amount and heating by an electric heater, the DPF 33 may be restored in other manners. For example, the opening degree of an exhaust throttling valve provided in an exhaust system may be reduced, the fuel injection amount may be increased, or the fuel injection time may be delayed.

Also, the present invention is not limited to the filter main body 35 the entire of which is made of a nonconductive material. Alternatively, substantially the whole filter 33 may be made of a conductive material, while only a portion of the surface of the primary flow path 35c may be made of a nonconductive material so that an electrical resistance between two points in the portion made of the nonconductive material is detected.

The present invention can be embodied and practiced in other different forms without departing from the spirit and essential characteristics thereof. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

This application claims priority on Patent Application No. 2005-054243 filed in Japan on Feb. 28, 2005 and Patent Application No. 2005-129836 filed in Japan on Apr. 27, 2005, which are hereby incorporated by reference in their entirety. All documents cited herein are also specifically incorporated by reference in their entirety.

INDUSTRIAL APPLICABILITY

The present invention is preferable not only to diesel engines, but also various types of engines, such as gas engines, gasoline engines, and the like. The present invention is also preferable to engines which are provided in automobiles, electric generators, and the like.

The invention claimed is:

1. An exhaust gas purification apparatus comprising:
a particulate filter capable of collecting particulate matter in exhaust of an internal combustion engine and being restored by removing the particulate matter by oxidation when a temperature of the exhaust reaches a restoration operable temperature;
an intake air amount reducing means provided in an air intake system of the internal combustion engine and capable of reducing an intake air amount;
an exhaust heating means provided in an exhaust system of the internal combustion engine and capable of heating exhaust gas;
an accumulation amount detecting means capable of detecting that an accumulation amount of particulate matter in the particulate filter exceeds a predetermined amount;
an exhaust temperature detecting means capable of detecting the exhaust temperature of the internal combustion engine; and
a restoration operation control means for receiving outputs of the accumulation amount detecting means and the exhaust temperature detecting means, and executing any one of an intake air amount reducing operation by the intake air amount reducing means and an exhaust gas heating operation by the exhaust heating means with priority or executing both the intake air amount reducing operation and the exhaust gas heating operation simultaneously, when the accumulation amount of particulate matter in the particulate filter exceeds the predetermined amount and the exhaust temperature of the internal combustion engine is lower than the restoration operable temperature,
wherein the restoration operation control means executes any one of the intake air amount reducing operation by the intake air amount reducing means and the exhaust gas heating operation by the exhaust heating means with priority when the accumulation amount of particulate matter in the particulate filter exceeds the predetermined amount and the exhaust temperature of the internal combustion engine is lower than the restoration operable temperature, and thereafter, executes the other operation when the exhaust temperature of the internal combustion engine has not reached the restoration operable temperature,
a plurality of predetermined threshold values are previously set for an intake air reduction amount by the intake air amount reducing means,
as the plurality of threshold values, a first threshold value corresponding to an intake air reduction amount when a CO and THC concentration of exhaust gas reaches a tolerance limit, and a second threshold value corresponding to an intake air reduction amount when the internal combustion engine reaches a run limit due to misfire, are set,
and when the intake air reduction amount reaches the first threshold value during the intake air amount reducing operation by the intake air amount reducing means, the intake air amount reducing operation by the intake air amount reducing means is switched to the exhaust gas heating operation by the exhaust heating means, and thereafter, when the exhaust temperature of the interns combustion engine still does not reach the restoration operable temperature, the intake air amount reducing operation bathe intake air amount reducing means is resumed with the second threshold value being a limit of the intake air reduction amount.

2. The exhaust gas purification apparatus according to claim 1, wherein the plurality of threshold values are changed, depending on a load and a revolution number of the internal combustion engine.

3. The exhaust gas purification apparatus according to claim 1, wherein the plurality of threshold values are changed, depending on a cetane number of a fuel used in the internal combustion engine.

4. The exhaust gas purification apparatus according to claim 1, wherein the exhaust heating means comprises an electric heater which uses electric power generated by an output of the internal combustion engine.

5. The exhaust gas purification apparatus according to claim 4, wherein, when a difference between a maximum output of the internal combustion engine and a required output of the internal combustion engine is smaller than an output to be used by the electric heater, the exhaust gas heating operation by the electric heater is limited or forbidden.

6. The exhaust gas purification apparatus according to claim 1, wherein the internal combustion engine comprises an EGR device for recirculating exhaust gas to an air intake side of the internal combustion engine, the EGR device having an EGR path capable of causing an exhaust side and the air intake side of the internal combustion engine to be in communication with each other and an EGR valve capable of changing a path area of the EGR path, and
during the intake air amount reducing operation by the intake air amount reducing means, as the intake air reduction amount is increased, the opening degree of the EGR valve is reduced.

7. The exhaust gas purification apparatus according to claim 6, wherein a running state of the internal combustion engine is monitored, and when a change amount of the running state exceeds a predetermined amount, the EGR valve is completely closed.

8. The exhaust gas purification apparatus according to claim 1, wherein the internal combustion engine comprises a turbocharger for compressing intake air using fluid energy of exhaust gas, as the plurality of threshold values, a first threshold value corresponding to an intake air reduction amount when a CO and THC concentration of exhaust gas reaches a tolerance limit, and a second threshold value corresponding to an intake air reduction amount when surging of the turbocharger occurs, are set, and when the intake air reduction amount reaches the first threshold value during the intake air amount reducing operation by the intake air amount reducing means, the intake air amount reducing operation by the intake air amount reducing means is switched to the exhaust gas heating operation by the exhaust heating means, and thereafter, when the exhaust temperature of the internal combustion engine still does not reach the restoration operable temperature, the intake air amount reducing operation by the intake air amount reducing means is resumed with the second threshold value being a limit of the intake air reduction amount.

9. The exhaust gas purification apparatus according to claim 1, wherein the internal combustion engine comprises a turbocharger for compressing intake air using fluid energy of exhaust gas, and a waste gate valve for performing an open operation so as to cause exhaust gas to bypass the turbocharger or an air intake bypass valve for performing an open operation so as to cause intake air to bypass the turbocharger, as the plurality of threshold values, a first threshold value corresponding to an intake air reduction amount when a CO and THC concentration of exhaust gas reaches a tolerance limit, a second threshold value corresponding to an intake air reduction amount when surging of the turbocharger occurs while the waste gate valve or the air intake bypass valve is completely closed, and a third threshold value corresponding to an intake air reduction amount when the internal combustion engine reaches a run limit due to misfire while the waste gate valve or the air intake bypass valve is opened, are set, and when the intake air reduction amount reaches the first threshold value during the intake air amount reducing operation by the intake air amount reducing means, the intake air amount reducing operation by the intake air amount reducing means is switched to the exhaust gas heating operation by the exhaust heating means, and thereafter, when the exhaust temperature of the internal combustion engine still does not reach the restoration operable temperature, the intake air amount reducing operation by the intake air amount reducing means is resumed while the waste gate valve or the air intake bypass valve is completely closed, and when the intake air reduction amount reaches the second threshold value, the intake air amount reducing operation by the intake air amount reducing means is continued with the third threshold value being a limit of the intake air reduction amount while the waste gate valve or the air intake bypass valve is opened.

10. The exhaust gas purification apparatus according to claim 1, wherein the accumulation amount detecting means is capable of detecting that the accumulation amount of particulate matter exceeds the predetermined amount, by obtaining a difference between a pressure immediately upstream from the particulate filter based on a load of the internal combustion engine and a revolution number of the internal combustion engine when the particulate filter is in a normal state, and a pressure immediately upstream from the particulate filter based on a load of the internal combustion engine and a revolution number of the internal combustion engine when the particulate filter is in a current state.

11. The exhaust gas purification apparatus according to claim 1, wherein the accumulation amount detecting means estimates the accumulation amount of particulate matter based on a pressure upstream from the particulate filter, estimates an internal temperature of the particulate filter based on the exhaust temperature, and corrects the accumulation amount using a correction amount determined based on the particulate filter internal temperature and the particulate filter upstream pressure.

12. The exhaust gas purification apparatus according to claim 1, wherein the accumulation amount detecting means is a pressure sensor for detecting a pressure upstream from the particulate filter, and the restoration operation control means, when the particulate filter upstream pressure reaches a restoration starting pressure, starts a restoration operation, integrates a fuel injection amount of the internal combustion engine since the particulate filter in a brand-new state is attached, and updates the restoration starting pressure with a gradually increasing value, depending on the integration value.

13. The exhaust gas purification apparatus according to claim 1, wherein the restoration operation control means updates a target restoration temperature with a higher temperature when the particulate filter upstream pressure has exceeded a predetermined pressure upon completion of a restoration operation of the particulate filter.

14. The exhaust gas purification apparatus according to claim 1, wherein the accumulation amount detecting means is a pressure sensor for detecting a pressure upstream from the particulate filter, and the restoration operation control means, when the particulate filter upstream pressure reaches a restoration ending pressure, ends a restoration operation, integrates a fuel injection amount of the internal combustion engine since the particulate filter in a brand-new state is attached, and updates the restoration ending pressure with a gradually increasing value, depending on the integration value.

15. The exhaust gas purification apparatus according to claim 13, wherein the restoration operation control means updates the target restoration temperature with a lower temperature when the particulate filter upstream pressure sharply decreases during the restoration operation of the particulate filter.

16. The exhaust gas purification apparatus according to claim 13, wherein the restoration operation control means suspends a restoration operation of the particulate filter when the particulate filter upstream pressure sharply decreases during the restoration operation.

17. The exhaust gas purification apparatus according to claim 1, wherein the exhaust system of the internal combustion engine comprises an exhaust throttling means capable of closing an exhaust pipe, and the restoration operation control means, when suspending the internal combustion engine, interrupts intake air using the intake air amount reducing means, and closes the exhaust pipe.

18. The exhaust gas purification apparatus according to claim 1, wherein the exhaust system of the internal combustion engine comprises an exhaust throttling means capable of closing an exhaust pipe, and the restoration operation control means, when suspending the internal combustion engine, interrupts intake air using the intake air amount reducing means, closes the exhaust pipe, and executes a fuel injection operation.

19. An internal combustion engine comprising the exhaust gas purification apparatus according to claim 1, wherein, when the accumulation amount of particulate matter in the particulate filter exceeds the predetermined amount, and the exhaust temperature of the internal combustion engine is lower than the restoration operable temperature, any one of the intake air amount reducing operation by the intake air amount reducing means and the exhaust gas heating operation by the exhaust heating means is executed with priority or both of the intake air amount reducing operation and the exhaust gas heating operation are executed simultaneously, thereby restoring the particulate filter.

20. A particulate filter restoring method performed by the exhaust gas purification apparatus according to claim 1, wherein, when the accumulation amount of particulate matter in the particulate filter exceeds the predetermined amount, and the exhaust temperature of the internal combustion engine is lower than the restoration operable temperature, any one of the intake air amount reducing operation by the intake air amount reducing means and the exhaust gas heating operation by the exhaust heating means is executed with priority or both of the intake air amount reducing operation and the exhaust gas heating operation are executed simultaneously, thereby restoring the particulate filter.

* * * * *